United States Patent [19]

Fujisawa et al.

[11] Patent Number: 5,274,408
[45] Date of Patent: Dec. 28, 1993

[54] ELECTRONIC CAMERA

[75] Inventors: Toshiki Fujisawa; Haruki Nakayama, both of Tokyo, Japan

[73] Assignee: Konica Corporation, Tokyo, Japan

[21] Appl. No.: 989,786

[22] Filed: Dec. 11, 1992

[30] Foreign Application Priority Data

Dec. 12, 1991 [JP] Japan .................... 3-351625
Feb. 26, 1992 [JP] Japan .................... 4-075151

[51] Int. Cl.⁵ .................................. G03B 1/18
[52] U.S. Cl. ........................ 354/173.11; 354/214
[58] Field of Search ............ 354/173.1, 173.11, 214

[56] References Cited

U.S. PATENT DOCUMENTS

| 4,324,469 | 4/1982 | Harvey | 354/214 |
| 4,707,095 | 11/1987 | Nakano et al. | 354/173.11 |
| 4,967,217 | 10/1990 | Yamamoto et al. | 354/173.11 |

OTHER PUBLICATIONS

English language abstract of Japanese Patent Publication No. 61'4 232433 (Oct. 16, 1986).

Primary Examiner—David M. Gray
Attorney, Agent, or Firm—Finnegan, Henderson, Farabow, Garrett & Dunner

[57] ABSTRACT

This invention relates to an electronic camera of an electronic lens shutter type including a film rewinding apparatus. The film rewinding apparatus comprises a camera back which openable for mounting or dismounting a film cartridge, an open camera back detection device for detecting the open camera back, a film rewinding device for rewinding a film, a film detection device provided in a film passage to detect a presence of the film, and a film rewind control device which stops rewinding of the film for a time specified by a timer when the film detection device detects that there is no film during the film rewinding, inhibits subsequent rewinding of the film when the open camera back is detected during the specified time, and resumes rewinding of the film when the open camera back is not detected during the specified time and the specified time is over.

1 Claim, 92 Drawing Sheets

FIG. 17

| | DISPLAY PANEL | FINDER DISPLAY |
|---|---|---|
| WHEN AN APPROPRIATE EXPOSURE IS OBTAINED WITH THE SPECIFIED APERTURE VALUE | 1/30 ~ 1/250<br>APPROPRIATE SHUTTER SPEED INDICATION | |
| WHEN AN APPROPRIATE EXPOSURE IS NOT OBTAINED WITH THE SPECIFIED APERTURE VALUE AND THE APERTURE VALUE IS CHANGED | F 2 ~ F 22<br>APPROPRIATE APERTURE INDICATION | |
| UNDER-EXPOSURE ALARM | F2 ~ 1/30<br>F2 OR SHUTTER SPEED IN FLICKERING | |
| OVER-EXPOSURE ALARM | F22 ~ t/250<br>F22 OR 1/250 IN FLICKERING | |

FIG. 27

| -#-<br>(CONTROL No.) | -Iv-<br>(BRIGHT-NESS) | -tv-<br>(SHUTTER SPEED) | -sv-<br>(ISO SEN-SITIVITY) | -av-<br>(APER-TURE VALUE) | -cv-<br>(COMPEN-SATION VALUE) | -gv-<br>(GUIDE No.) | -afz-<br>(RANGE) |
|---|---|---|---|---|---|---|---|
| 0 | +0.00 | 60" | 6 | F 2.0 | +2.0 | 1.00 | 99.9 |
| 1 | +0.17 | 57" |  |  |  | 1.06 | 60.6 |
| 2 | +0.33 | 51" | 8 |  | +1.7 | 1.12 | 30.3 |
| 3 | +0.50 | 45" |  | F 2.4 | +1.5 | 1.19 | 20.2 |
| 4 | +0.67 | 40" | 10 |  | +1.3 | 1.26 | 15.2 |
| 5 | +0.83 | 36" |  |  |  | 1.33 | 12.1 |
| 6 | +1.00 | 30" | 12 | F 2.8 | +1.0 | 1.41 | 10.1 |
| 7 | +1.17 | 29" |  |  |  | 1.50 | 8.7 |
| 8 | +1.33 | 25" | 15 |  | +0.7 | 1.59 | 7.6 |
| 9 | +1.50 | 22" |  | F 3.4 | +0.5 | 1.68 | 6.8 |
| 10 | +1.67 | 20" | 19 |  | +0.3 | 1.78 | 6.1 |
| 11 | +1.83 | 18" |  |  |  | 1.89 | 5.5 |
| 12 | +2.00 | 15" | 25 | F 4.0 | 0.0 | 2.00 | 5.1 |
| 13 | +2.17 | 14" |  |  |  | 2.12 | 4.7 |
| 14 | +2.33 | 13" | 32 |  | -0.3 | 2.24 | 4.4 |
| 15 | +2.50 | 11" |  | F 4.8 | -0.5 | 2.38 | 4.1 |
| 16 | +2.67 | 10" | 40 |  | -0.7 | 2.52 | 3.8 |
| 17 | +2.83 | 9" |  |  |  | 2.67 | 3.8 |
| 18 | +3.00 | 8" | 50 | F 5.6 | -1.0 | 2.83 | 3.4 |
| 19 | +3.17 | 7" |  |  |  | 3.00 | 3.2 |
| 20 | +3.33 | 6" | 64 |  | -1.3 | 3.17 | 3.1 |
| 21 | +3.50 | 5"6 |  | F 6.7 | -1.5 | 3.36 | 2.9 |
| 22 | +3.67 | 5" | 80 |  | -1.7 | 3.56 | 2.8 |
| 23 | +3.83 | 4"5 |  |  |  | 3.78 | 2.7 |
| 24 | +4.00 | 4" | 100 | F 8.0 | -2.0 | 4.00 | 2.6 |
| 25 | +4.17 | 3"6 |  |  |  | 4.24 | 2.5 |
| 26 | +4.33 | 3"2 | 125 |  |  | 4.49 | 2.4 |
| 27 | +4.50 | 2"8 |  | F 9.5 |  | 4.76 | 2.3 |
| 28 | +4.67 | 2"5 | 160 |  |  | 5.04 | 2.2 |
| 29 | +4.83 | 2"2 |  |  |  | 5.34 | 2.1 |
| 30 | +5.00 | 2" | 200 | F 11 |  | 5.66 | 2.0 |
| 31 | +5.17 | 1"8 |  |  |  | 5.99 | 2.0 |
| 32 | +5.33 | 1"6 | 250 |  |  | 6.35 | 1.9 |
| 33 | +5.50 | 1"4 |  | F 13 |  | 6.73 | 1.9 |
| 34 | +5.67 | 1"3 | 320 |  |  | 7.13 | 1.8 |
| 35 | +5.83 | 1"1 |  |  |  | 7.55 | 1.8 |
| 36 | +6.00 | 1" | 400 | F 16 |  | 8.00 | 1.7 |
| 37 | +6.17 | 1/1.1 |  |  |  | 8.48 | 1.7 |
| 38 | +6.33 | 1/1.2 | 500 |  |  | 8.98 | 1.6 |
| 39 | +6.50 | 1/1.4 |  | F 19 |  | 9.51 | 1.6 |
| 40 | +6.67 | 1/1.6 | 640 |  |  | 10.08 | 1.5 |
| 41 | +6.83 | 1/1.8 |  |  |  | 10.68 | 1.5 |
| 42 | +7.00 | 1/2 | 800 | F 22 |  | 11.31 | 1.5 |
| 43 | +7.17 | 1/2.2 |  |  |  | 11.99 | 1.4 |
| 44 | +7.33 | 1/2.5 | 10H |  |  | 12.70 | 1.4 |
| 45 | +7.50 | 1/2.8 |  |  |  | 13.45 | 1.4 |
| 46 | +7.67 | 1/3.2 | 12H |  |  | 14.25 | 1.3 |
| 47 | +7.83 | 1/3.6 |  |  |  | 15.10 | 1.3 |
| 48 | +8.00 | 1/4 | 16H |  |  | 16.00 | 1.3 |
| 49 | +8.17 | 1/4.5 |  |  |  | 16.95 | 1.3 |
| 50 | +8.33 | 1/5 | 20H |  |  | 17.96 | 1.2 |

| -#-<br>(CONTROL No.) | -Iv-<br>(BRIGHT-NESS) | -tv-<br>(SHUTTER SPEED) | -sv-<br>(ISO SEN-SITIVITY) | -av-<br>(APER-TURE VALUE) | -cv-<br>(COMPEN-SATION VALUE) | -gv-<br>(GUIDE No.) | -afz-<br>(RANGE) |
|---|---|---|---|---|---|---|---|
| 51 | +8.50 | 1/6.0 |  |  |  | 19.03 | 1.2 |
| 52 | +8.67 | 1/6 | 25H |  |  | 20.16 | 1.2 |
| 53 | +8.83 | 1/7.1 |  |  |  | 21.36 | 1.2 |
| 54 | +9.00 | 1/8 | 32H |  |  | 22.63 | 1.2 |
| 55 | +9.17 | 1/9 |  |  |  | 23.97 | 1.1 |
| 56 | +9.33 | 1/10 | 40H |  |  | 25.40 | 1.1 |
| 57 | +9.50 | 1/11 |  |  |  | 26.91 | 1.1 |
| 58 | +9.67 | 1/13 | 50H |  |  | 28.51 | 1.1 |
| 59 | +9.83 | 1/14 |  |  |  | 30.20 | 1.1 |
| 60 | +10.00 | 1/15 | 64H |  |  | 32.00 | 1.0 |
| 61 | +10.17 | 1/18 |  |  |  | 33.90 | 1.0 |
| 62 | +10.33 | 1/20 |  |  |  | 35.92 | 1.0 |
| 63 | +10.50 | 1/22 |  |  |  | 38.05 | 1.0 |
| 64 | +10.67 | 1/25 |  |  |  | 40.32 | 1.0 |
| 65 | +10.83 | 1/28 |  |  |  | 42.71 | 1.0 |
| 66 | +11.00 | 1/30 |  |  |  | 45.25 | 0.9 |
| 67 | +11.17 | 1/36 |  |  |  | 47.95 | 0.9 |
| 68 | +11.33 | 1/40 |  |  |  | 50.80 | 0.9 |
| 69 | +11.50 | 1/45 |  |  |  | 53.82 | 0.9 |
| 70 | +11.67 | 1/50 |  |  |  | 57.02 | 0.9 |
| 71 | +11.83 | 1/57 |  |  |  | 60.41 | 0.9 |
| 72 | +12.00 | 1/60 |  |  |  | 64.00 | 0.9 |
| 73 | +12.17 | 1/72 |  |  |  |  | 0.9 |
| 74 | +12.33 | 1/80 |  |  |  |  | 0.8 |
| 75 | +12.50 | 1/90 |  |  |  |  | 0.8 |
| 76 | +12.67 | 1/100 |  |  |  |  | 0.8 |
| 77 | +12.83 | 1/114 |  |  |  |  | 0.8 |
| 78 | +13.00 | 1/125 |  |  |  |  | 0.8 |
| 79 | +13.17 | 1/144 |  |  |  |  | 0.8 |
| 80 | +13.33 | 1/160 |  |  |  |  | 0.8 |
| 81 | +13.50 | 1/180 |  |  |  |  | 0.8 |
| 82 | +13.67 | 1/200 |  |  |  |  | 0.8 |
| 83 | +13.83 | 1/228 |  |  |  |  | 0.8 |
| 84 | +14.00 | 1/250 |  |  |  |  | 0.8 |
| 85 | +14.17 | 1/287 |  |  |  |  | 0.8 |
| 86 | +14.33 | TIME |  |  |  |  | 0.7 |
| 87 | +14.50 |  |  |  |  |  | 0.7 |
| 88 | +14.67 |  |  |  |  |  | 0.7 |
| 89 | +14.83 |  |  |  |  |  | 0.7 |
| 90 | +15.00 |  |  |  |  |  | 0.7 |
| 91 | +15.17 |  |  |  |  |  | 0.7 |
| 92 | +15.33 |  |  |  |  |  | 0.7 |
| 93 | +15.50 |  |  |  |  |  | 0.7 |
| 94 | +15.67 |  |  |  |  |  | 0.7 |
| 95 | +15.83 |  |  |  |  |  | 0.7 |
| 96 | +16.00 |  |  |  |  |  | 0.7 |
| 97 | +16.17 |  |  |  |  |  | 0.7 |
| 98 | +16.33 |  |  |  |  |  | 0.6 |
| 99 | +16.50 |  |  |  |  |  | 0.6 |
| 100 | +16.67 |  |  |  |  |  | 0.6 |
| 101 | +16.83 |  |  |  |  |  | 0.6 |
| 102 | +17.00 |  |  |  |  |  | 0.6 |
| 103 | +17.17 |  |  |  |  |  | 0.6 |
| 104 | +17.33 |  |  |  |  |  | 0.6 |
| 105 | +17.50 |  |  |  |  |  | 0.6 |
| 106 | +17.67 |  |  |  |  |  | 0.6 |
| 107 | +17.83 |  |  |  |  |  |  |
| 108 | +18.00 |  |  |  |  |  |  |

FIG.29

```
FLASHMATIC   TABLE
AFZ    0  (99. 99m) = 107
AFZ    1  (60. 56m) = 107
AFZ    2  (30. 30m) =  95
AFZ    3  (20. 21m) =  88
AFZ    4  (15. 16m) =  83
AFZ    5  (12. 14m) =  79
AFZ    6  (10. 12m) =  76
AFZ    7  ( 8. 68m) =  73
AFZ    8  ( 7. 60m) =  71
AFZ    9  ( 6. 76m) =  69
AFZ   10  ( 6. 08m) =  67
AFZ   11  ( 5. 53m) =  66
AFZ   12  ( 5. 07m) =  64
AFZ   13  ( 4. 69m) =  63
AFZ   14  ( 4. 35m) =  61
AFZ   15  ( 4. 07m) =  60
AFZ   16  ( 3. 81m) =  59
AFZ   17  ( 3. 59m) =  58
AFZ   18  ( 3. 39m) =  57
AFZ   19  ( 3. 22m) =  56
AFZ   20  ( 3. 06m) =  55
AFZ   21  ( 2. 91m) =  55
AFZ   22  ( 2. 78m) =  54
AFZ   23  ( 2. 66m) =  53
AFZ   24  ( 2. 55m) =  52
AFZ   25  ( 2. 45m) =  52
AFZ   26  ( 2. 36m) =  51
AFZ   27  ( 2. 27m) =  50
AFZ   28  ( 2. 19m) =  50
AFZ   29  ( 2. 12m) =  49
AFZ   30  ( 2. 05m) =  48
AFZ   31  ( 1. 98m) =  48
AFZ   32  ( 1. 92m) =  47
AFZ   33  ( 1. 86m) =  47
AFZ   34  ( 1. 81m) =  46
AFZ   35  ( 1. 76m) =  46
AFZ   36  ( 1. 71m) =  45
AFZ   37  ( 1. 67m) =  45
AFZ   38  ( 1. 62m) =  44
AFZ   39  ( 1. 58m) =  44
AFZ   40  ( 1. 54m) =  44
AFZ   41  ( 1. 51m) =  43
AFZ   42  ( 1. 47m) =  43
AFZ   43  ( 1. 44m) =  42
AFZ   44  ( 1. 41m) =  42
AFZ   45  ( 1. 38m) =  42
AFZ   46  ( 1. 35m) =  41
AFZ   47  ( 1. 32m) =  41
AFZ   48  ( 1. 29m) =  40
AFZ   49  ( 1. 27m) =  40
AFZ   50  ( 1. 24m) =  40
AFZ   51  ( 1. 22m) =  39
AFZ   52  ( 1. 19m) =  39
AFZ   53  ( 1. 17m) =  39
```

```
AFZ  54 ( 1.15m) = 38
AFZ  55 ( 1.13m) = 38
AFZ  56 ( 1.11m) = 38
AFZ  57 ( 1.09m) = 38
AFZ  58 ( 1.07m) = 37
AFZ  59 ( 1.06m) = 37
AFZ  60 ( 1.04m) = 37
AFZ  61 ( 1.02m) = 36
AFZ  62 ( 1.01m) = 36
AFZ  63 ( 0.99m) = 36
AFZ  64 ( 0.98m) = 36
AFZ  65 ( 0.96m) = 35
AFZ  66 ( 0.95m) = 35
AFZ  67 ( 0.93m) = 35
AFZ  68 ( 0.92m) = 35
AFZ  69 ( 0.91m) = 34
AFZ  70 ( 0.89m) = 34
AFZ  71 ( 0.88m) = 34
AFZ  72 ( 0.87m) = 34
AFZ  73 ( 0.86m) = 33
AFZ  74 ( 0.85m) = 33
AFZ  75 ( 0.84m) = 33
AFZ  76 ( 0.83m) = 33
AFZ  77 ( 0.82m) = 32
AFZ  78 ( 0.81m) = 32
AFZ  79 ( 0.80m) = 32
AFZ  80 ( 0.79m) = 32
AFZ  81 ( 0.78m) = 32
AFZ  82 ( 0.77m) = 31
AFZ  83 ( 0.76m) = 31
AFZ  84 ( 0.75m) = 31
AFZ  85 ( 0.74m) = 31
AFZ  86 ( 0.73m) = 31
AFZ  87 ( 0.73m) = 30
AFZ  88 ( 0.72m) = 30
AFZ  89 ( 0.71m) = 30
AFZ  90 ( 0.70m) = 30
AFZ  91 ( 0.70m) = 30
AFZ  92 ( 0.69m) = 30
AFZ  93 ( 0.68m) = 29
AFZ  94 ( 0.67m) = 29
AFZ  95 ( 0.67m) = 29
AFZ  96 ( 0.66m) = 29
AFZ  97 ( 0.65m) = 29
AFZ  98 ( 0.65m) = 28
AFZ  99 ( 0.64m) = 28
AFZ 100 ( 0.64m) = 28
AFZ 101 ( 0.63m) = 28
AFZ 102 ( 0.62m) = 28
AFZ 103 ( 0.62m) = 28
AFZ 104 ( 0.61m) = 27
AFZ 105 ( 0.61m) = 27
```

FIG.31

| CONSTANT | |
|---|---|
| FALSE (RESET) | 0 |
| TRUE (SET) | 1 |
| P FLASH COMPUTATION MODE | 0 |
| REGULAR LIGHT COMPUTATION MODE | 1 |
| P COMPUTATION RESULT NON-SHIFT OK | 0 |
| P COMPUTATION RESULT SHIFT OK | 1 |
| P COMPUTATION RESULT OVER | 2 |
| P COMPUTATION RESULT UNDER | 3 |
| FL MODE IS NOT EXECUTED | 0 |
| FL MODE IS FORCIBLY EXECUTED | 1 |
| OFFSET | 4 |
| EV0 | 0 |
| EV3 | 18 |
| EV16 | 96 |
| LV_MAX | 108 |
| AV_F2_0 | 0 |
| AV_F22 | 42 |
| AV_STEP | 3 |
| TV_TIME EXPOSURE | 86 |
| TV_60SEC | 0 |
| TV_30SEC | 6 |
| TV_250 | 84 |
| LED_F1 | $F3 |
| LED_F0 | $FF |
| LED_O1 | $FB |
| LED_O0 | $FF |
| LED_U1 | $FE |
| LED_U0 | $FF |
| OVER_LEVEL | 12-1 |
| UNDER_LEVEL | 12+1 |
| APPROPRIATE DIAPHRAGM VALUE BY LIGHT ADJUSTMENT | 12 (F4.0) |

FIG.32

| CONSTANT |
|---|
| [ APERTURE VALUE FOR EXECUTION] |
| [ INPUT APERTURE VALUE] |
| [ CURRENT AFD ] |
| [ INPUT COMPENSATION VALUE] |
| [ HIGH SPEED LIMIT EXCESS FLAG ] |
| [ LOW SPEED LIMIT EXCESS FLAG] |
| [ FL FORCED FLAG] |
| [ EXPOSURE DEVIATION] |
| [ APPROPRIATE F VALUE FOR FLASH] |
| [ P COMPUTATION RESULT ] |
| [ CAMERA SHAKE SPEED] |
| [ LED FLICKERING SPEED] |
| [ EXECUTION SPEED] |
| [ CURRENT BRIGHTNESS] |
| [ INPUT SPEED] |
| [ P COMPUTATION FLASH MODE] |
| [ LED FLICKERING BIT] |
| [ APPROPRIATE DIAPHRAGM FOR FLASH] |
| [ LCD FLICKERING FLAG] |
| [ BEST SPEED ] |
| [ CURRENT MFZ] |
| [ CURRENT SENSITIVITY] |
| [ POWER SUPPLY DIAL POSITION] |
| [ P COMPUTATION FLASH MODE] |
| [ P COMPUTATION RESULT] |
| [ P COMPUTATION END FLAG] |
| [ [EXPOSURE DEVIATION X] ] |
| [ tv 0 ] ] |
| [ tv 1 ] ] |
| [ FLASHMATIC TABLE , x ]   $12*\log(6053/x+3)/100)/\log(2)+36$ |

FIG. 35

|  | [A]<br>F VALUE OF FLASH < F VALUE OF EXTERNAL LIGHT<br>(APPROPRIATE APERTURE VALUE FOR FLASH) (EXECUTION APERTURE VALUE) | [B]<br>F VALUE OF FLASH = F VALUE OF EXTERNAL LIGHT<br>(APPROPRIATE APERTURE VALUE FOR FLASH) (EXECUTION APERTURE VALUE) | [C]<br>F VALUE OF FLASH > F VALUE OF EXTERNAL LIGHT<br>(APPROPRIATE APERTURE VALUE FOR FLASH) (EXECUTION APERTURE VALUE) |
|---|---|---|---|
| [1] 1/250 | HIGH SPEED LIMIT EXCESS STOP | HIGH SPEED LIMIT EXCESS STOP | HIGH SPEED LIMIT EXCESS STOP |
| [2] 1/60 ~ 1/250 | OPEN | OK | STOP |
| [3] 1/15 ~ 1/60 | OPEN | OK | VARIABLE APERTURE OK |
| [4] ~ 1/15 | OPEN LOW SPEED LIMIT EXCESS | OPEN LOW SPEED LIMIT EXCESS | OPEN LOW SPEED LIMIT EXCESS |

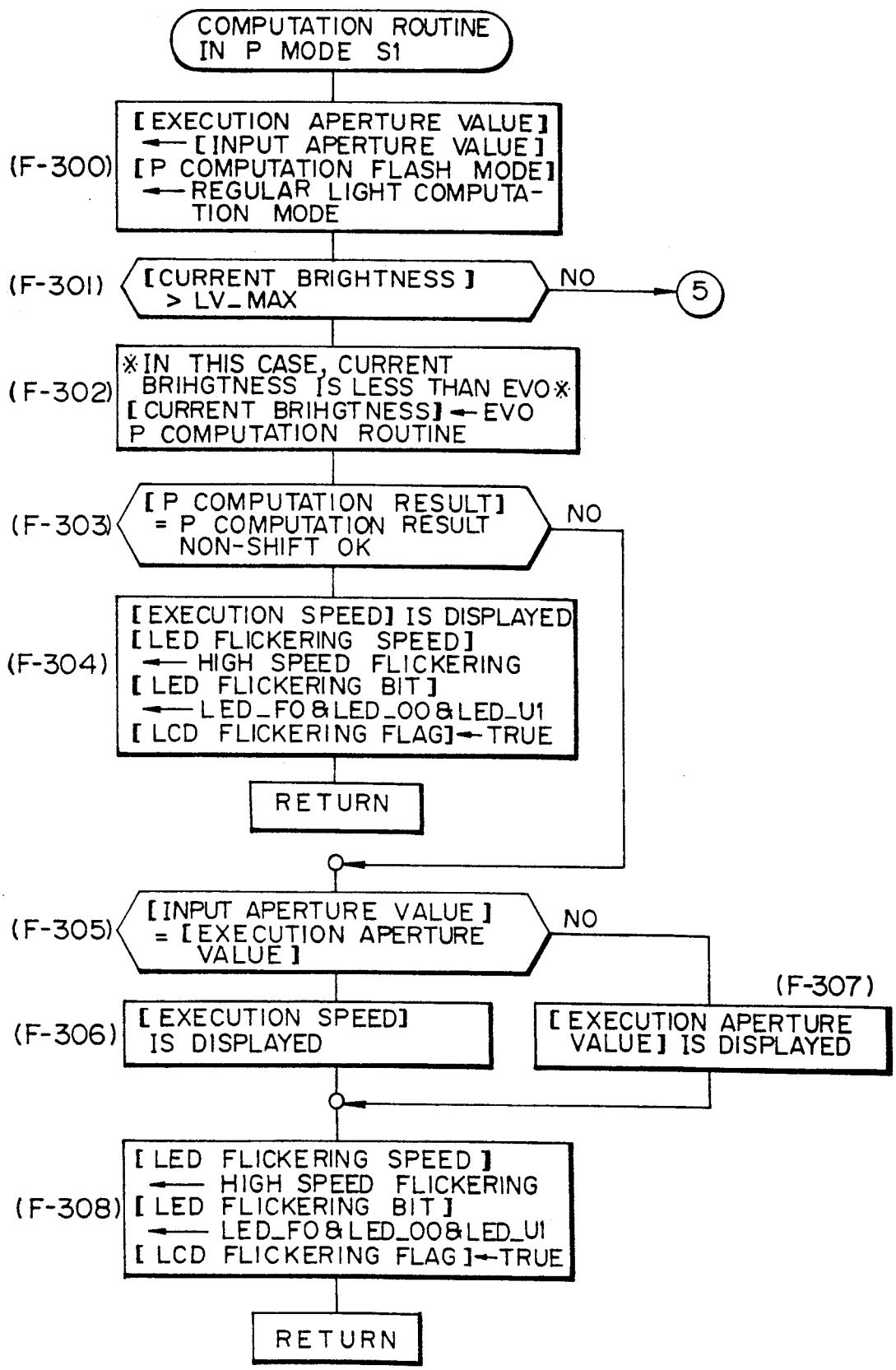

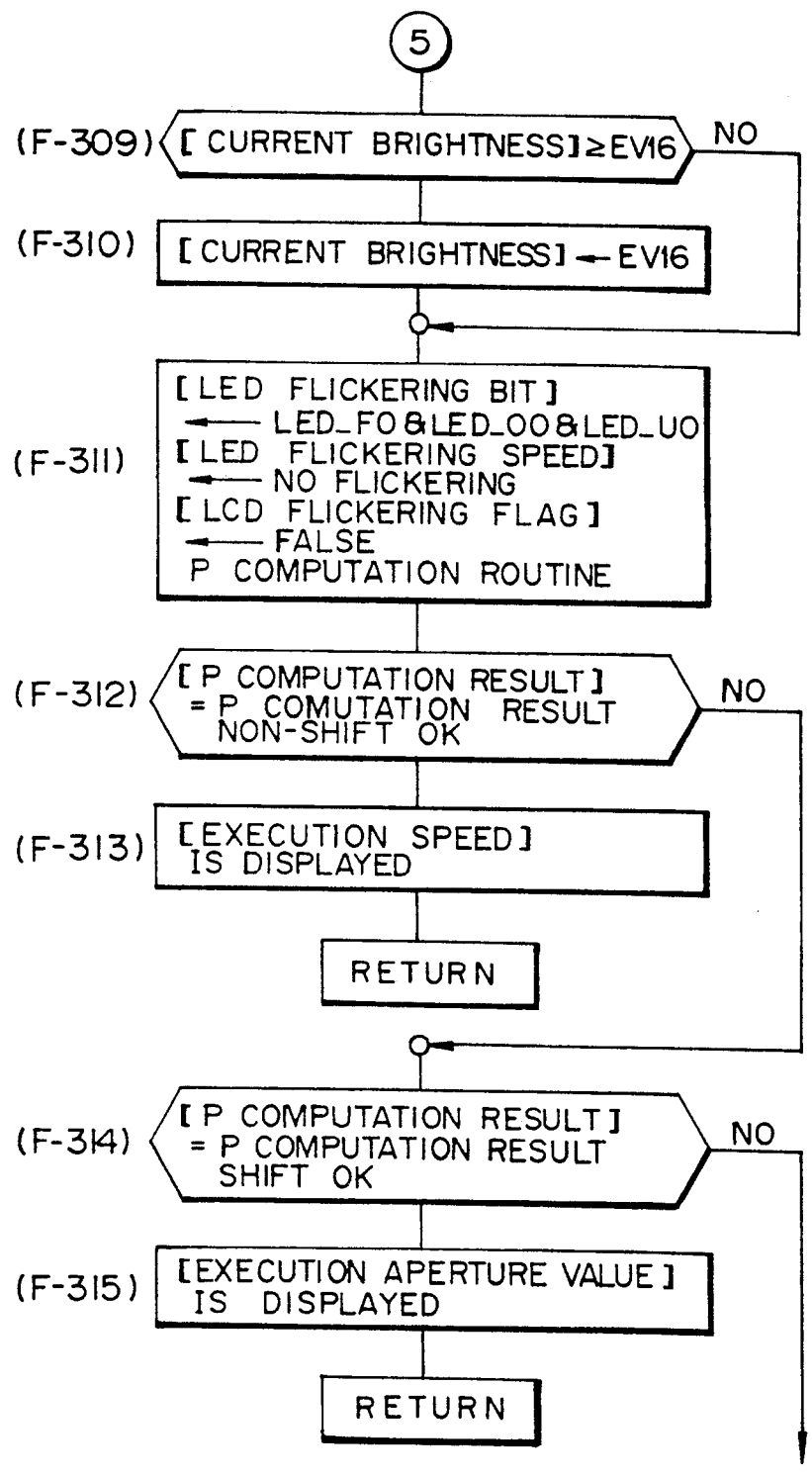

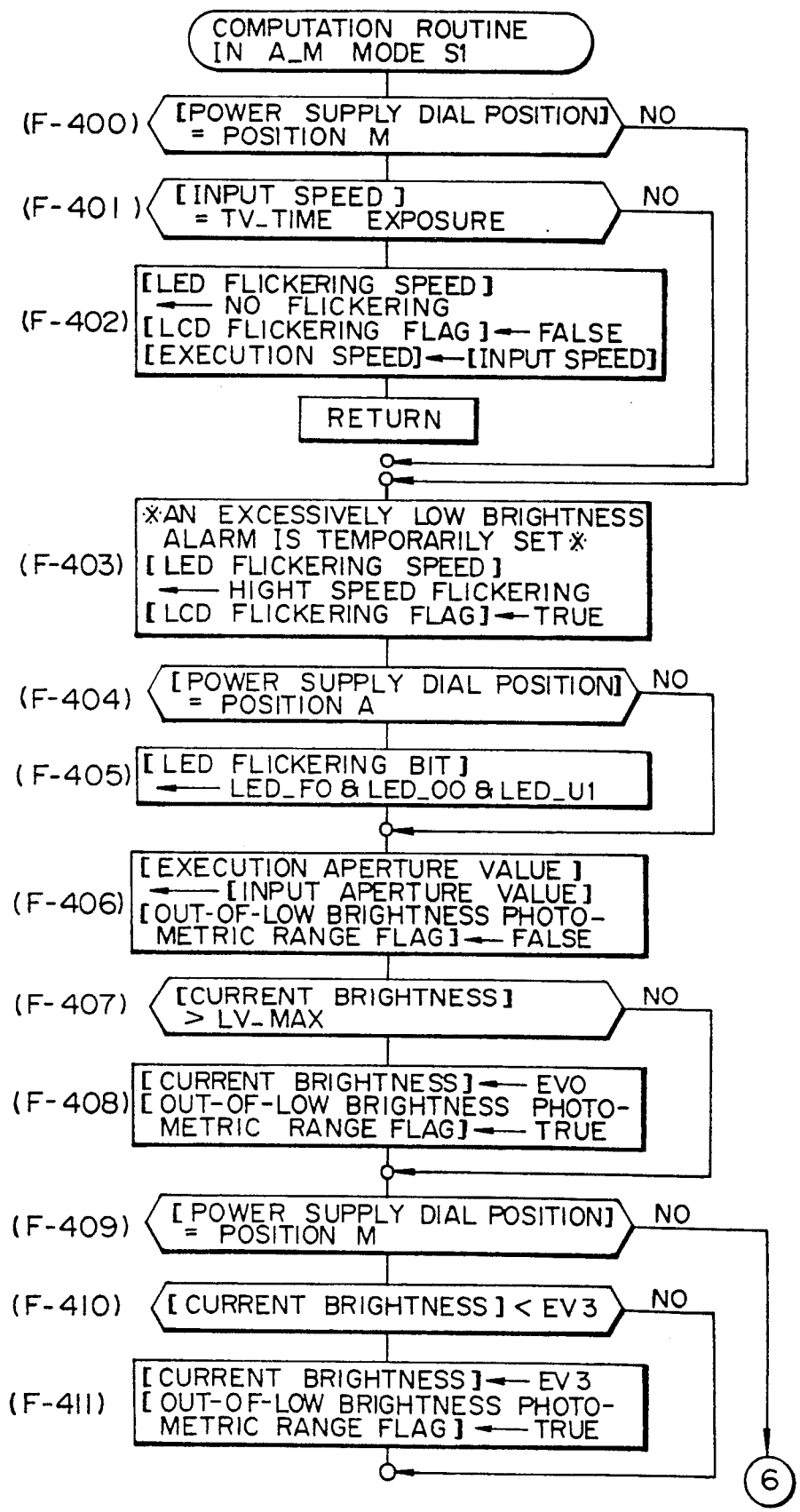

FIG. 39B

FROM FIG. 39A
↓

(F-508)
```
※THE APERTURE IS OPENED SINCE IT
  IS FARTHER THAN A RANGE AVAIL-
  ABLE FOR SYNCHRONIZATION※
※IN OTHER WORDS, TO BE CONT-
  ROLLED WITH [APPROPRIATE APER-
  TURE FOR FLASH]※
[LED FLICKERING SPEED]
  ← NO FLICKERING
[LED FLICKERING BIT]
  ← LED_U0 & LED_O0
[LCD FLICKERING FLAG] ← FALSE
※APPROPRIATE F VALUE FOR FLASH
  IS FORMALIZED※
[APPROPRIATE APERTURN FOR FLASH]
  ← int (([APPROPRIATE APERTURE
    FOR FLASH]+1)/3)×3
```
↓
RETURN

⑨
↓

(F-509)
```
※UP TO NOW, IT IS KNOWN THAT
  SYNCHRONIZATION IS POSSIBLE OR
  THE APERTURE SHOULD BE STOPPED
  MORE THAN [APPROPRIATE APERTURE
  FOR FLASH]
  a ← [SYNCHRONIZATION MAXIMUM GN]
      +[CURRENT SENSITIVITY]
```

(F-510) ⟨ a ← [gv0] ⟩ —NO→

(F-511)
```
※COMPUTATION OF [APPROPRIATE APER-
  TURE FOR FLASH] WITH SYNCHRO-
  NIZATION MAXIMUM GN※
[APPROPRIATE APERTURE FOR FLASH]
  ← a - [gv0]
```

(F-512) ⟨ [APPROPRIATE APERTURE FOR FLASH] > AV_F22 ⟩ —NO→

(F-513)
```
※OVER WITH SYNCHRONIZATION MAXI-
  MUM GN & MINIMUM APERTURE※
[LED FLICKERING SPEED]
  ← HIGH SPEED FLICKERING
[LED FLICKERING BIT]
  ← LED_U0 & LED_01
[LCD FLICKERING FLAG] ← TRUE
[APPROPRIATE APERTURE FOR FLASH]
  ← AF_F22
```
↓
RETURN

TO FIG. 39C
TO FIG. 39C

FIG.39C (F-514): [APPROPRIATE APERTURE FOR FLASH] > [APPROPRIATE APERTURE FOR SYNCHRONIZATION] — NO (F-515):
✻IF APPROPRIATE APERTURE FOR FALSH] IS LARGER THAN THE SYNCHRONIZATION F VALUE IN SYNCHROZATION GN OR THE RANGE IS LONGER THAN THE RANGE AVAILABLE FOR SYNCHRONIZATION, THE APERTURE IS STOPPED. IN SHORT, IT IS CONTROLLED WITH [APPROPRIATE APERTURE FOR FLASH]✻
[LED FLICKERING SPEED] ← NO FLICKERING
[LED FLICKERING BIT] ← LED_UO & LED_OO
[LCD FLICKERING FLAG] ← FALSE
✻APPROPRIATE F VALUE FOR FLASH IS FORMALIZED✻
[APPROPRIATE APERTURE FOR FLASH] ← int(([APPROPRIATE APERTURE FOR FLASH] + 1)/3)×3

RETURN (F-516):
✻UP TO NOW, IT IS KNOWN THAT APERTURE NEED NOT BE OPENED LARGER THAN THE SYNCHRONIZATION F VALUE OR STOPPED, THAT IS, SYNCHRONIZATION IS POSSIBLE WITH [APPROPRIATE APERTURE FOR SYNCHRONIZATION]✻
[LED FLICKERING SPEED] ← NO FLICKERING
[LED FLICKERING BIT] ← LED_UO & LED_OO
[LCD FLICKERING FLAG] ← FALSE
[APPROPRIATE APERTURE FOR FLASH] ← [APPROPRIATE APERTURE FOR SYNCHRONIZATION]

RETURN

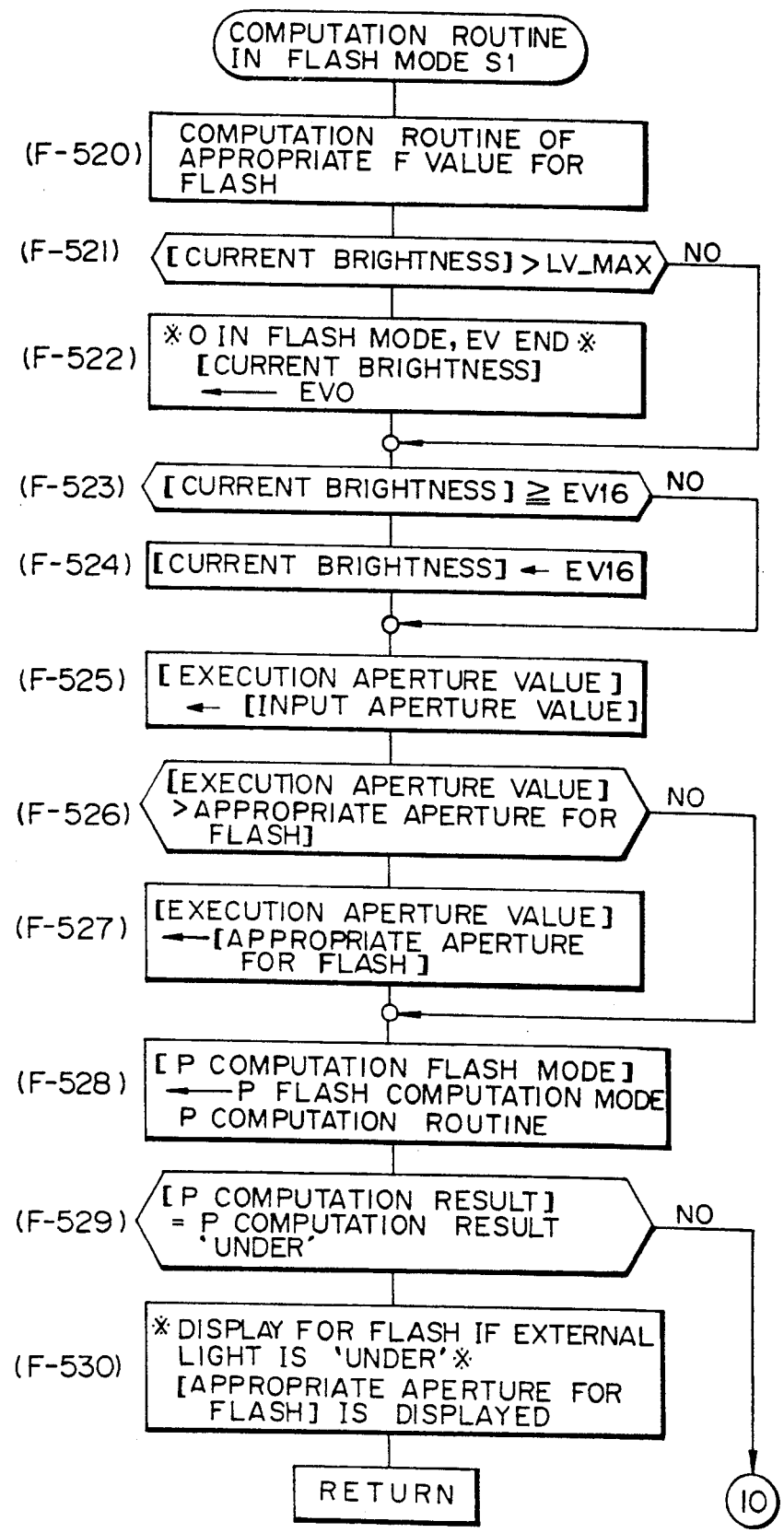

| CONSTANT | |
|---|---|
| Fconv [ 0] | 0 |
| Fconv [ 3] | 3 |
| Fconv [ 6] | 3 |
| Fconv [ 9] | 9 |
| Fconv [12] | 9 |
| Fconv [15] | 15 |
| Fconv [18] | 15 |
| Fconv [21] | 21 |
| Fconv [24] | 21 |
| Fconv [27] | 21 |
| Fconv [30] | 21 |
| Fconv [33] | 21 |
| Fconv [36] | 36 |
| Fconv [39] | 36 |
| Fconv [42] | 36 |
| theory64sec [ 0 ] | 64000000 $\mu$sec |
| theory64sec [ 1 ] | 57017517 $\mu$sec |
| theory64sec [ 2 ] | 50796833 $\mu$sec |
| theory64sec [ 3 ] | 45254833 $\mu$sec |
| theory64sec [ 4 ] | 40317473 $\mu$sec |
| theory64sec [ 5 ] | 35918785 $\mu$sec |
| tv125to250 count [ 0 ] | 0 |
| tv125to250 count [ 1 ] | 2 |
| tv125to250 count [ 2 ] | 3 |
| tv125to250 count [ 3 ] | 4 |
| tv125to250 count [ 4 ] | 5 |
| tv125to250 count [ 5 ] | 6 |
| tv125to250 count [ 6 ] | 6 |
| TV_15 | 60 |
| TV_125 | 78 |
| TV_250 | 84 |

FIG. 50

| CONSTANT | |
|---|---|
| (VALUES TO BE STORED IN EEPROM FOR EACH CAMERA) | |
| eepromT125 [ 0 ] | 2336 μsec |
| eepromT125 [ 3 ] | 3872 μsec |
| eepromT125 [ 9 ] | 5568 μsec |
| eepromT125 [ 15 ] | 5760 μsec |
| eepromT125 [ 21 ] | 5792 μsec |
| eepromT125 [ 36 ] | 5632 μsec |
| eepromT256 [ 0 ] | 624 μsec |
| eepromT256 [ 3 ] | 504 μsec |
| eepromT256 [ 9 ] | 288 μsec |
| eepromT256 [ 15 ] | 320 μsec |
| eepromT256 [ 21 ] | 312 μsec |
| eepromT256 [ 36 ] | 352 μsec |
| eepromAED2 | 60160 μsec |

FIG. 51

CONSTANT

T50MSEC = 50

[ NOISE MODE ABORT TIME TABLE, OTH ] = 350/T50MSEC ※ IN AUTO LOAD
[ NOISE MODE ABORT TIME TABLE, 1ST ] = 1000/T50MSEC ※ FORWARD ROTATION & REVERSING OF 2 FRAMES
[ NOISE MODE ABORT TIME TABLE, 2ND ] = 4000/T50MSEC ※ UNDER REWINDING
[ NOISE MODE ABORT TIME TABLE, 3RD ] = 1000/T50MSEC ※ SHORTLY BEFORE END OF REWINDING

[ SILENT MODE ABORT TIME TABLE, OTH ] = 900/T50MSEC ※ IN AUTO LOAD
[ SILENT MODE ABORT TIME TABLE, 1ST ] = 2500/T50MSEC ※ FORWARD ROTATION & REVERSING OF 2 FRAMES
[ SILENT MODE ABORT TIME TABLE, 2ND ] = 9950/T50MSEC ※ UNDER REWINDING
[ SILENT MODE ABORT TIME TABLE, 3RD ] = 2500/T50MSEC ※ SHORTLY BEFORE END OF REWINDING

NON-DX AUTOLOAD MODE                              = $00
1 FRAME MODE TAKEUP                               = $11
FORWARD WAY IN CASE OF 2 FRAMES                   = $21
BACKWARD WAY IN CASE OF 2 FRAMES                  = $32
SHORTLY BEFORE END OF REWINDIND                   = $42
UNDER REWINDING                                   = $53

ABORT TIME TABLE MASK                             = $03

FIG.52

| VARIABLE | |
|---|---|
| s | STACK POINTER OF MICROCOMPUTER |
| a | WORK VARIABLE |
| x | WORK VARIABLE |
| WMODE | WORK VARIABLE |
| [ AEB STEP ] | AEB-ZERO 2 4 6 8 10 12 |
| [ CURRENT TEMPERATURE ] | COLD HOT NORMAL WARM |
| [ REWIND FLAG WHILE POWER IS OFF ] | FALSE TRUE |
| [ LIQUID CRYSTAL FLICKERING COUNTER ] | INTEGER |
| [ CURRENT ISO SENSITIVITY ] | INTEGER |
| [ CURRENT SSP POSITION ] | INTEGER |
| [ CURRENT NUMBER OF EXPOSED FRAMES ] | INTEGER |
| [ STACK POINTER OF MASTER ROUTINE ] | STACK POINTER |
| [ MULTIPLE EXPOSURE COUNTER ] | INTEGER |
| [ POWER SWITCH POSITION ] | OFF P A M |
| [ SILENT RETRY FLAG ] | FIRST , SECOND |
| [ SILENT MODE FLAG ] | FALSE , TRUE |
| [ CURRENT TAKEUP MODE ] | NON-DX AUTOLOAD MODE 1 FRAME MODE TAKEUP FORWARD WAY IN CASE OF 2 FRAMES BACKWARD WAY IN CASE OF 2 FRAMES SHORTLY BEFORE END OF REWINDING UNDER REWINDING |

TO FIG.53E

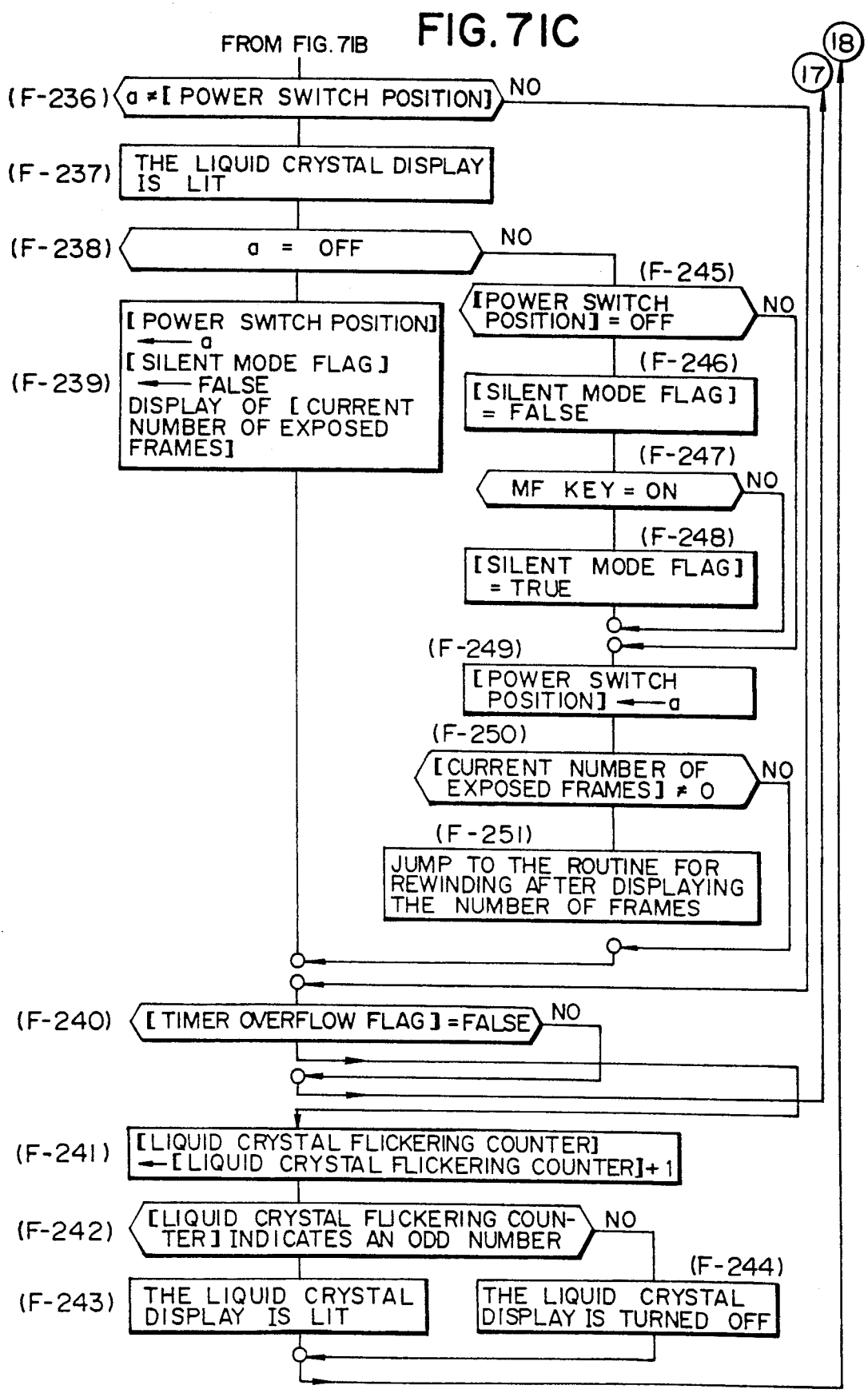

ELECTRONIC CAMERA

BACKGROUND OF THE INVENTION

1. Field of the Invention

The present invention relates to an electronic camera, more particularly a camera in which rewinding of a film is electrically carried out and an aperture is operated independent of a shutter.

2. Description of the Prior Art

When rewinding of a film is stopped with an leader end of the film remained a little outside a film cartridge for a specified time in rewinding of the film and a camera back is opened during this specified time, the film cartridge with the leader end of the film remained a little outside the film cartridge can be taken out from the camera body and, when the specified time has passed without opening the camera back during counting this specified time, rewinding of the film is carried out, rewinding of the film is stopped after the leader end of the film is completely retracted into the film cartridge and the film cartridge into which the leader end of the film has been completely retracted can be taken out from the camera.

Conventionally, this type of film rewinding apparatus which has been proposed is disclosed in the Examined Patent Publication No.60890-1988 (hereafter referred to as "Publication A" and the Unexamined Patent Publication No.232433 (hereafter referred to as "Publication B.").

In case of film rewinding operation by the system disclosed in Publication A, if the film is completely used (the film is taken up to the final frame), the film is rewound until the film is completely rewound into the cartridge and, if halfway rewinding operation is carried out when the film is not yet completely used (the film is not taken up to the final frame) so that the film which has been used with a certain length of the remaining part is temporarily replaced with another film and subsequently the film can be easily drawn out when using it later, rewinding is stopped with the leader end of the film kept drawn out of the cartridge.

In case of the system disclosed in Publication B, an operating member is provided outside the camera body which allows to select a mode in which rewinding is stopped after the film is rewound until the film is completely rewound into the cartridge or a mode in which rewinding is stopped with the leader end of the film kept drawn out of the cartridge by changing over this operating member.

Accordingly, in case of the system disclosed in Publication A, the film is completely rewound into the cartridge after the film is completely used. For example, in the developing process of the film by the photographer himself, it is troublesome to draw out the leader end of the film from the cartridge chamber and it will be necessary to draw out the leader end of the film even when the film has been completely used (up to the final frame of the film has been exposed).

In case of the system disclosed in Publication B, it is necessary to provide an operating member and switches for selecting whether or not the leader end of the film should be kept drawn out of the cartridge when rewinding the film and it is difficult for a beginner of photography to determine the above selection. In addition, this system is disadvantageous in that the operation is troublesome and the construction of the camera is complicated.

Moreover, in case of a camera provided with a lens shutter and an aperture which operates independent of the lens shutter, the opening and closing time of the shutter need be changed in accordance with the diameter of the aperture when executing the photography at the specified shutter speed.

Conventionally, in case of a camera provided with the lens shutter and the aperture independent of the shutter, the exposure control has been carried out at a single opening and closing time regardless of the diameter of the aperture when executing photography at a certain shutter speed.

In this case, if the shutter speed is higher to some extent, the shutter speed becomes slower along with stopping down of the aperture even though the shutter opening and closing time is the same for each exposure and therefore there has been proposed a camera which compensates the exposure by stopping down the aperture to be smaller as much as slowing down of the shutter speed than the specified diameter.

Accordingly, in case of a camera which control the exposure with an aperture having an accurate diameter and a single shutter opening and closing time, the shutter speed is gradually slowed down along with stopping down of the aperture as the shutter speed is higher though a substantially accurate shutter speed is obtained as far as the shutter speed is within a range of low speed.

As shown in, for example, FIGS. 73 and 74, the shutter speed with the minimum aperture of F22 as shown in FIG. 74 is slower than he shutter speed with the open aperture of F2.0 as shown in FIG. 73 even at the same shutter opening and closing time. Therefore, it has been unable to obtain an appropriate exposure in high speed shutter operation.

On the other hand, in case of a camera which compensates the exposure by stopping down the aperture to be smaller as much as slowing down of the shutter speed than the specified diameter, a disadvantage that the shutter speed is slow even though an appropriate exposure is obtained for a combination of the specified aperture and shutter speed in the range of high shutter speed has not been eliminated and therefore there has been a problem that a blur of a subject would be caused and an error of compensation would appear in the range of low shutter speed.

SUMMARY OF THE INVENTION

The first object of the present invention made in view of the above finding is to provide an electronic camera which allows a photographer to select as required whether or not an leader end of a film should be kept drawn out of a film cartridge by a simple operation based on a simple construction.

The second object of the present invention is t provide an electronic lens shutter type camera capable of accurately executing exposure at all shutter speeds from a low speed range to a high speed range even when any level of aperture is selected.

To achieve the above described first object, the first configuration according to the present invention provides an electronic camera which is provided with a film rewinding apparatus which comprises film rewinding means for rewinding a film, film detection means provided in a film passage to detect the presence of the film, a timer for counting a specified time, stop means for stopping a film rewinding operation, a camera back which opens and closes an opening of a camera body for mounting a film cartridge, open camera back detection means for detecting that the camera back is opened, and film rewind control means which starts counting of the specified time by the timer and simultaneously stops rewinding of the film by the stop means when the film detection means detects that there is no film during rewinding of the film, inhibits subsequent rewinding of the film while the leader end of the film is kept drawn out of the film cartridge when the open camera back is detected during counting of the specified time, resume rewinding of the film when counting of the specified time is finished while the open camera back is not detected during counting of the specified time and stops rewinding of the film when the leader end of the film is rewound into the film cartridge.

To achieve the above described second object, the second configuration according to the present invention provides an electronic camera provides an electronic camera which is provided with a photographic lens, a shutter provided nearby the photographic lens, an aperture provided nearby the photographic lens and operated to open and close independent of the shutter, shutter speed setting means for setting a shutter speed of the shutter at the time of exposure, shutter open/close time determining means for determining an open/close time of the shutter which meets an amount of exposure light in response to a diameter of the aperture and a shutter speed set by the shutter speed setting means, and shutter open/close control means for controlling opening and closing of the shutter in an open/close time determined by the shutter open/close time determining means.

An electronic camera of the above described first configuration allows to stop rewinding of the film with its leader end kept drawn out a little out of the film cartridge for a specified time, enable to take out the film cartridge with the leader end of the film remaining drawn out a little from the film cartridge and inhibits subsequent rewinding of the film when the camera back is opened during the specified time, resume rewinding of the film after lapse of the specified time if the camera back is not opened during the above specified time and stop rewinding of the film after the film is completely rewound into the film cartridge. Accordingly, a state that the leader end of the film is kept drawn out of the cartridge or a state that the leader end of the film is stored inside the cartridge can be selected by a photographer at his decision with a camera back opening operation (for taking out the film) during the specified time in rewinding of the film and therefore the electronic camera of the present invention is advantageous in that no additional provision of special operating parts and switches is required.

On the other hand, an electronic camera of the above described second configuration allows the shutter open/close time determining means to determine a shutter open/close time which meets an amount of exposure light in response to the diameter of the aperture and the shutter speed set by the shutter speed setting means.

The shutter open/close control means allows exposure at an accurate shutter speed in the range of all high to low shutter speeds regardless of setting of the aperture diameter by controlling opening and closing of the shutter in an open/close time determined by the shutter open/close time determining means. In other words, the exposure is carried out with an appropriate amount of exposure light which meets the aperture diameter and the shutter speed which relate to the setting. The shutter is controlled in a shutter open/close time in accordance with the set shutter speed and aperture value and therefore the electronic camera of this configuration provides an advantage that an accurate shutter speed can be realized in combinations of all aperture values and shutter speeds.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIG. 17 is a diagram sowing the exposure display when the release button is lightly pressed in the program mode.

FIG. 27 is a diagram showing the control values to be used by the microcomputer in respective routines for determining photographic conditions, FIG. 28 is a diagram showing the continuation of FIG. 27, FIG. 29 is a diagram showing the Flashmatic table, FIG. 30 is a diagram showing the continuation of FIG. 29, FIG. 31 is a diagram showing the constants to be used by the microcomputer to be used in respective routines for determining photographic routines, FIG. 32 is a diagram showing the variables to be used by the microcomputer in respective routines for determining photographic conditions, FIG. 35 is a diagram describing the aperture change control to avoid under-exposure and over-exposure in the variable aperture synchronized photography, FIGS. 36A to 36C are respectively a flow chart showing a routine in the P mode S1, FIGS. 37A to 37D are respectively a flow chart showing a computation routine in the A—M mode S1, FIGS. 39A to 39C are respectively a flow chart showing a computation routine for an approximate F value of the flash, FIGS. 40A to 40B are respectively a flow chart showing a computation routine in the flash mode S1, FIGS. 41A to 41B are respectively a flow chart showing a the PUSH-S1 routine, FIG. 49 is a table for obtaining the theoretical time-in-second corresponding to the aperture and the shutter speed which are related to settings, FIG. 50 is a table for compensating the theoretical time-in-second obtained according to FIG. 60, FIG. 51 is a diagram showing the constants to be used by the microcomputer in respective routines related to forwarding of the film, FIG. 52 is a diagram showing the variables to be used by the microcomputer in respective routines related to forwarding of the film, FIGS. 71A to 71C are respectively a flow chart showing the routine for waiting S1 or opening of the camera back.

DETAILED DESCRIPTION OF THE PREFERRED EMBODIMENTS

An embodiment of the present invention is described below, referring to the accompanying drawings whereof:

1. General View of the Camera

Figure 1:
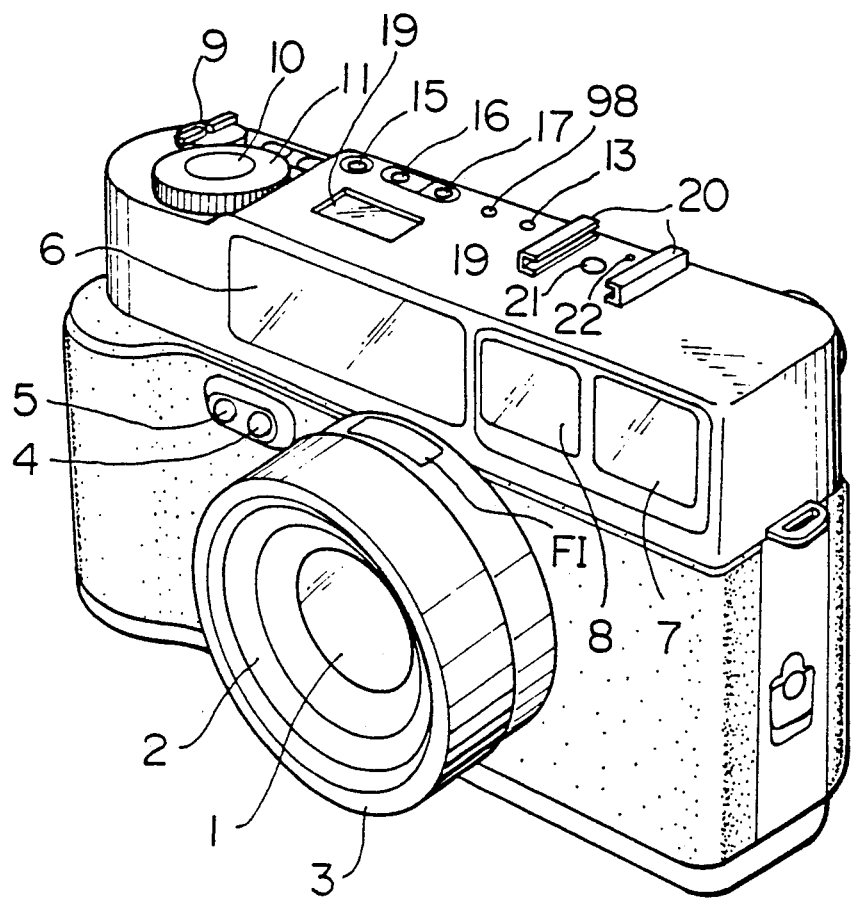
FIG. 1 is a general view of an electronic camera as viewed perspectively from its front side.
Figure 2:
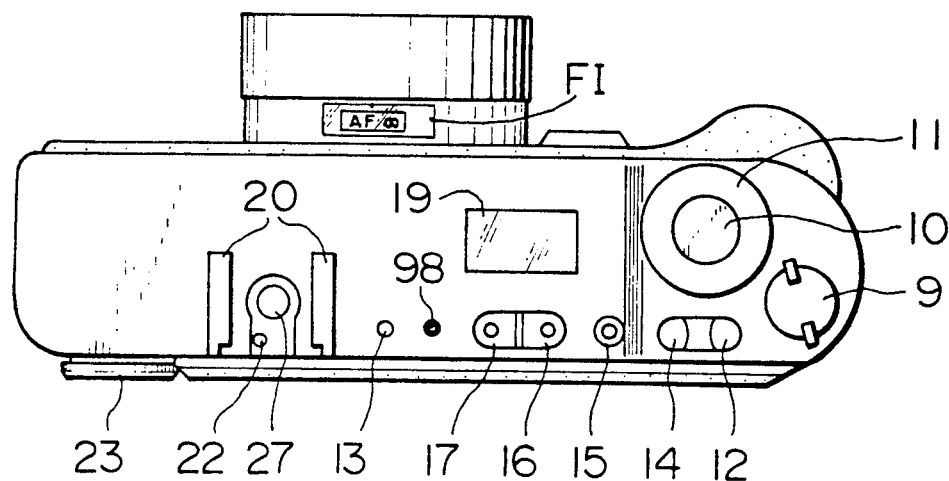
FIG. 2 is a general view of an electronic camera shown in FIG. 1.
Figure 3:
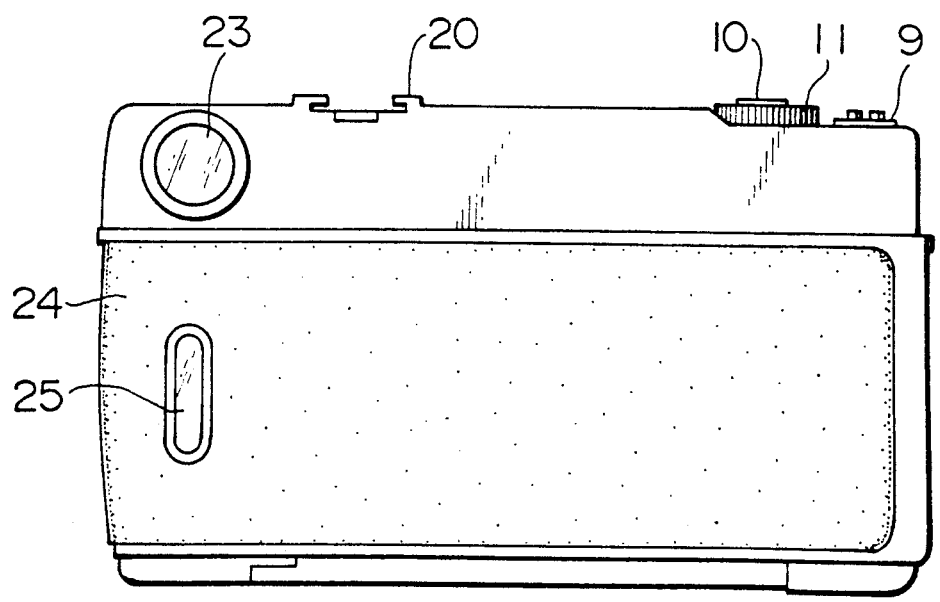
FIG. 3 is a general view of an electronic camera shown in FIG. 1 as viewed from its rear side.

FIGS. 1, 2 and 3 are respectively a general view of an electronic camera in accordance with an embodiment as viewed from the front side perspectively, upper side and rear side.

As shown in FIG. 1, a photographic lens 1, a barrel 2 which holds the photographic lens 1 to be slidable in the direction of an optical axis, a lens hood 3 which presents an unnecessary light from outside an image angle of the lens from entering into the photographic lens 1, a metering window 4, a self-timer indicator 5, an auto focusing window 6, a viewfinder 7 and a viewfinder light introducing window 8 are provided at the front side of the camera. As shown in FIG. 2, a main dial 9 for selecting the OFF mode which inhibits a photo graphic mode (P mode, M mode and A mode) and an operation of the camera, a shutter or release button 10, an aperture setting dial 11, an up button 12, a down button 14, a self-timer start button 15, a manual focus (MF) button 16, a select button 17, an infrared mode setting button 13, a display (liquid crystal) panel 19, an accessary shoe 20, an X contact 21, and a contact 22 for receiving a charging end signal are provided at the upper part of the camera. As shown in FIG. 3, a viewfinder eyepiece window 23, a camera back 24 and a film check window 25 are provided at the rear part of the camera. Though not shown, a camera back open/close detection switch 99 which turns on and off when the camera back 24 is opened and closed is provided inside the camera back 24 are provided at the rear part of the camera.

The barrel 2 is provided with a focusing indicator 2a to display the distance information corresponding to a focal position of the photographic lens 1.

Though not shown, a rewindless switch 98 is provided at an upper left part of the film cartridge chamber and a film sensitivity detection pin 97 for reading the DX code information of the film cartridge at the right side of the film cartridge chamber.

Figure 4:
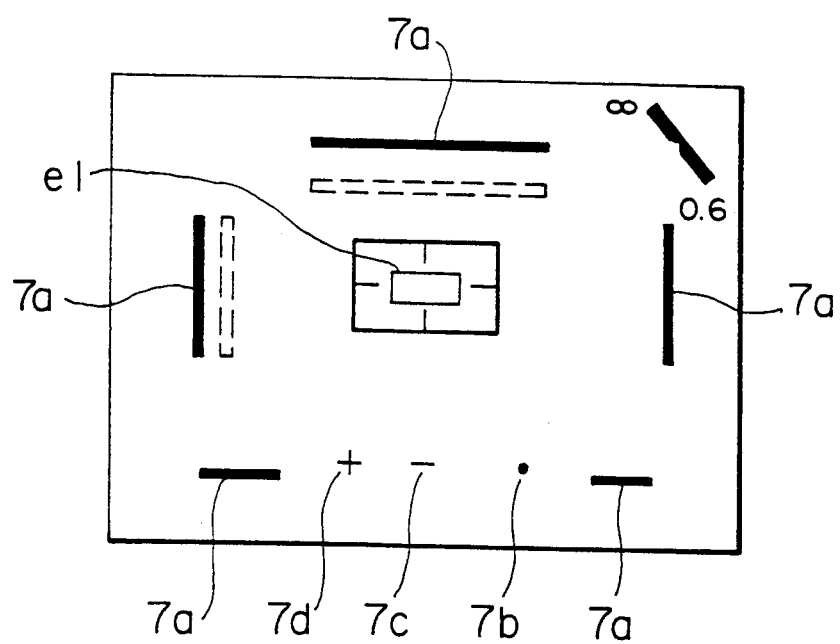
FIG. 4 is a diagram showing the details of a display in the viewfinder.

A subject can be visually identified as a normal image through the viewfinder 7. In the viewfinder, the field frame 7a showing the photographable distance, the metering target mark 7f and the focal position display mark 7e are displayed as shown in FIG. 4. In addition, in the viewfinder 7, the metering mark 7b, the under-exposure alarm mark 7c and the over-exposure alarm mark 7d are displayed as required with LEDs. Inside the viewfinder light introducing window 8, the field frame plate which is provided in the shape of the field frame 7a showing the photographic range is provided, and the field frame 7a and the metering target mark e1, as shown in FIG. 5, can be visually identified with a light passing through this field frame plate.

2. Shutter Drive Mechanism

Figure 5:
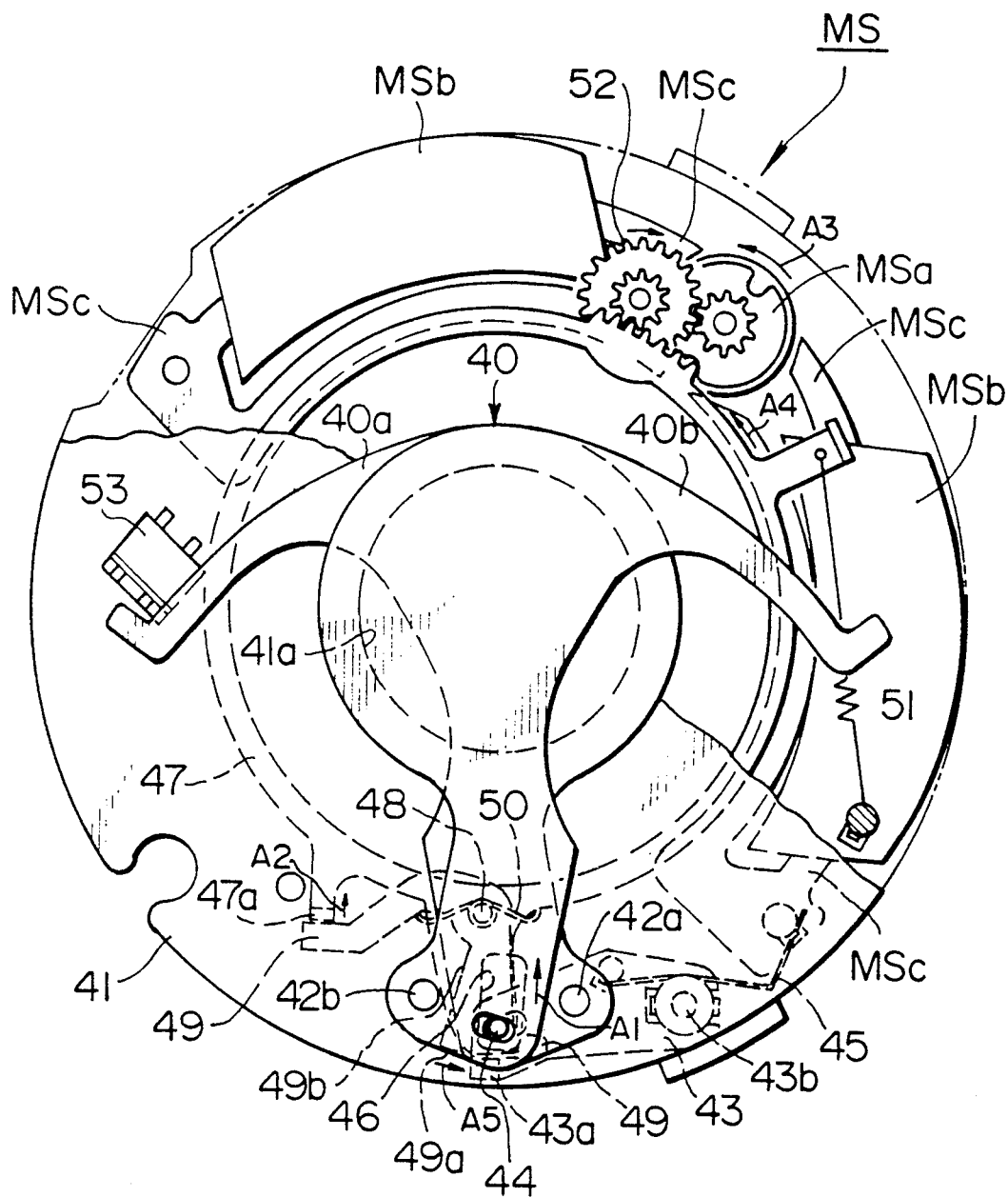
FIG. 5 is a front view of the shutter mechanism which is closed.

FIG. 5 is a front view of the shutter mechanism which is closed and the shutter mechanism is provided with two shutter blades 40 (40a and 40b) as shown. Two shutter blades 40 are supported by the stays 42 (42a and 42b) fitted to the shutter base plate 41 and the open/close lever 43. The opening 41a is formed in the shutter base plate 41. The open/close lever 43 is fitted to the rear surface of the shutter base plate 41 as viewed from the front side of the camera while being energized in the clockwise direction (arrow direction A1) around the shaft 43b by the spring 45 to cause the pin 44 to be protruded from the oval hole 46 formed in the shutter base plate 41, thus supporting two shutter blades 40 fitted to the surface as viewed from the front side as viewed from the front side.

An engaging lever 49 which is pivoted with the pin 48 is fitted to a shutter drive ring 47 which rotates around the optical axis. The engaging lever 49 energized in a clockwise direction (the direction shown with arrow A2) by a spring 50 and adapted so that its one end comes in contact with a projection 47a of the shutter drive ring 47. When the shutter blades 40 are closed, an engaging portion 49a of the engaging lever 49 engages with an engaging member 43a of the open/close lever 43 when the shutter blades are closed. The shutter drive ring 47 is energized in a direction where the shutter blades 40 are closed by the spring 51.

The shutter drive motor MS is a stepping motor which is formed in a shape of horseshoe and fixed to the shutter base plate 41. The shutter drive motor MS has a rotor MSa, coil MSb and core MSc and the rotation of the rotor MSa is transmitted to the shutter drive ring 47 through a gear 52.

Opening and closing operations of the shutter are described below.

Figure 6:
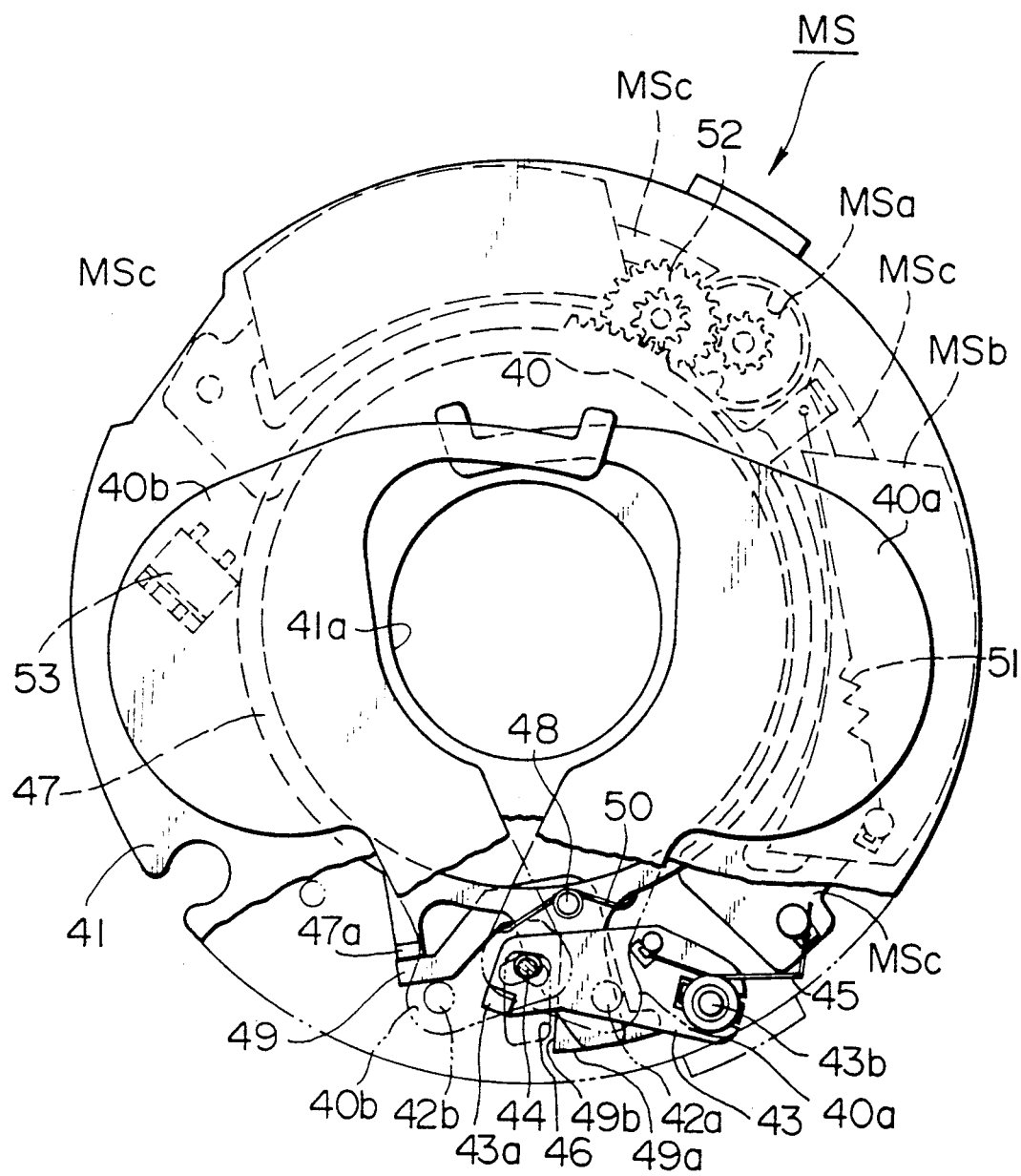
FIG. 6 is a front view of the shutter mechanism which is opened.

When the rotor MSa of the shutter drive motor MS is rotated counterclockwise (in the direction shown with arrow A3) as shown in FIG. 5 for opening the shutter while the shutter blades 40 are closed, the shutter drive ring 47 rotates counterclockwise (in the direction shown with arrow A4). In this case, the engaging lever 49 also rotates counterclockwise (in the direction shown with arrow A5) together with the shutter drive ring 47. This rotation causes the engaging portion 49a of the engaging lever 49 to be disengaged from the engaging member 43a of the open/close lever 43 and simultaneously the open/close lever 43 is quickly rotated clockwise (in the direction of arrow A1) by an action of the spring 45 and stopped when the pin 44 comes in contact with an end nearby the lens of the oval hole 46. Thus, when the open/close lever 43 is rotated toward the lens, two shutter blades 40 respectively rotate clockwise and counterclockwise around the pivots 42a, 42b to be opened as shown in FIG. 6.

For closing the shutter, the rotor MSa of the shutter drive rotor MS is rotated clockwise (in the direction of arrow A3) contrary to the shutter opening operation. When the rotor MSa is rotated clockwise (in the direction opposite to arrow A3), the shutter drive ring 47 rotates clockwise (in the direction opposite to arrow A4). In this case, the engaging lever 49, which is pivoted to the shutter drive ring 47 with the pin 48, rotates clockwise (in the direction opposite to arrow A5) together with the shutter drive ring 47. A sloped portion 49b of the the engaging lever 49 comes in contact with the engaging member 43a of the open/close lever 43 and, if the shutter drive ring 47 is kept further rotated, the engaging member 43a is frictionally moved down along the sloped portion 49b whereby the shutter blades are closed. The engaging member 43a moves from the sloped portion 49b to the engaging portion 49a of the engaging lever 49 while keeping a frictional contact and engages with the engaging portion 49a. In this case, the engaging lever 49 is released from the control by the engaging member 43a and rotated clockwise around the pin 48 as the pivot by the action of spring 50, one end of the engaging lever 49 comes in contact with the projection 47a of shutter drive ring 47, then the rotation of the engaging lever 49 is stopped. The open/close lever 43 is forced by the spring 45 to be rotated clockwise and the pin 44 moves up to open the shutter blades 40. Under this condition, the engaging member 43a is engaged with the engaging portion 49a and therefore the movement of the pin 44 is restricted to hold the shutter blades closed.

A photo-reflector 53 outputs a shutter open/close signal (pulse signal) ST, which is described later, when an L-shaped extreme end part of each of the shutter blades 40 passes thereby and the pulse indicating "shutter close" is outputted at a timing when a pin hole is formed shortly before the shutter blades ar completely closed.

3. Aperture Drive Mechanism

Figure 7:
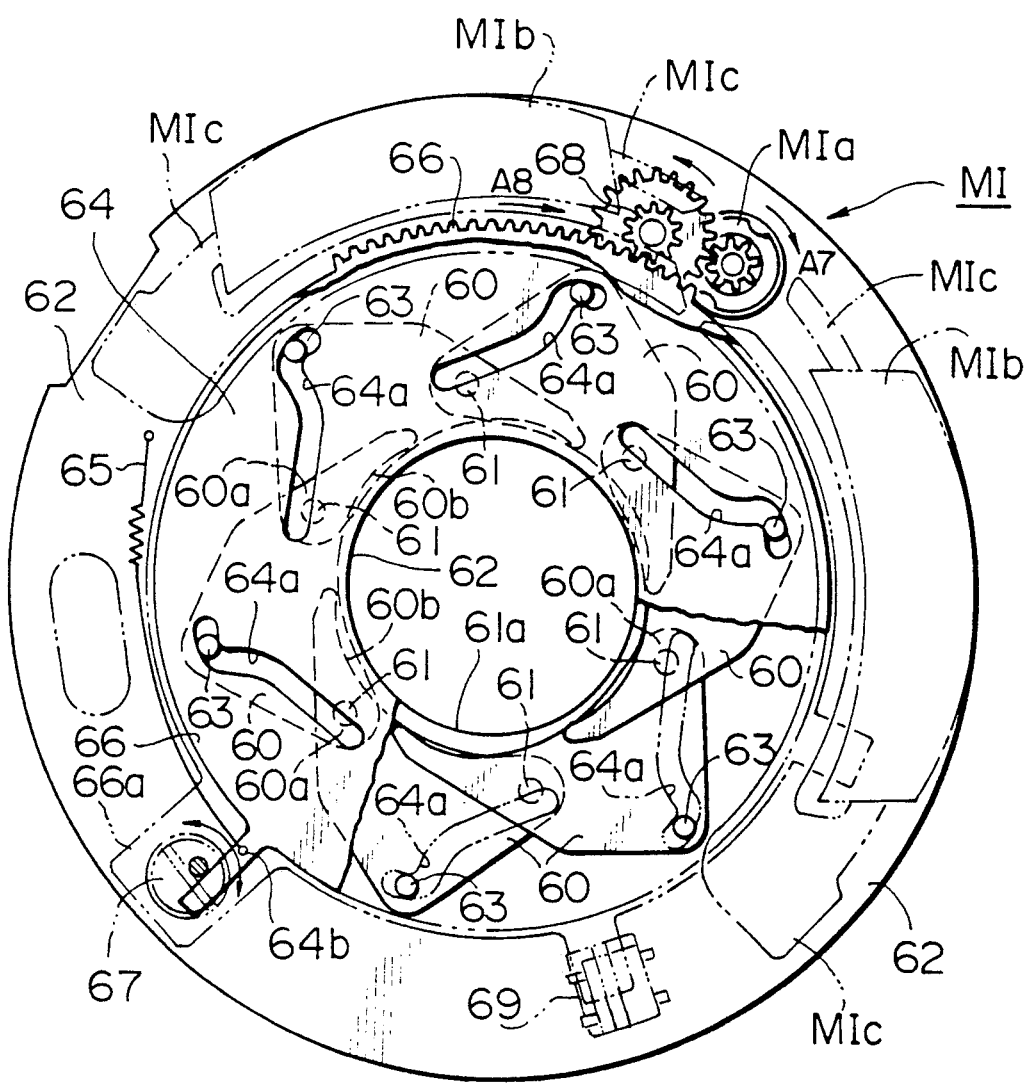
FIG. 7 is a front view of the aperture mechanism which is fully opened.

FIG. 7 is a front view of the aperture mechanism which is set at the maximum aperture value F 2.0 and the maximum aperture diameter is formed with an opening 61a which is provided in the aperture base plate 62. The aperture mechanism in this embodiment has six aperture blades 60. In other words, pivotal parts 60a of six aperture blades 60 are respectively pivoted by pivot pins 61 are secured with equal intervals on the periphery of the aperture base plate 62.

Each of aperture blades 60 is arranged to be overlapped with the next aperture blade 60 in sequence and the aperture is formed with the aperture opening forming surfaces 60b of all aperture blades 60. A guide pin 63 is vertically provided in each aperture blade 60. This guide pin 63 is inserted into a cam hole 64a formed in the cam ring 64. The protrusion 64b formed on the outer periphery of the cam ring 64 is forced by the spring 65 to keep the contact with an eccentric pin 67 provided on the protrusion 66a on the outer periphery of the aperture drive ring 66.

Figure 8:
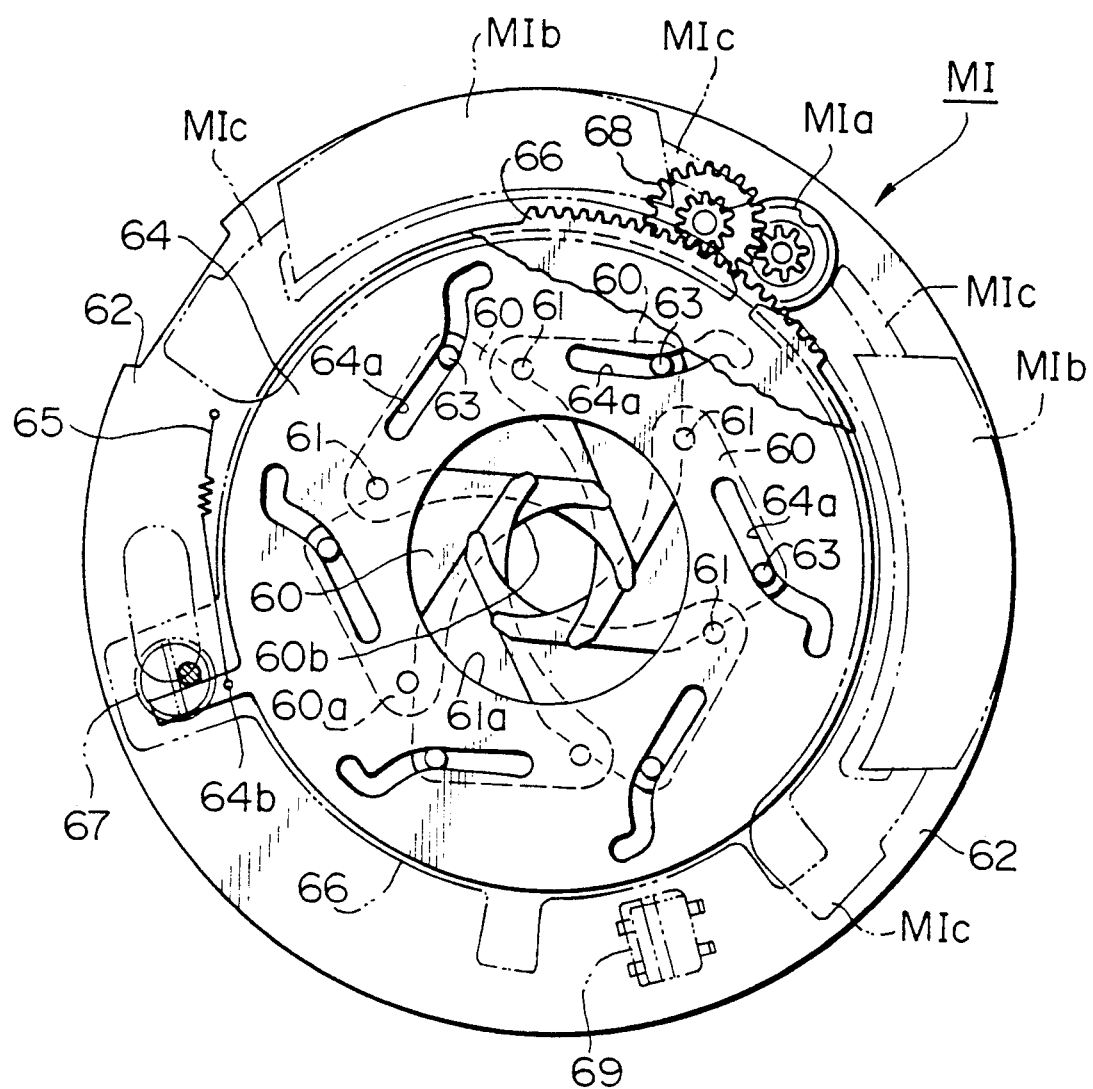
FIG. 8 is a front view of the aperture mechanism which is set to an aperture value of F 5.6.

The aperture drive motor MI is a horseshoe-shaped stepping motor which has a rotor MIa, a coil MIb and a coil MIc, and the rotation of rotor MIa is transmitted to the aperture drive ring 66 through the gear 68. For stopping down the aperture from the full open position of F 2.0 aperture value shown in FIG. 7, the aperture drive motor MI is rotated clockwise (in the direction shown with arrow A7) to rotate the aperture drive ring 66 clockwise (in the direction shown with arrow A8). At this time, the cam ring 64 is rotated following the aperture drive ring 66 by the action of the spring 65. When the cam ring 64 is rotated, the guide pin 63 is inserted into the cam hole 64a and the aperture blades 60 are turned clockwise (in the direction shown with arrow A9) around the pivot pin 61 to obtain the aperture value of 5.6 as, for example, shown in FIG. 8.

4. Focus Lens Drive Mechanism

Figure 9:
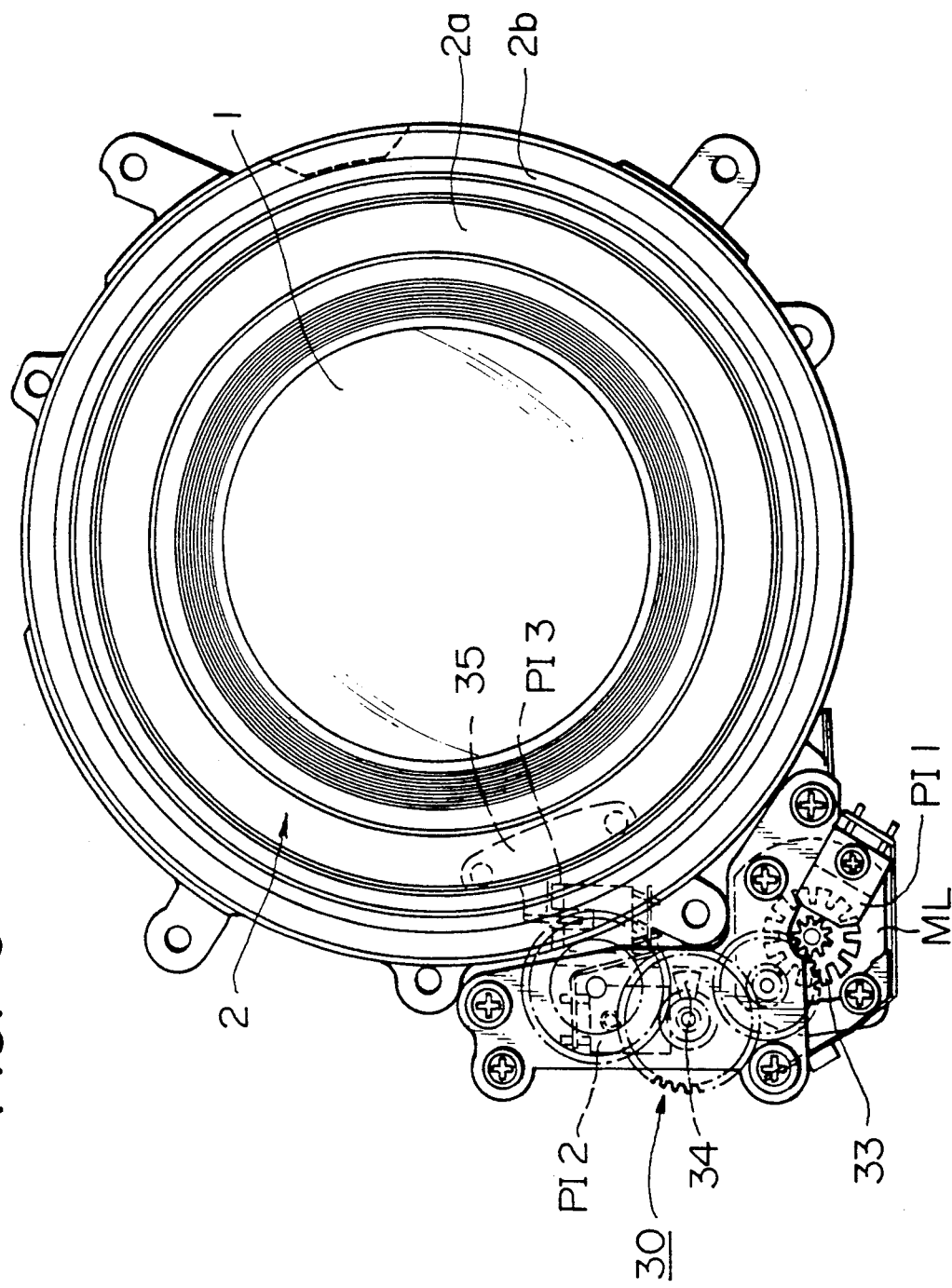
FIG. 9 is a front view of the lens drive mechanism.

FIG. 9 is a front view showing the lens drive mechanism, and the barrel 2 is provided with a movable cylinder 2a which supports the photographic lens 1 and a stationary cylinder 2b fixed to the camera body, and the photographic lens 1 is constructed so that the movable cylinder 2a advances and retracts to/from the stationary cylinder 2b in the direction of the optical axis. The rotation of the lens drive motor (DC motor) ML is transmitted to the gear part 31a of the first helicoid ring 31 shown in FIG. 11 through the gear train 30. This first helicoid ring 31 is thread-fitted with the second helicoid ring 32, which straightly advances together with the photographic lens 1 in the direction of optical axis in response to rotation of the first helicoid ring 31. In this case, the positional control, that is, automatic focusing control of the photographic lens 1 is carried out with signals LDP1, LDP2 and LDP3 (refer to FIG. 12) which are respectively outputted from a plurality of blades 34 fitted to the rotary shaft of the lens drive motor ML for detecting the rotation and the first photo-interrupter PI1, one blade 34 fitted to the gear and the second photo-interrupter PI2, and the shield plate 35 which moves in a radial direction along with movement of the barrel 2 in the direction of optical axis and the third photo-interrupter PI3.

Figure 10:
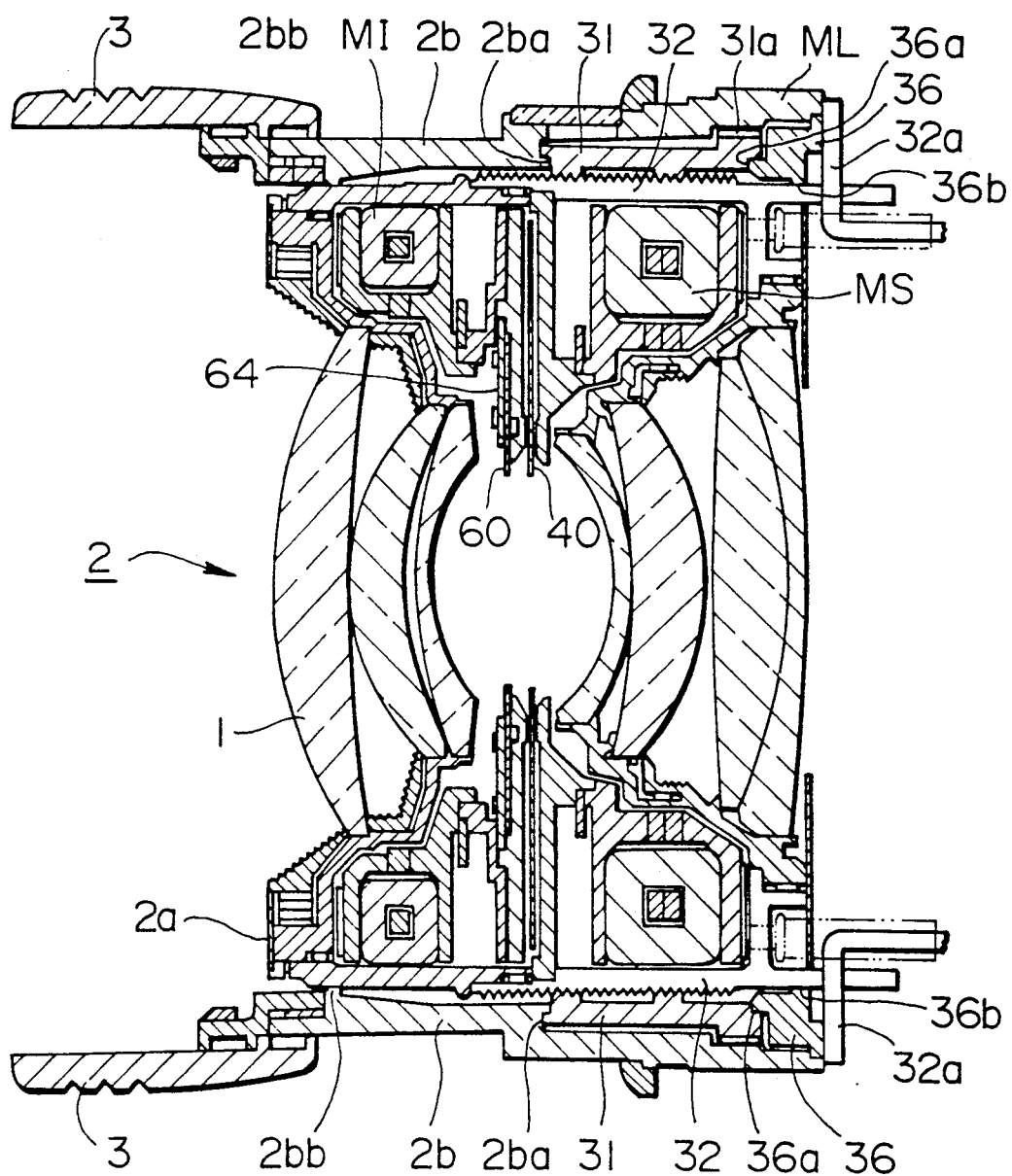
FIG. 10 is a sectional view of the lens drive mechanism.

FIG. 10 is a sectional view of the lens drive mechanism. The first helicoid ring 31 coupled with the lens drive motor ML through the gear 31a formed on its outer periphery is restricted in movement in the direction of optical axis is the helicoid holder 2ba and the first contact surface 36a of the helicoid holder 36 fixed to the stationary cylinder 2b and allowed to move in the radial direction. The second helicoid ring 32 thread-fitted to the first helicoid ring 31 is inhibited to rotate by the straight advancing guide plate to move in the direction optical axis. Therefore, when the first helicoid ring 31 is rotated. its rotating force is converted into a movement in the direction of optical axis by a helicoidal action and the second helicoid ring 32 moves together with the photographic lens 1 in the direction of optical axis, and the focus is thus adjusted.

One end of the first helicoid ring 31 is supported by a first contact part 36a of the helicoid holder 36 and the other end is supported by the rest 2ba of the stationary cylinder 2b. This construction prevents the first helicoid ring 31 from directly pushing the second helicoid ring 32 in the radial direction when the first helicoid ring 31 is rotated by the lens drive motor ML, thus eliminating an excessive torque applied to the lens drive motor ML.

The second helicoid ring 32 which advances and retracts in the direction of optical axis is supported by the second contact part 36b of the helicoid holder 36 and an abutment portion 2bb of the stationary cylinder 2b. Such construction allows to avoid application of the gravity of the second helicoid ring 32 to the first helicoid ring 31 which is a rotary member and prevent an excessive torque to the lens drive motor ML.

Those parts such as the rest 36a of the helicoid holder 36, the second contact part 36b, the rest 2ba of the stationary cylinder 2b and the abutment portion 2bb, which slide when the lens is driven are plated with highly lubricant metal to ensure smooth movement and prevention of an excessive torque to the lens drive motor ML.

As described above, a sound to be produced during operation of the movable cylinder is minimized by reducing the load to the lens drive motor ML wherever possible.

5. Description of Circuit Block Diagram

Figure 11:
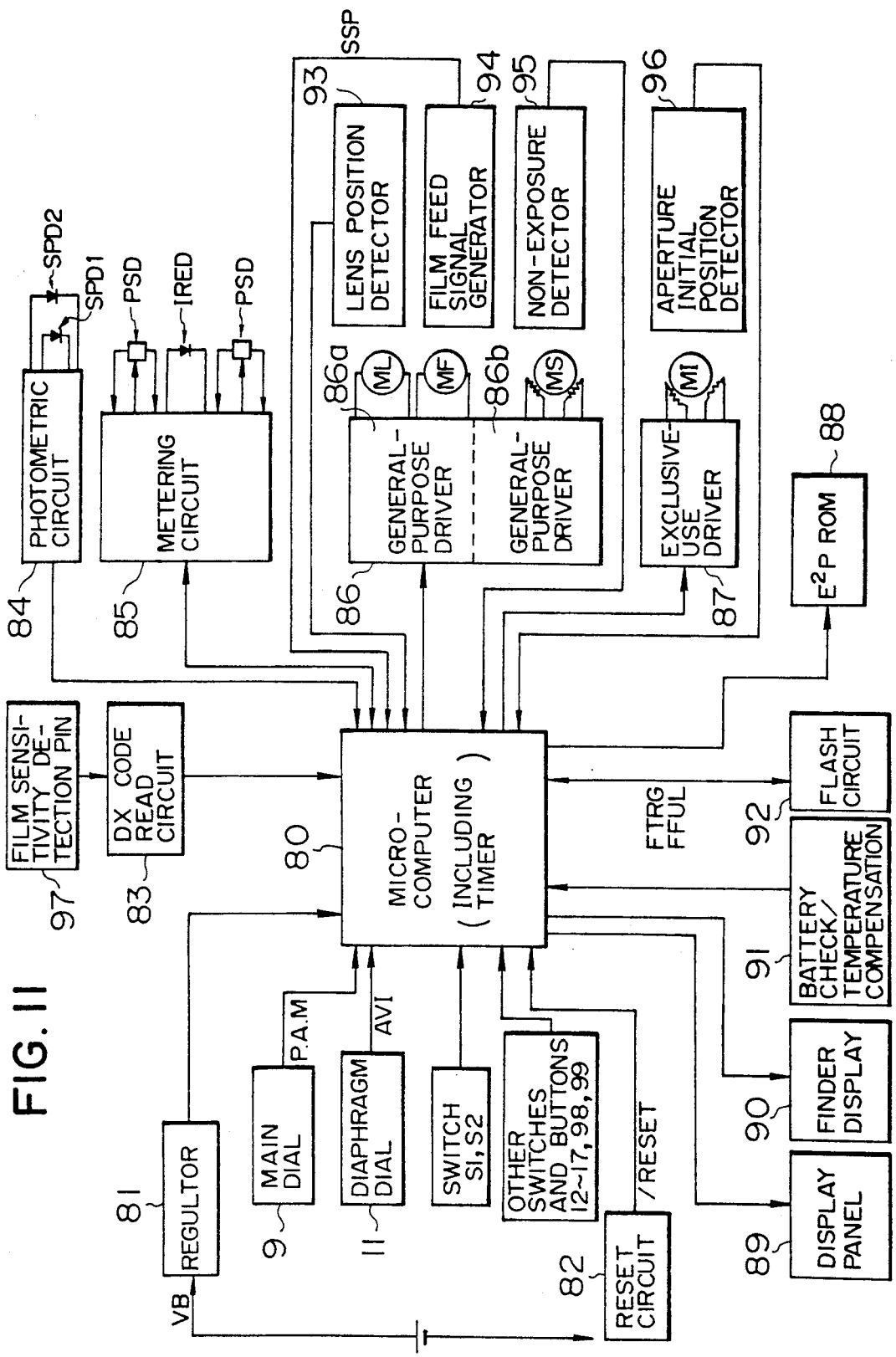
FIG. 11 is a circuit block diagram of the electronic camera.

FIG. 11 is a circuit block diagram of this electronic camera. This electronic camera incorporates a microcomputer 80 as a central component which controls various photographic operations and the microcomputer is connected to the infrared mode setting switch 13, the rewindless switch 98, the camera back open/-close detection switch 99, the main dial 9, the aperture dial 11, the release button 10, the up button 12, the down button 14, the self-timer start button 15, the MF button 16, the select button 17, and the halfway rewind button 18. The release button 10 is provided with the switches S1 and S2 and, when the release button 10 is lightly pressed, the switch S1 turns on and range metering and photometric operation are carried out and, when the release button 10 is subsequently fully pressed, the switch S2 turns on and photographic operations (focal adjustment and exposure control) are carried out.

In addition, the microcomputer 80 is connected to the regulator 81 for stabilizing the power supply voltage, the reset circuit 82 for initializing the microcomputer, the DX code read circuit 83 for reading the DX code information marked in the film, the photometric circuit 84 provided with the SPD 1 for receiving the brightness of a subject at the central spot of the photographic frame, the SPD2 for receiving the brightness of a subject in a wide range (average) of the photographic frame, the active type range metering circuit in which two PSDs are symmetrically arranged with the infrared LED as the center, two drivers 86a and 86b for driving the photographic lens, feeding the film and opening and closing the shutter, the driver 87 for driving the stepping motor which serves to open and close the aperture, the EEPROM 88, the display (liquid crystal) panel 89, the in-viewfinder display 90, the battery check and temperature compensation circuit 91, and the strobo circuit 92 for charging the strobo and emitting the strobo flash.

The lens drive motor ML is provided with the lens position detector 93 which comprises the first photo-interrupter 11, second photo-interrupter 12 and third photo-interrupter 13 and outputs signals LDP1, LDP2 and LDP3 to the microcomputer 80.

Figure 12:
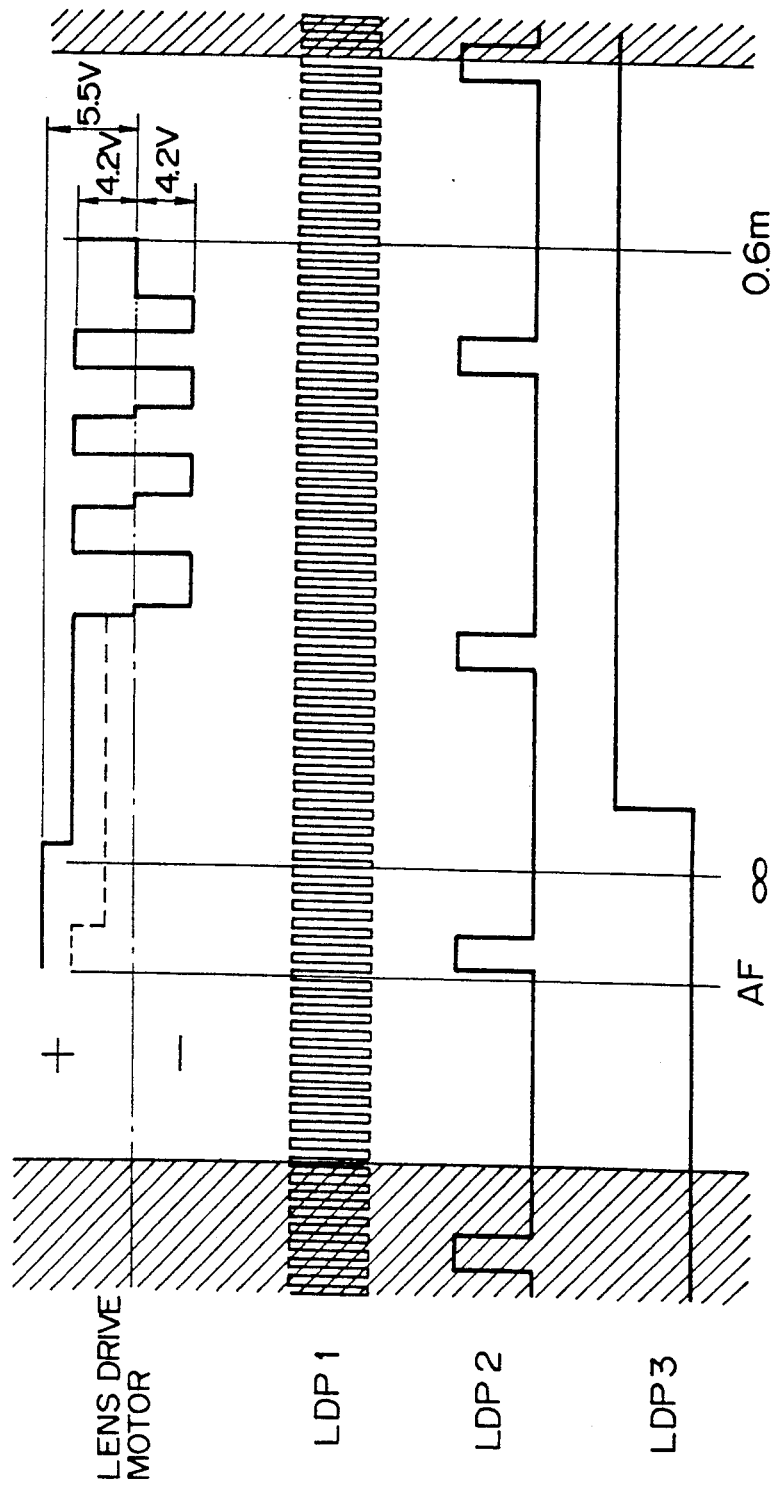
FIG. 12 is a timing chart of lens drive control.

FIG. 12 is a lens drive timing chart. Signal LDP1 is outputted from the first photo-interrupter 11 and the pulse generating cycle is extremely short. (The actual timing is set to be finer than the timing shown.) Signal LDP2 is outputted from the second photo-interrupter 12 and the cycle is relatively long. Signal LDP3 is outputted from the third photo-interrupter and the status of the signal is changed once at the left side (long range side) in the lens moving region. A positive or negative voltage is repeatedly applied in accordance with the number of pulses of LDP1 and the lapse of time to improve the stopping accuracy of the photographic lens which is moved by the lens drive motor ML.

The film feed motor MF is provided with the film feed signal generator 94 which generates a film feed signal (pulse signal) SSP of which a cycle of pulse corresponds to advancement of one frame and the film feed signal generated is outputted to the microcomputer 80. The film is taken up by the film takeup reel coupled to the film feed motor MF and the sprocket which engages with the perforations of the film is rotated in conjunction with feeding of the film A disc which is made of a conductive material for its half and an insulation for its other half is attached to the upper surface of this sprocket and the film feed signal generator 94 generates an SSP signal one H (High) or L (Low) cycle of which corresponds to one frame by making its contact piece contact this disc.

6. Description of Photographing Modes

The main dial 9 is a switch for turning off the power supply and also selecting the program mode (P), aperture priority mode (A) and manual mode (M). A photographer selects a desired photographic mode as required for photography.

6-1 Program Mode (P)

The program mode (P) is set when the main dial 9 is set at the "P" position. In this program mode (P), the film is exposed in reference to the aperture value specified by the aperture dial 11 at an appropriate shutter speed that is automatically set in accordance with the brightness of a subject. If the exposure cannot be appropriately controlled only by changing the shutter speed, the aperture automatically changes. In other words, the program mode (P) is intended to control the exposure so that the aperture value is changed to the opening side when the brightness of the subject is little and a shutter speed lower than the minimum shutter speed (critical shutter speed for camera shake) is selected and to the closing side when the subject is bright and a shutter speed higher than the maximum shutter speed is selected, at the aperture value set as required by a photographer to avoid a failure in photography wherever possible.

A method of exposure in the program mode (P) is described below according to the program line diagram shown in FIG. 13.

Figure 13:
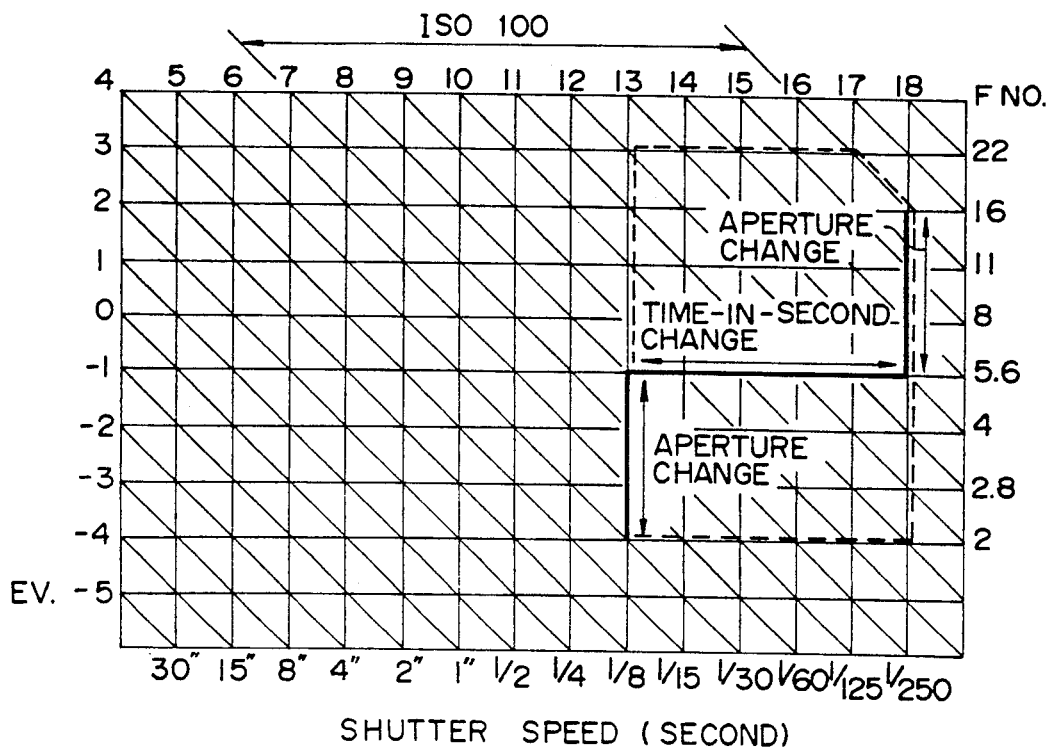
FIG. 13 is a program line diagram showing exposure control in a program mode.

FIG. 13 shows the setting of the camera where, for example, the aperture value is F5.6, the film sensitivity is ISO100, the minimum shutter speed (critical shutter speed for camera shake), is ⅛ seconds and the maximum shutter speed is 1/250 seconds. Specifically, when the aperture value is F5.6, the appropriate range of shutter speed is ⅛ ~ 1/250 seconds for the range of brightness of EV9 ~ 14 and therefore the shutter is driven while the aperture value is kept set at F5.6.

If EV is, for example, 8 smaller than 9, the shutter speed corresponding to the aperture value of F 5.6 is ¼ seconds longer than ⅛ seconds, that is, the minimum shutter speed (critical shutter speed for camera shake), and accordingly, the appropriate exposure is obtained by opening the aperture as much as one step, that is, to F 4.0 and setting the shutter speed to ⅛ seconds.

If EV is, for example, 15 larger than 14, the shutter speed corresponding to the aperture value F 5.6 is 1/500 seconds shorter than the maximum shutter speed 1/250 seconds, and accordingly, the appropriate exposure is obtained by closing the aperture as much as one step, that is, to F 8 and setting the shutter speed to 1/250 seconds.

The appropriate range of brightness is EV 5 ~ 16 under the condition that the range of shutter speed is ⅛ ~ 1/250 and therefore the range shown with a broken line in FIG. 13 is the controllable range of appropriate exposure and the shutter speed varies on the bold solid line in FIG. 13 when the aperture value is set at F 5.6.

For the program mode, the critical shutter speed for camera shake can be changed. Specifically, in case of this electronic camera, the shutter speed corresponding to the critical shutter speed for camera shake is preset at 1/30 seconds and this critical shutter speed for camera shake can be changed within the range of ¼ ~ 1/60 seconds as described below. When the select button 17 is kept pressed (two seconds) while the camera is set to the program mode (P), the preset critical shutter speed for camera shake "1/30" is displayed on the display panel. The photographer is allowed to set the critical shutter speed for camera shake as required by pressing the up button 12 or the down button 14 to change the critical shutter speed for camera shake displayed on the display panel 19. The ready state to change the critical shutter speed for camera shake is cancelled when the other switch button is operated or three seconds after the final operation of the up button 12 or the down button 14.

In flash photography using a dedicated flash device in the program mode (P), a variable aperture synchro photography (a kind of slow synchro photography) is carried out. More specifically, in the photography where the background is dimly dark and a subject (person) at a short distance is dark, the flash light is controlled to be appropriate by changing the aperture in accordance with the distance to the subject after exposure with the aperture and the shutter speed adjusted to the background to photograph both the background and the subject person with an appropriate brightness.

Figure 14:
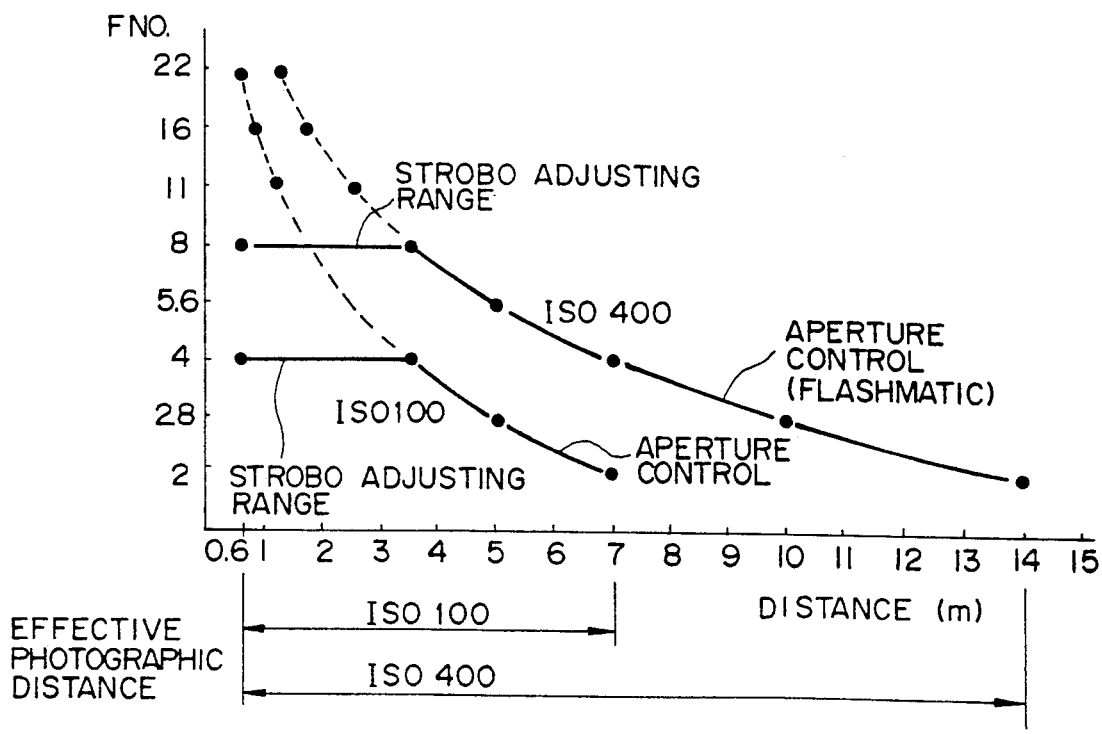
FIG. 14 is a diagram showing an effective reach of the flash light.
Figure 15:
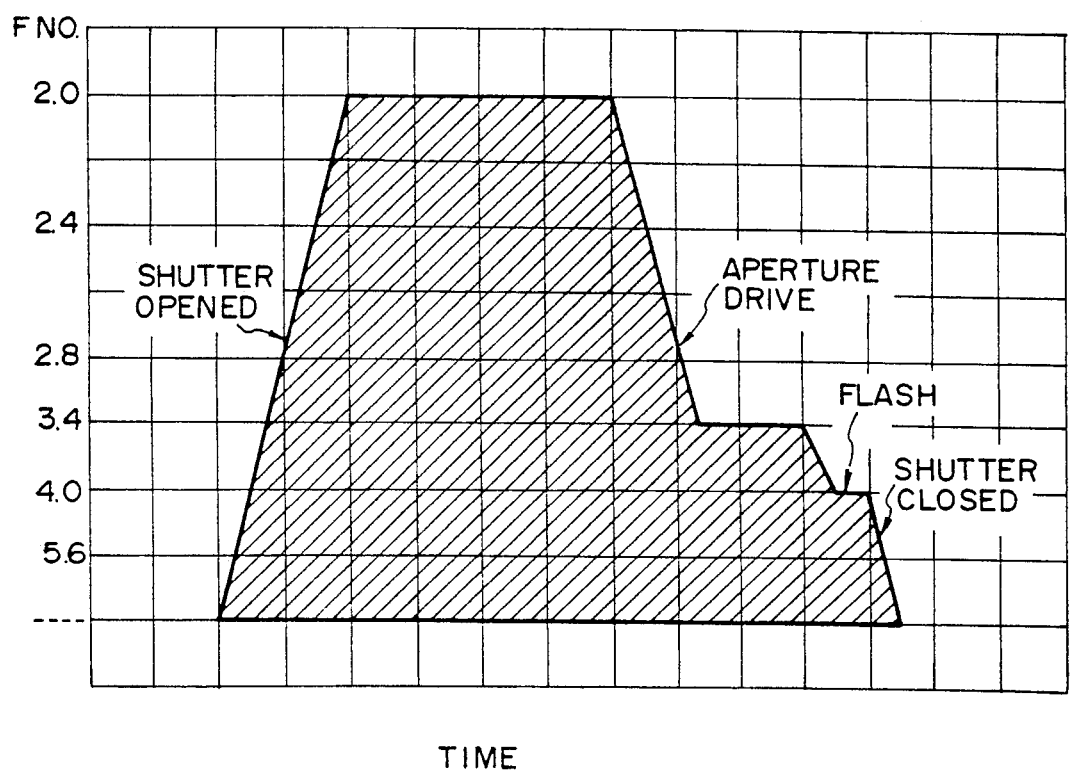
FIG. 15 is a diagram showing exposure control in a variable aperture synchronized photography.

FIG. 14 shows the effective reach of the flash light by the guide No. and the ISO sensitivity and this dedicated flash has the guide No.14 and the aperture value F No. corresponding to the film sensitivity ISO 100 and 400 and the synchronizable range of the flash is within 3.5 m. An appropriate exposure is obtained by controlling the aperture for a subject within 7 m in case of ISO sensitivity 100 and a subject within 14 m in case of ISO sensitivity 400. For the photography of both, for example, a background at a 7 m distant position and a subject person at a 3.5 distant position in an appropriate exposure with a film of ISO sensitivity 100, variable aperture synchronized photography as shown in FIG. 15 is carried out. Specifically, at first, the shutter is kept open for a while at the open aperture F 2.0 so that the film is appropriately exposed for the background at a distance of 7 m and the aperture is stopped down to the aperture value F 4.0 corresponding to the brightness of a person at a distance of 3.5 m. When the aperture is stopped down to F 4.0, the flash light is emitted and the shutter is closed.

6-2 Aperture Priority Mode (A)

The aperture priority mode (A) is set when the main dial 9 is set to "A". In this aperture priority mode (A), the exposure is carried out at an appropriate shutter speed which is automatically set according to the brightness of a subject in reference to the aperture value set by the aperture dial 11. This aperture priority mode (A) allows the photographer to select a desired aperture value and carry out the photography at the selected aperture value, taking into account the depth of subject filed (blur).

Figure 16:
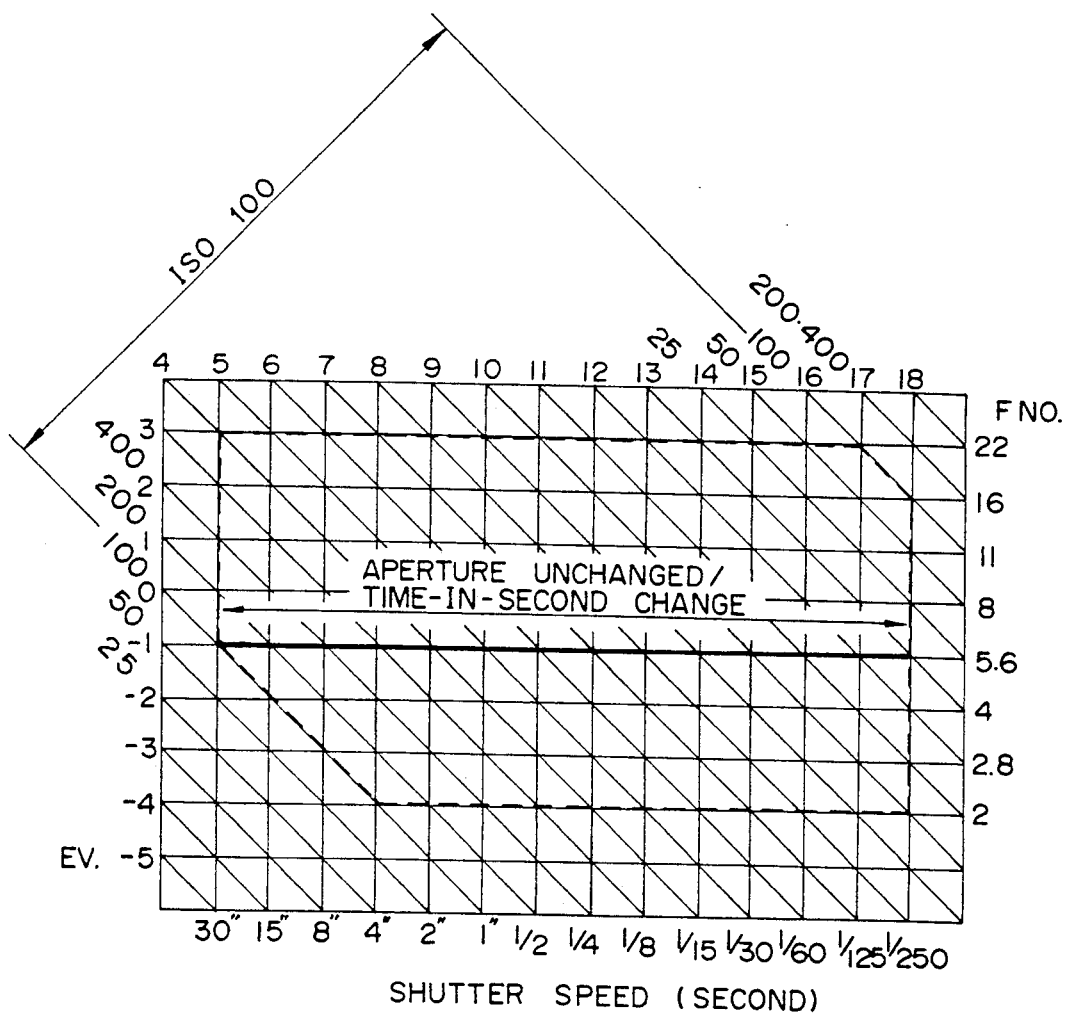
FIG. 16 is a program line diagram showing exposure control in the aperture priority mode.

A method of exposure in the aperture priority mode is described below according to the program line diagram shown in FIG. 16.

This aperture priority mode (A) is for photography by fixing the selected aperture value, and the control for which the preset aperture value is changed in the case that the appropriate exposure is not obtained from a combination of the preset aperture value and the limited range of shutter speed as in the program mode (P) is not carried out. As shown with a bold solid line in FIG. 16, the set aperture value F 5.6 remains fixed. The shutter speed varies in the range of 30 ~ 1/250 seconds in accordance with the program line in response to the brightness of the subject and therefore the appropriate exposure is obtained. In case the aperture value is F 5.6 and the ISO sensitivity of the film is 100, the range shown with a broken line in FIG. 16 is the controllable range of appropriate exposure.

6-3 Manual Mode (M)

The manual mode (M) is set when the main dial is set at "M" and used when the photographer selects a combination of the shutter speed and the aperture as required.

7. Display in Viewfinder

When the release button is lightly pressed, the switch S1 is turned on, range metering, focal adjustment and photometric operation are carried out and photography information is displayed in the viewfinder 7 and the display panel 19 and, when the switch S2 is fully pressed, the switch S2 is turned on and the exposure operation is carried out.

Information related to the photography to be displayed in the viewfinder 7 when the release button is lightly pressed includes, as shown in FIG. 4, the field frame 7a, the "●" green range metering mark 7b which lights up when a distance where the focus is adjustable is metered and flickers when a distance where the focus is not adjustable is metered, the "−" red under-exposure alarm mark 7c which lights up when the preset aperture value and the shutter speed insufficient for the brightness of the subject and the "+" red over-exposure alarm mark 7d which lights up when the preset aperture value and the shutter speed are excessively large for the brightness of the subject.

The photometric range is changed by selecting the mode; for example, an extremely small range (spot) el at the center is photometrically measured in the manual mode (M) and a relatively large range (average) e2 at the center is photometrically measured in the program mode and the aperture priority mode. The field frame 7a varies in conjunction with movement of the photographic lens to the focal position determined based on the information as to the distance to the subject and a parallax compensation is carried out. Specifically, if the distance to the subject is long, the frame lines of the upper and left sides are as shown with a solid line in FIG. 4 and, if the distance to the subject is short, the frame lines of the upper and left sides are as shown with a broken line in FIG. 4. The range display 7e displays the range of 0.6 m ~ ∞ and the information of distance is displayed as the chipped portion 7ea which is formed by shielding a passing light at a corresponding position on the right-hand extension of the upper side of the field frame 7a.

8. Display Panel (Liquid Crystal)

FIG. 17 shows the details of the exposure display when the shutter button 10 is lightly pressed in the program mode (P). When the appropriate exposure is obtained with an aperture value set by the aperture dial 11 as shown in FIG. 17, an appropriate shutter speed is displayed on the display panel 19. In case of under-exposure, the open aperture value F2.0 or the critical shutter speed 1/30 seconds for camera shake are displayed in flickering on the display panel 19. In case of over-exposure, the limit aperture value F22 or the maximum shutter speed 1/250 seconds are displayed in flickering on the display panel 19.

9. Main Functions of the Camera of the Present Invention

9-1 Aperture Control Function

When the main dial 9 is operated from OFF to ON, the aperture is moved to the position of the aperture value specified by the aperture dial 11 and therefore the the aperture can be moved before operation of the release button and photography can be instantaneously carried out without a time lag.

When the main dial 9 is operated from ON to OFF, the aperture is moved from the position of the aperture value specified by the aperture dial 11 to the open position and the aperture position is initialized. In other words, the aperture mechanism of this camera employs a system which detects a mechanical position only under the condition that the aperture is kept open as described above and errors in driving are gradually accumulated if the aperture value is repeatedly changed while the main dial 9 is kept ON. Therefore the aperture is initialized to be open by operating the main dial 9 to OFF and accurate aperture controlled is thus ensured.

9-2 Film End Remaining Control Function

If rewinding of the film is stopped for a specified time when the film end remains out of the film cartridge after rewinding of the film is started, and the camera back is opened, the film cartridge with the film end remaining unrewound can be taken out from the camera body and, if the specified time has passed without opening the camera back during counting of the specified time, the film is rewound again, rewinding of the film is stopped after the film end has been rewound into the film cartridge and the film cartridge into which the film end has been stored can be taken out from the camera body. The construction of the film rewinding mechanism can be simplified without adding any other operating members and switches.

9-3 Film Position Display Function in Feeding of Two Frames

This is one of film feed modes which is carried out by turning on the rewindless switch 98 provided in the camera body and setting the rewindless mode and relates to feeding of the film during which a time lag associated with taking up or rewinding of all frames after or before photography is eliminated by taking up the film while leaving some unexposed frames and exposing these unexposed frames in rewinding of the film. The actualities of film feeding can be checked instantaneously since the the film frame number display provided displays the number of exposed frames during photography, changes the display to the number of frames corresponding to the length of the drawn out film and displays only information necessary for the photographer by subtracting the above display in conjunction with rewinding of the film.

9-4 Silent Function

When the main dial 9 is set to ON while pressing the MF button 16, the silent mode is selected. In this silent mode, the operation sound produced in driving the lens, aperture and film feed mechanisms is reduced. When the film rewinding sound is jarring to ears, the main dial 9 is turned off during rewinding to temporarily stop the rewinding operation, then the main dial 9 is changed over from OFF to the program mode, aperture priority mode or manual mode, the rewinding is resumed in the silent mode.

9-5 Auto Bracket (AEB) Photography Function

The exposure light quantity is changed by changing the aperture in large and small steps in reference to the aperture set with the aperture dial 11 by a single operation of the release button 10 and a plurality of frames are photographed in succession.

9-6 Exposure Compensation Function

A compensation value is set by using the up button 12 and the down button 14 after setting the main dial 9 to position "P" or "A" and pressing the select button 17 to display the exposure compensation mark. Whether or not an operation of the up and down buttons 12 and 14 for exposure compensation is carried out can be determined from instantaneous lighting of LEDs in the viewfinder, for example, "+" when the exposure compensation value is positive, "−" when the exposure compensation value is negative and "+"/"−" when the exposure compensation value is 0 (zero). Thus, the exposure compensation can be conducted even when the display panel cannot be discerned due to darkness.

When the manual mode is selected, photometric measurement is started, the results of photometric measurement and the preset exposure values (shutter speed and aperture value) are compared and the results of comparison are displayed by LED indications in the viewfinder. The "+" LED in case of over-exposure, "−" in case of under-exposure and "+"/"−" in case of appropriate exposure are lit for a specified time (10 seconds). For adjusting the shutter speed to the appropriate exposure when the display panel 19 cannot be seen due to darkness, the current display of LED "+" and/or "−" turns off for a moment when the up button 12 and the down button 14 are operated and the fact that these up and down buttons have been operated can be identified. When the shutter speed exceeds the setting range, the LED display does not instantaneously turn off and maintains lighting to indicate that the shutter speed has reached the limit of the setting range.

9-7 Manual Focus (MF) Function

In the manual focus (MF) mode, the photographer can set the focal position of the photographic lens for a desired distance. For example, in case of photography of a moving subject in the auto focus (AF) mode, the subject is apt to deviate from the range metering point mode to result in faulty range metering and therefore a photographic range is estimated and the focal position is set in advance to this range.

In case of the camera in accordance with this embodiment, manual setting of the photographic lens is available in three types of methods as described below.

First, when the MF button 16 is pressed after the release button 10 is lightly pressed, and the switch S1 is turned on in the AF mode, the focal position of the photographic lens is fixed at the position where the focus is adjusted in the AF mode. The photographic lens stays at this focal position until the MF button 16 is pressed again.

Second, the MF mode is selected from the state of the AF mode by pressing the MF button 16, "999" (indicating a infinite distance) is displayed on the liquid crystal panel 19, the photographic lens is driven after lapse of the specified time (2 seconds) and the focus is set to the infinite distance. This setting is cancelled by pressing again the MF button 16

Third, the MF mode is selected from the state of the AF mode by pressing the MF button 16 and "999" (indicating a infinite distance) is displayed on the liquid crystal panel as described above. When the up button 12 and the down button 14 are pressed while keeping pressing of the MF button 16, "20.0" is displayed on the liquid crystal panel 19. Under this condition, the distance can be set and displayed as required in the range of 0.6 ~ 20 m by using the up button 12 and the down button 14. After releasing the MF button 16 having been pressed after setting, the focus is adjusted to the position corresponding to the displayed distance with lapse of the specified time (3 seconds).

9-8 Focus Indicate Function

Positional alignment is accurately carried out by carrying out positional alignment of the range information such as the initial position mark (AF) and the infinite position mark ($\infty$) and the index according to the information stored in the EEPROM.

9-9 Bulb Exposure Function

In the photography at night or the like, a long duration exposure at the shutter speed exceeding 30 seconds is enabled. During this time exposure, "T—" is displayed on the display panel 19. Time exposure is set by setting the main dial 9 at M and pressing the select button 17 to display "T—" for the shutter speed on the display panel 19 by the down button 14. For bulb photography, the exposure is started by fully pressing the release button 10 to turn the S2 switch to ON and stopped by releasing the release button 10 to OFF and pressing again the release button 10 to turn the switch S1 to ON. The exposure for bulb photography is finished by setting the switch S1, which is equivalent to the release button 10 lightly pressed, to ON and therefore camera shake can be reduced.

9-10 Setting of Film Sensitivity

A film sensitivity setting device for use in a camera for which the film sensitivity can be automatically and manually set is described below. As a storage for the film sensitivity, the first storage is provided in the register of the microcomputer 80 and the second storage is provided in the EEPROM. As regards the film sensitivity, when a film with a DX information is loaded in the camera, this DX information is stored as the film sensitivity information in the first storage and the information stored in the first storage can be changed by manual operation. When a film without the DX information is loaded in the camera, the information stored in advance in the second storage is introduced into the first storage so that the preset film sensitivity information can be changed by manual operation and the changed information is stored in the first and second storages by manual operation. When a film without the DX information is loaded in the camera, the film sensitivity information is stored in the EEPROM by manual operation and therefore no setting is required when a similar film without the DX information is loaded in the camera.

9-11 Variable Aperture Control Function

In flash photography, to avoid an excessively dark image of the main subject such as a person or persons and the background, natural exposure of the background is first carried out with an aperture value set by the aperture dial 11 to ensure appropriate exposure and flash exposure of the main subject is carried out with the aperture value computed from the metered distance to the subject and the guide No. of the strobo circuit 92 to obtain appropriate exposure of the main subject. However, flash exposure with the aperture value computed from the metered distance to the subject and the guide No. can be first carried out for appropriate exposure of the main subject and natural exposure with the aperture value set by the aperture dial 11 for appropriate exposure of the background.

10. Flow Charts (Control Operations)

Control operations by the microcomputer 80 are described below.

Figure 18:
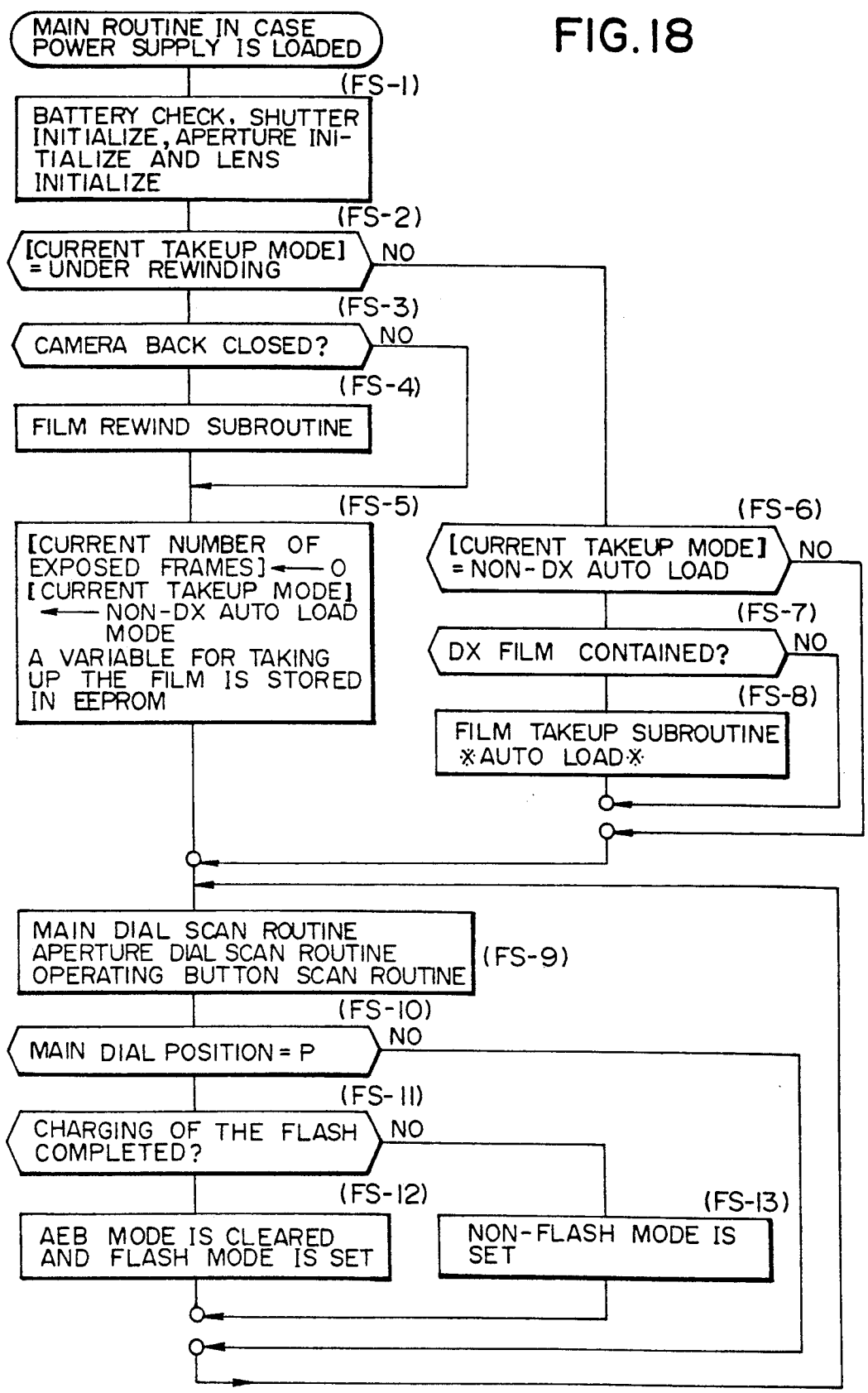
FIG. 18 is a flow chart showing the main routine when the power supply is loaded.

10-1 Initializing:

10-1-1 Main Routine (FIG. 18)

This routine is executed when the battery is loaded and intended to reset the camera to a state when the battery is unloaded. In this routine, the battery is checked (if the voltage of the power supply, not shown, is lower than specified, the camera is unable to operate) and the positions of the shutter drive mechanism, aperture drive mechanism and lens drive mechanism are mechanically initialized (step FS-1). To carry out the processing in response to the status when the battery is unloaded, whether rewinding is being carried out in "CURRENT TAKEUP MODE" stored in the EEPROM 88 is determined (step FS-2). If rewinding is being carried out when the battery is unloaded, whether the camera back is closed is determined (step FS-3). When it is determined that the camera back is closed, the film rewind routine is executed (step FS-4). After completion of rewinding, "CURRENT NUMBER OF EXPOSED FRAMES" is assumed 0 (zero), "CURRENT TAKEUP MODE" is changed to the non-DX auto load mode to reduce the abort time, these information is stored in the EEPROM 88 (step FS-5) and the operation proceeds to step (FS-9).

On the other hand, if "CURRENT TAKEUP MODE" is not rewinding, whether the film is still loaded when the battery is unloaded is determined by determining whether "CURRENT TAKEUP MODE" is the non-DX auto load mode (the status where the film is not loaded or the non-DX film is loaded) (step FS-6). Consequently, if it is determined that the current takeup mode is the non-DX auto load mode, whether the DX film is loaded is determined (step FS-7). When it is determined that the DX film is loaded, the film takeup subroutine is executed for auto loading and auto loading is carried out (step FS-8).

In step (FS-9), operations of the operating buttons and dials of the camera are waited, and the main dial scan routine, aperture dial scan routine and operating button scan routine are executed in sequence. When the main dial is set at the program mode (P) position and the flash is charged (in the camera according to this embodiment the charging completion signal is used only in the program mode), continuous flash photography is impossible and therefore the auto bracket (AEB) mode is cleared, the flash mode is set (steps FS-10 ~ 12), and the operation is returned to step (FS-9). On the other hand, when the program mode (P) is set and charging of the flash is not completed, the non-flash mode is set (step FS-13) and the operation is returned to step (FS-7). When the program mode (P) is not set, that is, the aperture priority mode (A) or the manual mode (M) is set, steps (FS-11 ~ 13) are skipped and the operation is returned to step (FS-9).

Figure 19:
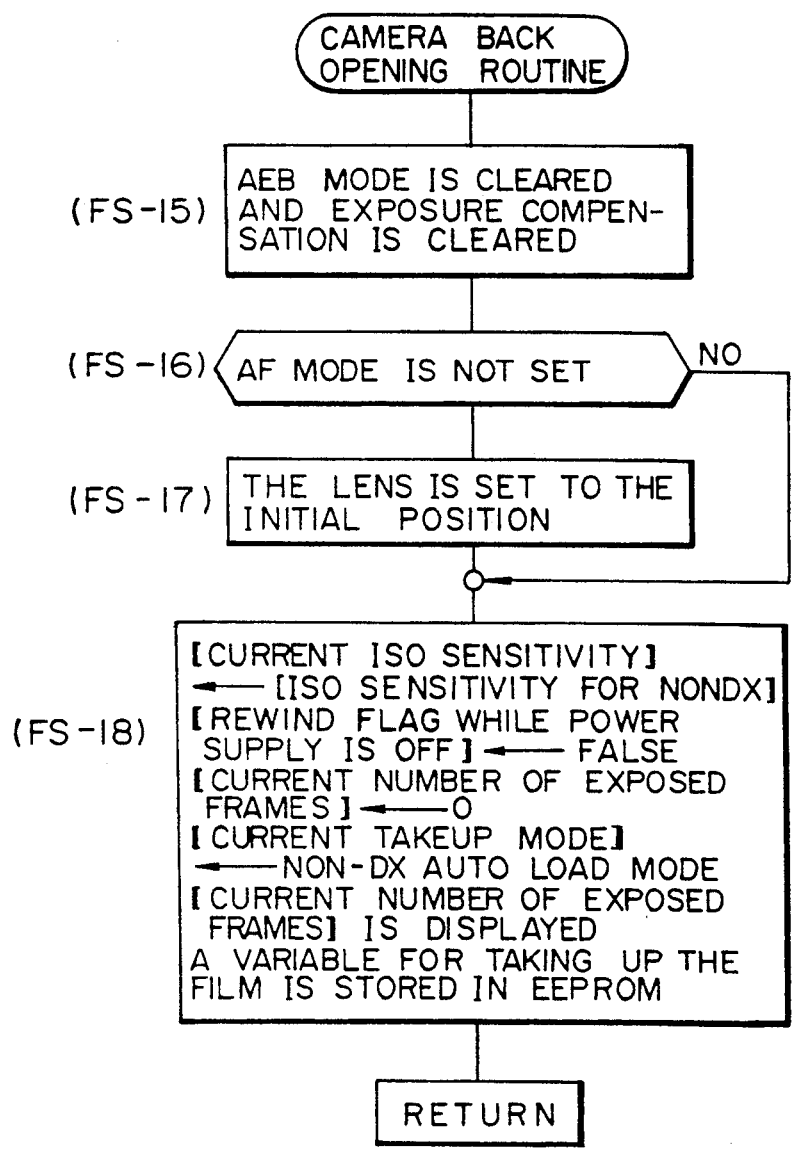
FIG. 19 is a flow chart showing the camera back opening routine.

10-1-2 Camera Back Opening Routine (FIG. 19)

This routine is executed when the camera back is opened. When the camera back is opened, the AEB mode, exposure compensation mode and infrared film application mode are cleared (step FS-15) to reset other photographic modes for initialization. When the auto focus (AF) mode is selected, the photographic lens is moved to the initial position (steps FS-16 and 17) and the operation proceeds to step (FS-18) and, when the AF mode is not selected, the operation proceeds to step (FS-18) without movement of the lens since the photographic lens has already been moved to the initial position.

In step (FS-18), "CURRENT ISO SENSITIVITY" is regarded as the specified non-DX ISO sensitivity, "REWIND FLAG WHILE POWER SUPPLY IS OFF" is reset, the current number of exposed frames is displayed as 0 (zero)), the current takeup mode is changed to the non-DX auto load mode and a variable for taking up the film is stored in the EEPROM 88. When the processing in this step (FS-18) is finished, the operation is returned to the step (FS-1).

Figure 20:
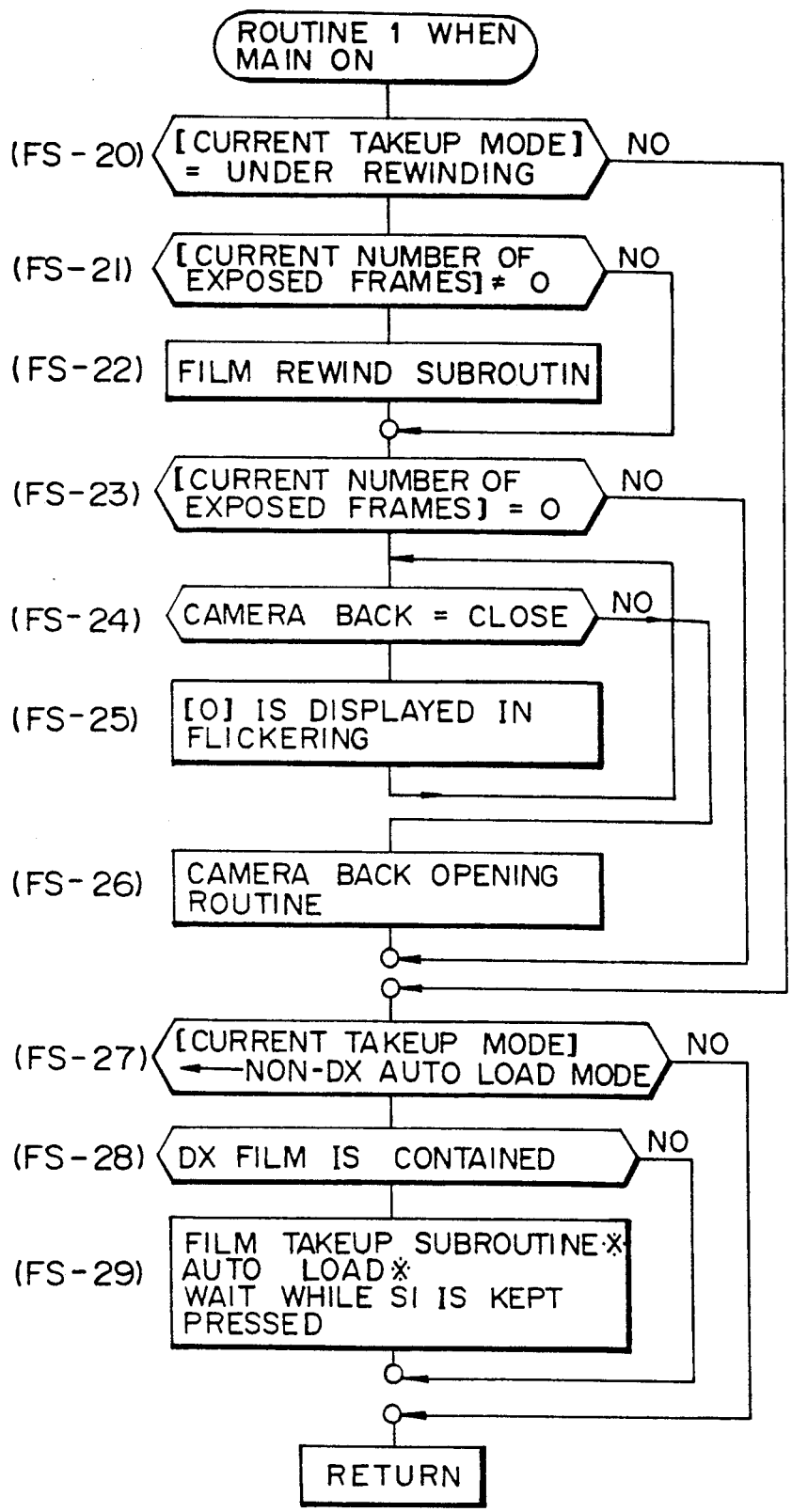
FIG. 20 is a flow chart showing the takeup routine when in the main ON (also referred to as "main ON routine 1")

10-1-3 Takeup Routine When in MAIN ON (also referred to as Routine 1 When in MAIN ON) (FIG. 20)

This routine is executed when the main dial 9 is set to ON. In this camera, the rewind operation is stopped when the main dial is set to OFF during rewinding and the rewinding is resumed when the rewind is set again to ON.

Whether or not rewinding is being carried out in "CURRENT TAKEUP MODE" is determined (step FS-20). If rewinding is being carried out, the processing after step (FS-27) are executed after the processings in steps (FS-21 ~ 26) have been executed and, if rewinding is not being executed, the processings after step (FS-27) are executed without execution of the processing in steps (FS-21 ~ 26).

If rewinding is being executed in "CURRENT TAKEUP MODE", it is assumed that the rewinding of the film has been completed when "CURRENT NUMBER OF EXPOSED FRAMES" is 0. Subsequently, whether or not the number of exposed frames is 0 is determined (step FS-21) and, if it is not 0, he film rewind subroutine is executed (step FS-22) and the operation proceeds to step (FS-23) and, if it is 0, the film rewind subroutine is not executed and the operation proceeds to step (FS-23). In step (FS-23), whether or not "CURRENT NUMBER OF EXPOSED FRAMES" is 0 is determined. Consequently, if it is 0, "0" is continuously displayed in flickering on the display (liquid crystal) panel 19 while the camera back is kept closed. When the camera back is opened, the camera back opening routine is executed (steps FS-24 ~ 26) and the operation proceeds to step (FS-27). When it is determined that "CURRENT NUMBER OF EXPOSED FRAMES" is not 0 in step (FS-23), steps (FS-24 ~ 26) are skipped and the operation proceeds to step (FS-27).

In step (FS-27), whether or not auto load conditions for the film are completed is determined and, if these conditions are completed, auto loading is carried out. Whether or not the current takeup mode is the non-DX auto load mode is determined. If the current takeup mode is consequently the non-DX auto load mode, whether or not the DX film is loaded is determined (step FS-28) and, if the DX film is loaded, it is detected that S1 becomes ON when the release switch is lightly pressed and OFF when the release switch is released, the film takeup subroutine (auto load) is executed (step FS-29) and the operation returns. If the current takeup mode is not the non-DX auto load mode and the film is not loaded, the operation is returned.

Figure 21:
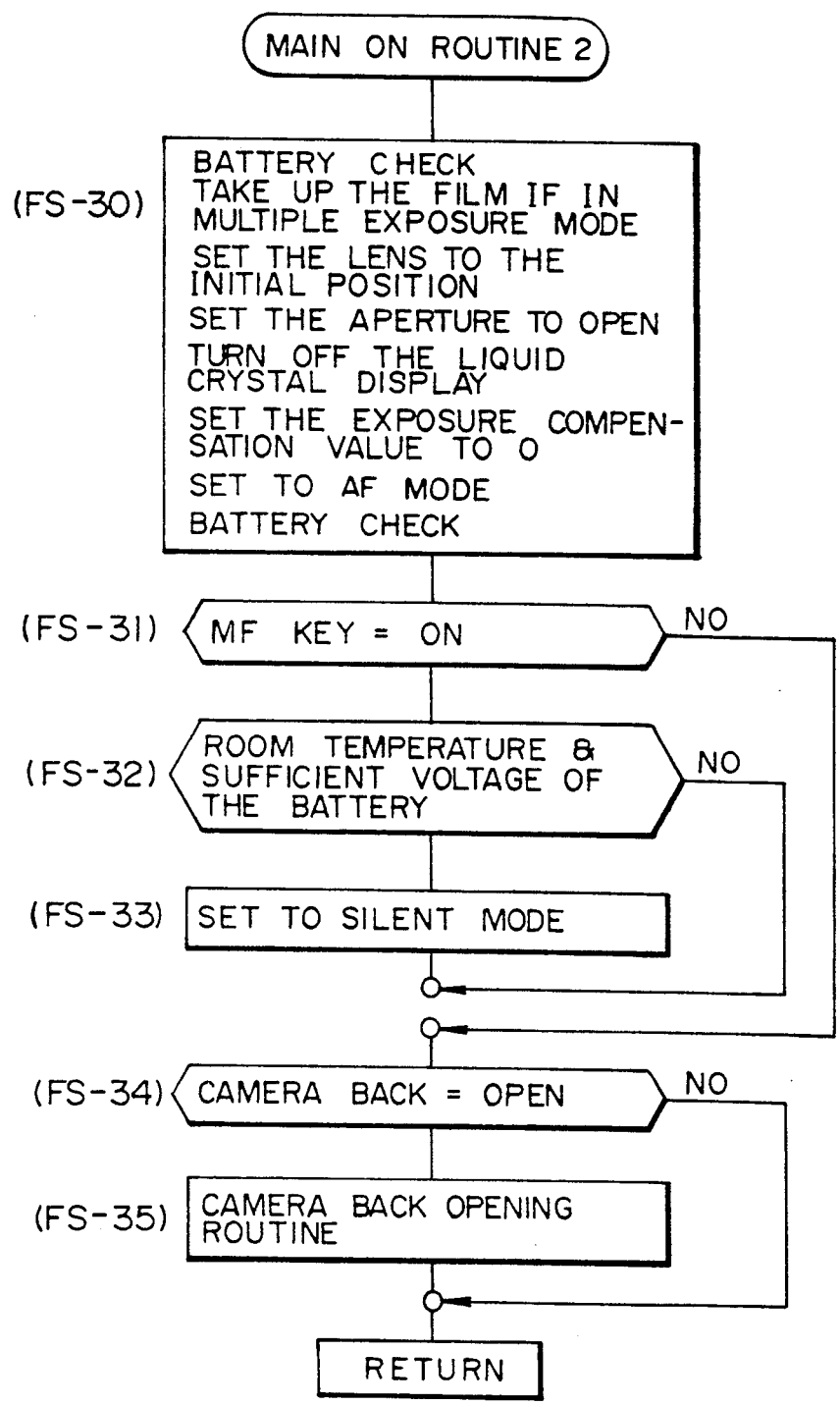
FIG. 21 is a flow chart showing the main dial OFF routine (also referred to as "main ON routine 2)

10-1-4 Main Dial OFF Routine (also referred to as Main ON Routine 2) (FIG. 21)

This routine is executed when the main dial 9 is set to ON. Initialization (step FS-30) to be carried out in this routine is such that the battery is checked, temperature information is fetched, the photographic lens is moved to the initial position, the aperture is opened, the liquid crystal panel is extinguished, the exposure compensation value is made 0, and the auto focus mode (AF) is set. When the manual focus (MF) button 16 is ON, temperature is higher than room temperature and the voltage of the battery is larger than specified, the silent mode is set and, if the above conditions are not satisfied, the silent mode is not set (steps FS-31 ~ 33).This camera is provided with two power supplies which supply power to all drive mechanisms (aperture drive mechanism, film feed device and lens drive device) and these drive mechanisms are driven with a high voltage in ordinary modes and with a low voltage in the silent mode. The silent mode is allowed only at a temperature higher than room temperature since the torque of the motor is weakened and the film may not be taken up if low voltage driving is carried out. If the camera back is opened, the operation is returned after the camera back opening routine is executed (steps FS-34 and 35) and, if the camera back is opened, the operation is returned without execution of the camera back opening routine.

10-2 Setting of Dials, Switches and Buttons

Figure 22:
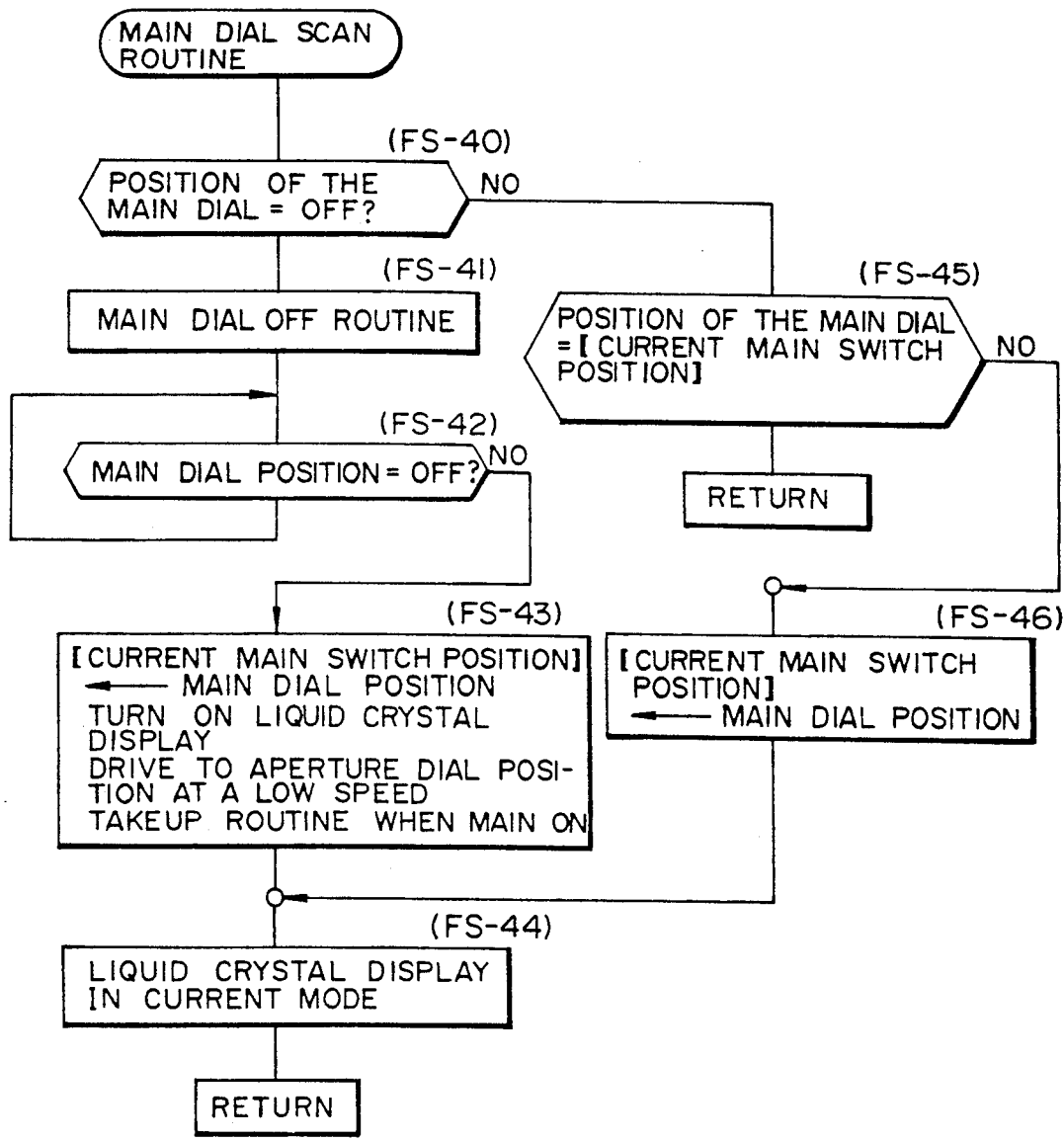
FIG. 22 is a flow chart showing the main dial scan routine.

10-2-1 Main Dial Scan Routine (FIG. 22)

This routine is called in the above described main routine. In this routine, the position at which the main dial is set is detected and the required mode is set. Whether or not the position of the main dial 9 is OFF is determined (step FS-40) and, if it is OFF, the main dial OFF routine is executed (step FS-41), then whether or not the position of the main dial 9 is OFF or it is changed over to ON is determined again (step FS-42). If the position of the main dial 9 consequently remains OFF, the operation returns to step (FS-42). When the position of the main dial 9 is changed to ON, one of the program (P) mode, aperture priority (A) mode and manual (M) mode which is set is displayed as "CURRENT MAIN SWITCH POSITION" on the liquid crystal panel, the aperture is driven to the aperture value selected by the aperture dial 11 at a low speed (low voltage), the main dial ON takeup routine is executed (step FS-43), and the display corresponding to the current mode is made on the liquid crystal panel, in other words, the number of exposed frames in case of the program mode, the the exposure compensation value in case of the aperture priority mode and the shutter speed in case of the manual mode are respectively displayed, and the operation is returned.

When it is determined that the position of the main dial 9 is not OFF in step (FS-40), whether or not the position of the main dial 9 is changed is determined (step FS-45). When the position of the main dial 9 is not changed, the operation is returned without doing nothing and, when it is changed, the result of such changing is displayed as "CURRENT POSITION" (step FS-46) and the operation advances to step (FS-44).

Figure 23:
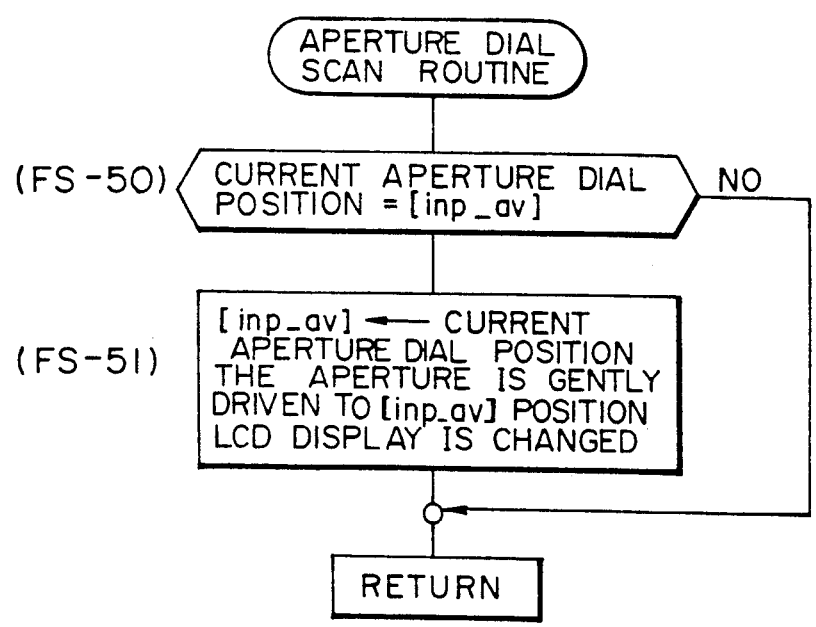
FIG. 23 is a flow chart showing the aperture dial scan routine.

10-2-2 Aperture Dial Scan Routine (FIG. 23)

This routine is called in the above described main routine. In this routine, when the current position of the aperture dial 11 differs from the position of the aperture dial 11 which is set to variable "inp_av" and it is determined that the position of the aperture dial 11 is changed, the changed position of the aperture dial 11 is set to variable "inp_av", the aperture is driven to the changed aperture position at a low speed (low voltage), the aperture position related to changing is displayed on the liquid crystal panel (steps FS-50 and 51) and the operation is returned. On the other hand, if the position of the aperture dial 11 is not changed, the operation is directly returned.

Figure 24:
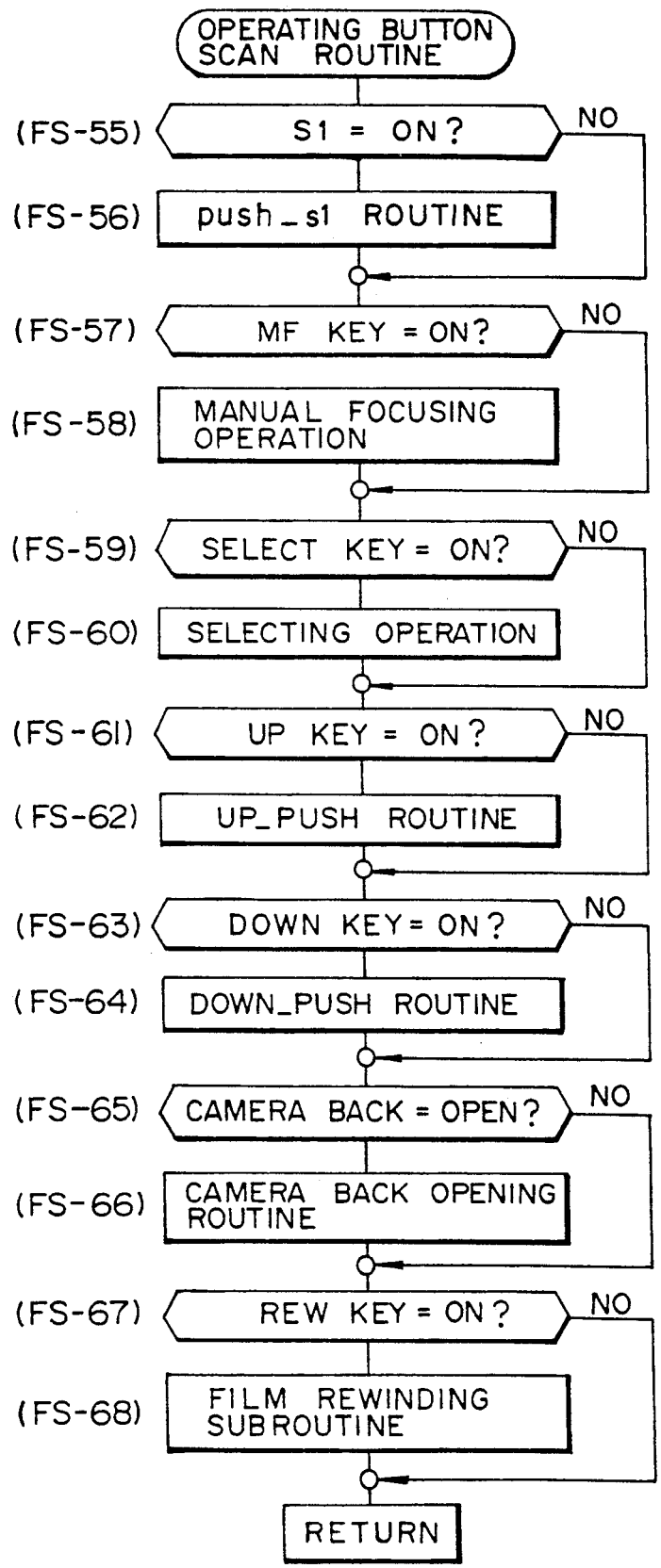
FIG. 24 is a flow chart showing the operating button scan routine.

10-2-3 Operating Button Scan Routine (FIG. 24)

This routine is called in the above described main routine. In this routine, the actualities of operation of the switches and buttons are checked, the processing in response to the operated switches and buttons is carried out and the operation is returned. When switch S1 is set to ON, metering of the range and photometric operation are carried out and the push_s1 routine for selecting the exposing conditions is executed (steps FS55 and 56). When the manual focus (MF) button 16 is set to ON, manual focusing or setting of the focal position of the photographic lens 1 based on operation of the MF button 16 is carried out as described above (steps FS-57 and 58). When the select button 17 is set to ON, SELECT processing is carried out; for example, the exposure compensation mark is displayed by pressing the select button 17 when the main dial 9 is set at position P as described above and the setting of the exposure compensation value by operating the up button 12 and the down button 14 is enabled (steps FS-59 and 60). When the up button 12 is set to ON, the UP_PUSH routine is executed; for example, the exposure compensation value is changed over to the over-exposure side while the exposure compensation is allowed (steps FS-61 and 62). When the down button 14 is set to ON, the DOWN_PUSH routine is executed; for example, the exposure compensation value is changed over to the under-exposure side while the exposure compensation is allowed (steps FS-63 and 64). When the camera back is opened, the camera back opening routine is executed (steps FS-65 and 66). When the halfway rewind button is set to ON, the film rewind subroutine is executed (steps FS-67 and 68).

Figure 25:
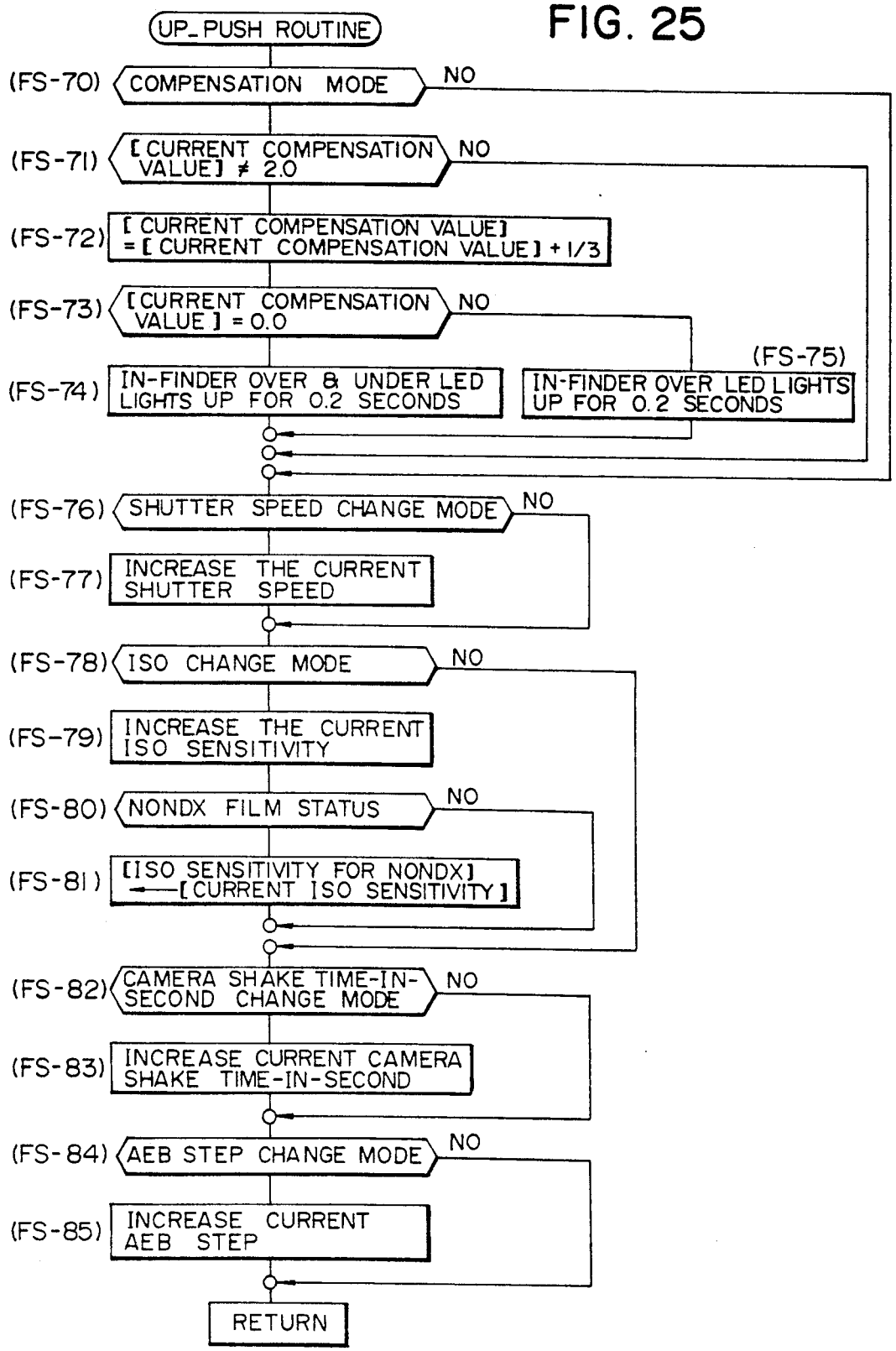
FIG. 25 is a flow chart of the UP-PUSH routine.

10-2-4 UP PUSH Routine (FIG. 25)

This routine is called in the operating button scan routine. In this routine, when "CURRENT COMPENSATION VALUE" in the exposure compensation mode is not "2" as the maximum value, 1/3 is added to "CURRENT COMPENSATION VALUE (steps FS-70 ~ 72). When "CURRENT COMPENSATION VALUE" is consequently "0", the over LED and the under LED in the viewfinder are displayed for 0.2 seconds (steps FS-73 and 74) and the operation proceeds to step (FS-76) and following steps. On the other hand, if "CURRENT COMPENSATION VALUE" does not become "0" even though only $\frac{1}{3}$ is added, only the over LED in the viewfinder is displayed for 0.2 seconds (step FS-75) and the operation proceeds to step (FS-76) and following steps. When the compensation mode is not selected and "CURRENT COMENSATION VALUE" in the exposure compensation mode is already "2" as the maximum value, the operation proceeds to step (FS-76) and following steps without any addition to "CURRENT COMPENSATION VALUE".

In step (FS-76) and following steps, an "up" processing in response to the mode selected is carried out and the operation returns. When the shutter motor speed change mode is selected, "CURRENT SHUTTER SPEED" is increased step by step (steps FS-76 and 77). When the ISO change mode is selected, "CURRENT ISO SENSITIVITY" is increased step by step. In case of a non-DX film, "CURRENT ISO SENSITIVITY" is changed to "NON-DX ISO SENSITIVITY" but, in case of the mode other than the non-DX film, "CURRENT ISO SENSITIVITY" remains increased (steps FS-78 ~ 81). When "CAMERA SHAKE CRITICAL SHUTTER SPEED CHANGE MODE" IS SELECTED, the current critical shutter speed for camera shake is increased (steps FS-82 and 83) and, when the AEB step change mode is selected, the value of change of the current AEB step is increased (steps FS-84 and -85).

Figure 26:
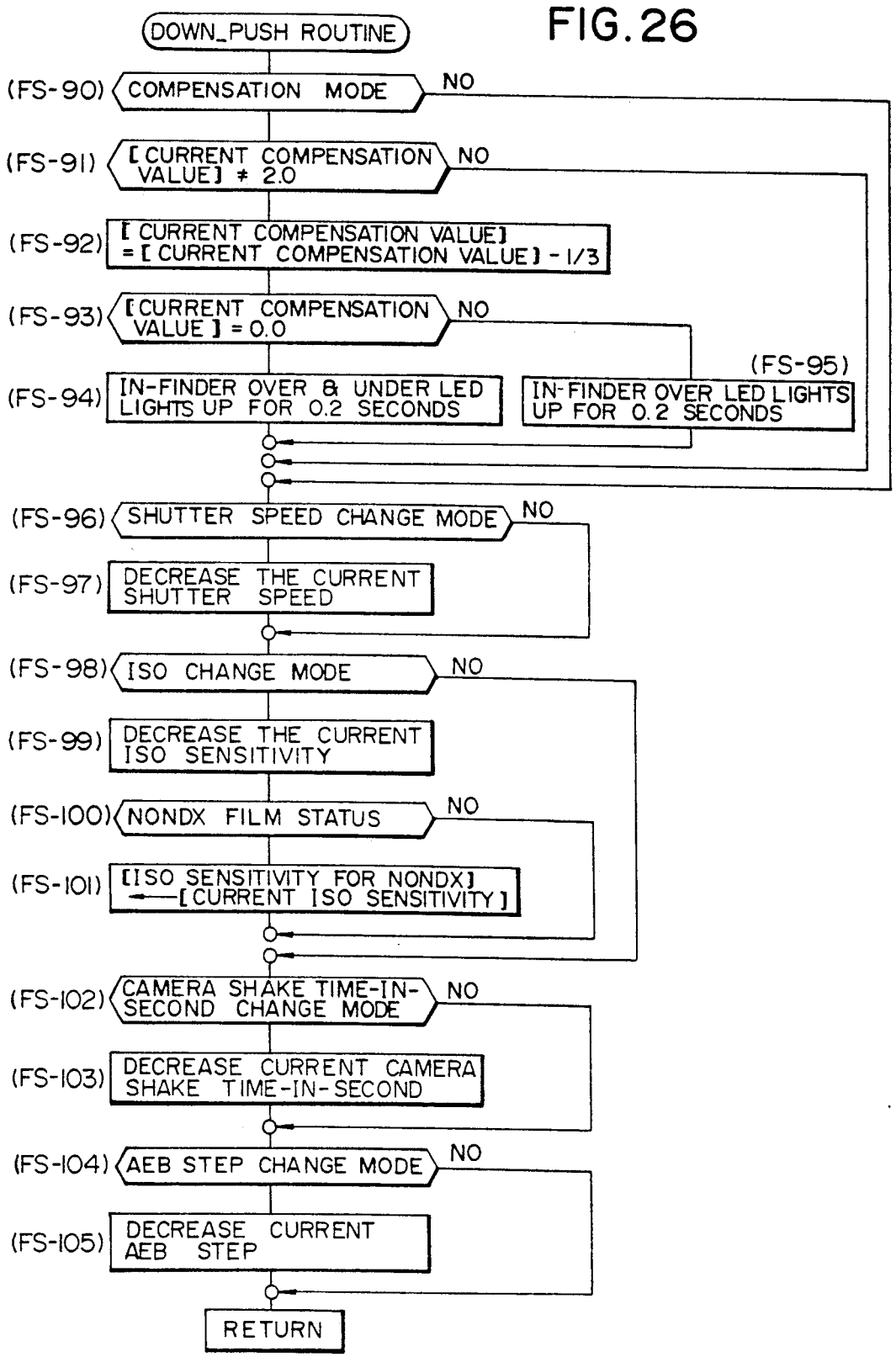
FIG. 26 is a flow chart of the DOWN-PUSH routine.

10-2-5 DOWN_PUSH Routine (FIG. 26)

This routine is called in the operating button scan routine. In this routine, when "CURRENT COMPENSATION VALUE" in the exposure compensation mode is not "−2" as the minimum value, $\frac{1}{3}$ is subtracted from "CURRENT COMPENSATION VALUE" (steps FS-90 ~ 92). When "CURRENT COMPENSATION VALUE" is consequently "0", the over LED and the under LED in the viewfinder are displayed for 0.2 seconds (steps FS-93 and 94) and the operation proceeds to step (FS-76) and following steps. On the other hand, if "CURRENT COMPENSATION VALUE" does not become "0" even though $\frac{1}{3}$ is subtracted, only the over LED in the viewfinder is displayed for 0.2 seconds (step FS-95) and the operation proceeds to step (FS-96) and following steps. When the compensation mode is not selected and "CURRENT COMENSATION VALUE" in the exposure compensation mode is already "−2" as the minimum value, the operation proceeds to step (FS-96) and following steps without any subtraction from "CURRENT COMPENSATION VALUE".

In step (FS-96) and following steps, a "down" processing in response to the mode selected is carried out and the operation returns. When the shutter motor speed change mode is selected, "CURRENT SHUTTER SPEED" is decreased (steps FS-96 and 97). When the ISO change mode is selected, "CURRENT ISO SENSITIVITY" is decreased. In case of a non-DX film, "CURRENT ISO SENSITIVITY" is changed to "NON-DX ISO SENSITIVITY" but, in case of the mode other than the non-DX film, "CURRENT ISO SENSITIVITY" remains decreased (steps FS-98 ~ 101). When "CAMERA SHAKE CRITICAL SHUTTER SPEED CHANGE MODE" IS SELECTED, the current critical shutter speed for camera shake is decreased (steps FS-102 and 103) and, when the AEB step change mode is selected, the value of change of the current AEB step is decreased (steps FS-104 and -105).

10-3 Setting of Photographic Conditions

10-3-1 Determination of Photographic Conditions

The following describes the P computation routine, P mode S1 computation routine, AM mode S1 computation routine, M mode S0 computation routine and flash mode S1 computation routine. In these routines, the aperture values and the shutter speeds are computed. Before description of these routines, the formulae for obtaining the aperture values and the shutter speeds, and control values, constants and variables to be used in the above described routines are described below.

A formula shown below is given for the relationship of the shutter speed, brightness and aperture value.

$$tv = (lv + sv + cv) - (av + OFFSET + av\_adjust) \quad [Formula\ 1]$$

tv : shutter speed
lv : brightness (EV value when ISO sensitivity is 100)
sv : ISO sensitivity  av : aperture value
cv : compensated value  OFFSET : 4 (constant)
av adjust : compensation of aperture error (constant)

In the above routines, (lv + sv + cv) is processed as variable [tv0] and (av + OFFSET + av_adjust) as variable [tv1]. when obtaining the aperture value and the shutter value based on the formula given above, the microcomputer 80 uses the control values shown in FIGS. 27 and 28.

FIGS. 27 and 28 show the control values (shown in "#" column) to be used by the microcomputer 80 in correspondence to lv (brightness), tv (shutter speed), sv (ISO sensitivity), av (aperture value), cv (compensated value), gv (guide No.) and afz (distance to the subject). For example, the microcomputer 80 uses 12 for the brightness of +2.00, 6 for the shutter speed of 1/30 seconds, 24 for ISO sensitivity 100, 18 for F 5.6 aperture value, 12 for compensated value 0, 0 for guide No.0 and 11 for the distance to the subject of 5.5 m for respective computations. It is determined that 6 is added to each of control values related to computation of the exposure for each of one-step higher corresponding values.

FIGS. 29 and 30 are the Flashmatic tables showing the table No. corresponding to the control values for afz (distance to the subject) shown in FIGS. 27 and 28 and used in computation of appropriate F values for flash.

FIGS. 31 and 32 show the constants and variables to be used in respective routines. As regards the main variables, An aperture value to be actually executed is finally set as the "EXECUTION APERTURE VALUE" of variable. An aperture value specified by the aperture dial 11 is set as the "INPUT APERTURE VALUE" of variable. A shutter speed to be actually executed is finally set as the "EXECUTION SPEED" of variable.

Figure 33:
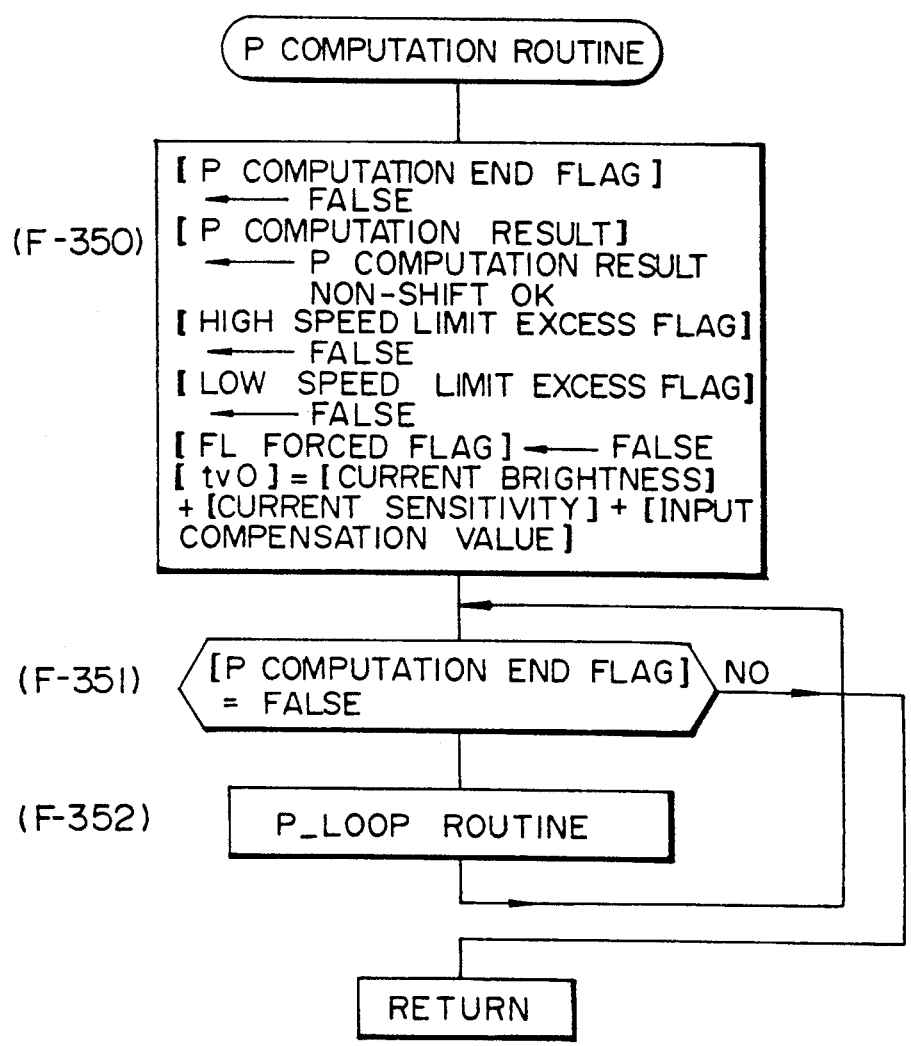
FIG. 33 is a flow chart showing the P computation routine.
Figure 34A:
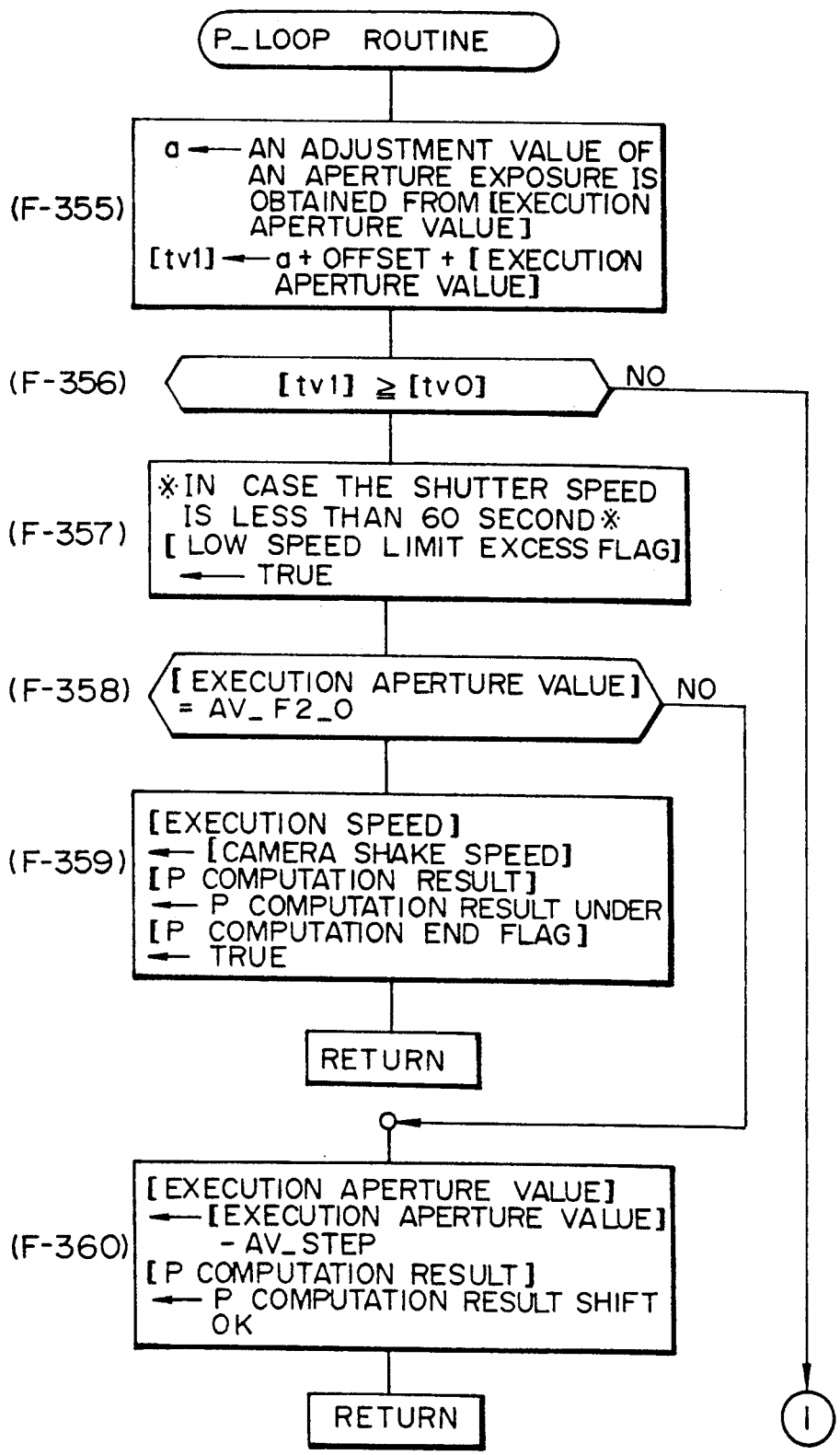
FIGS. 34A to 34E are respectively a flow chart showing the P-LOOP routine.
Figure 34B:
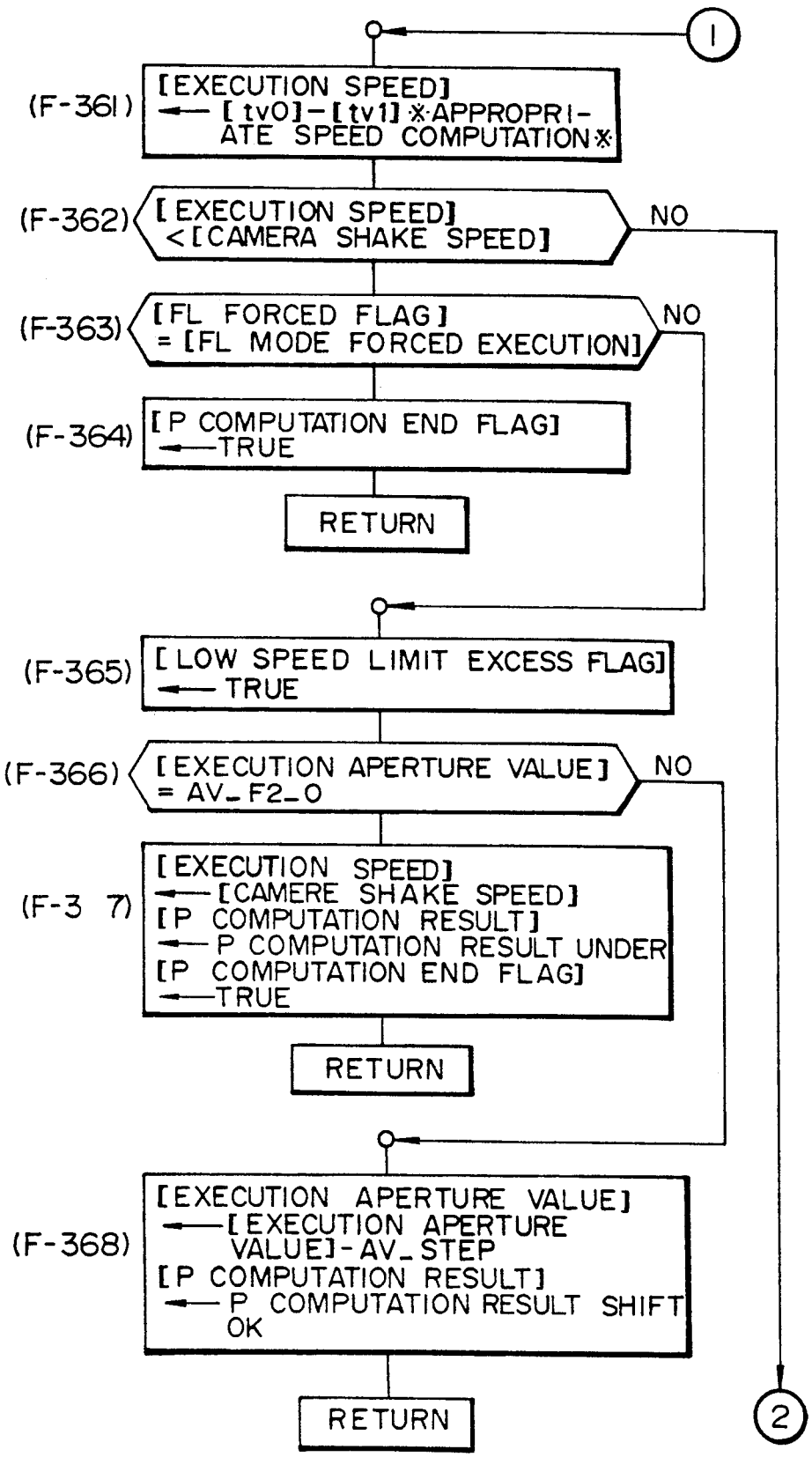
Figure 34C:
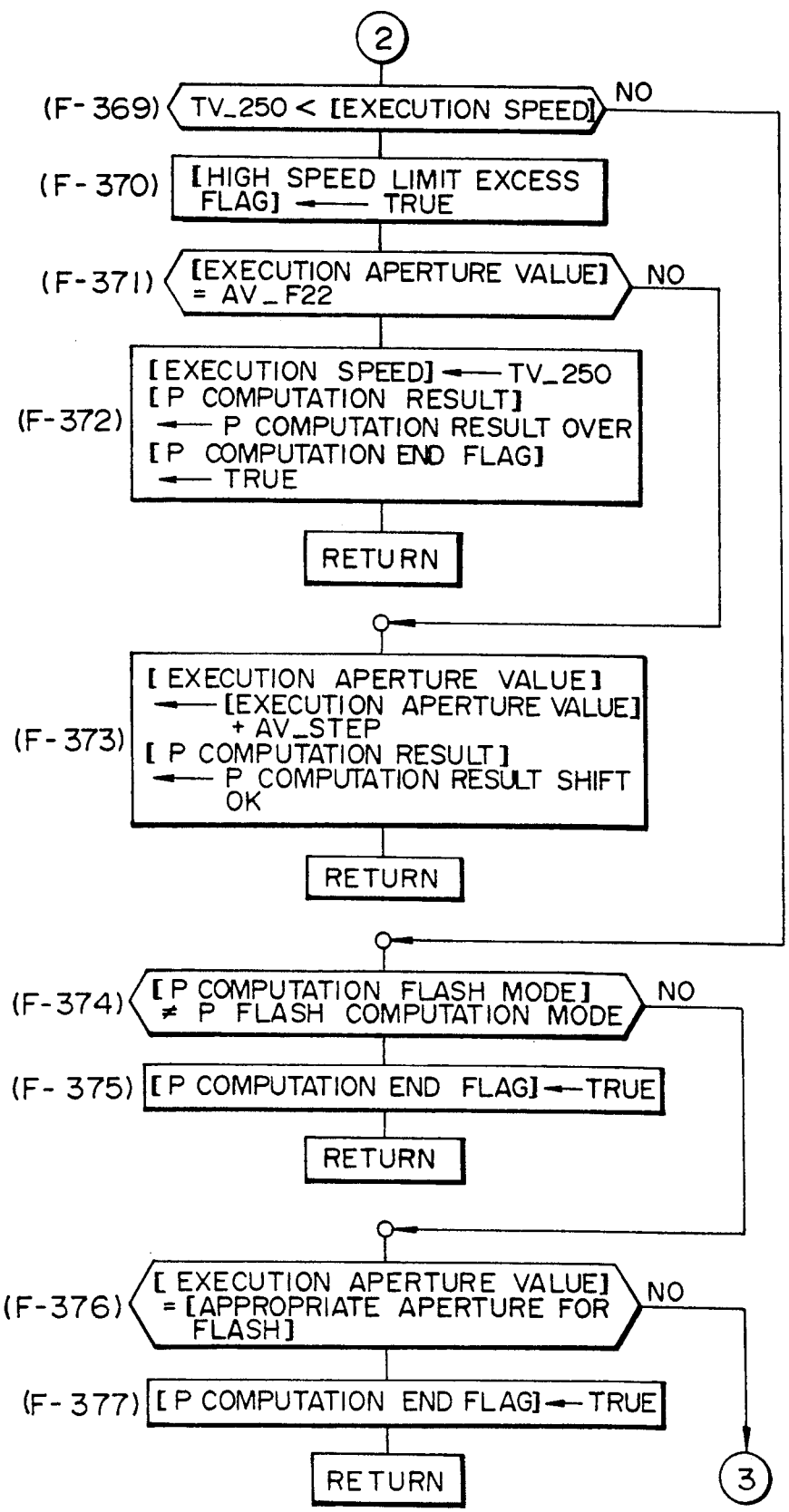
Figure 34D:
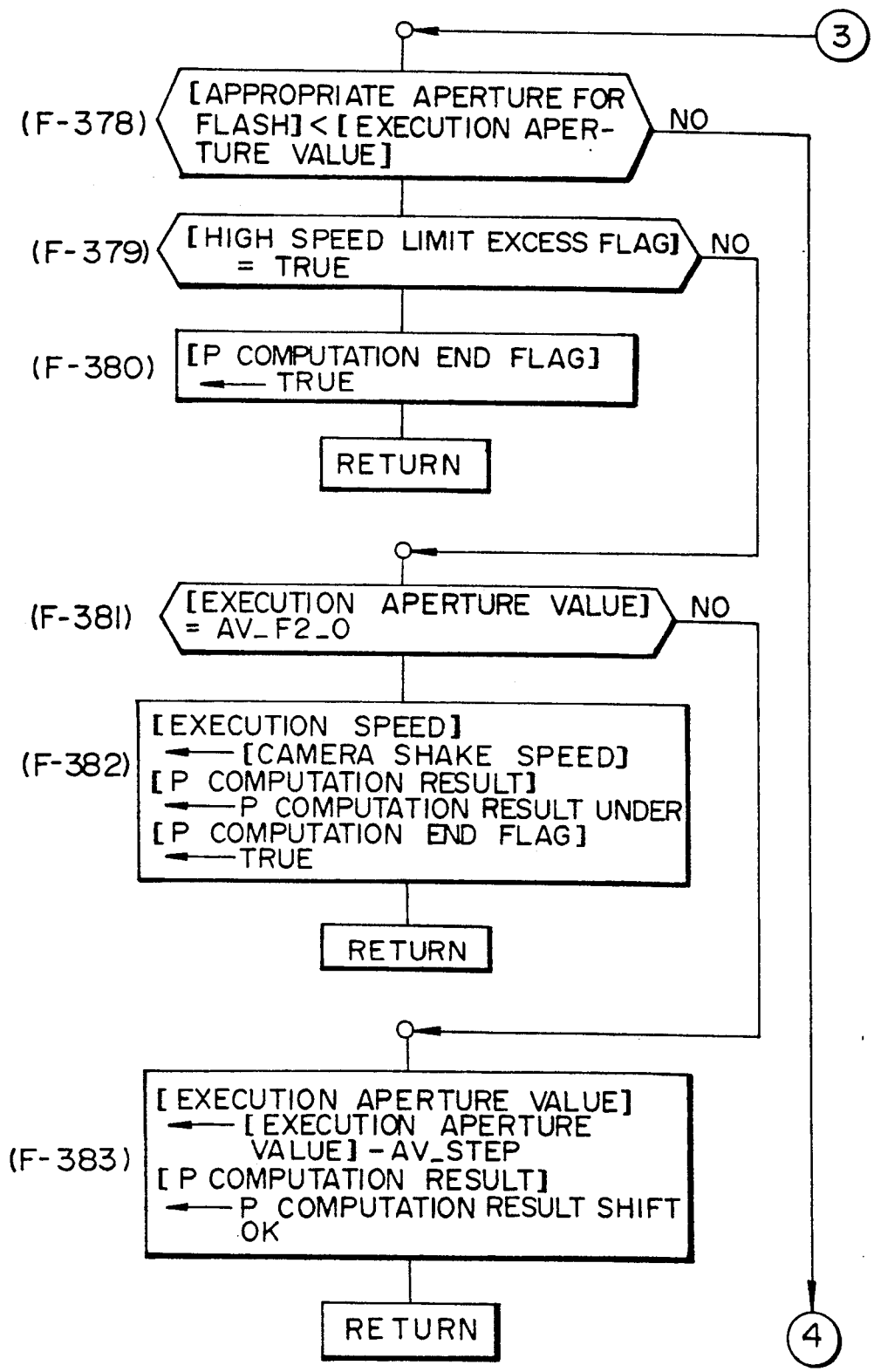
Figure 34E:
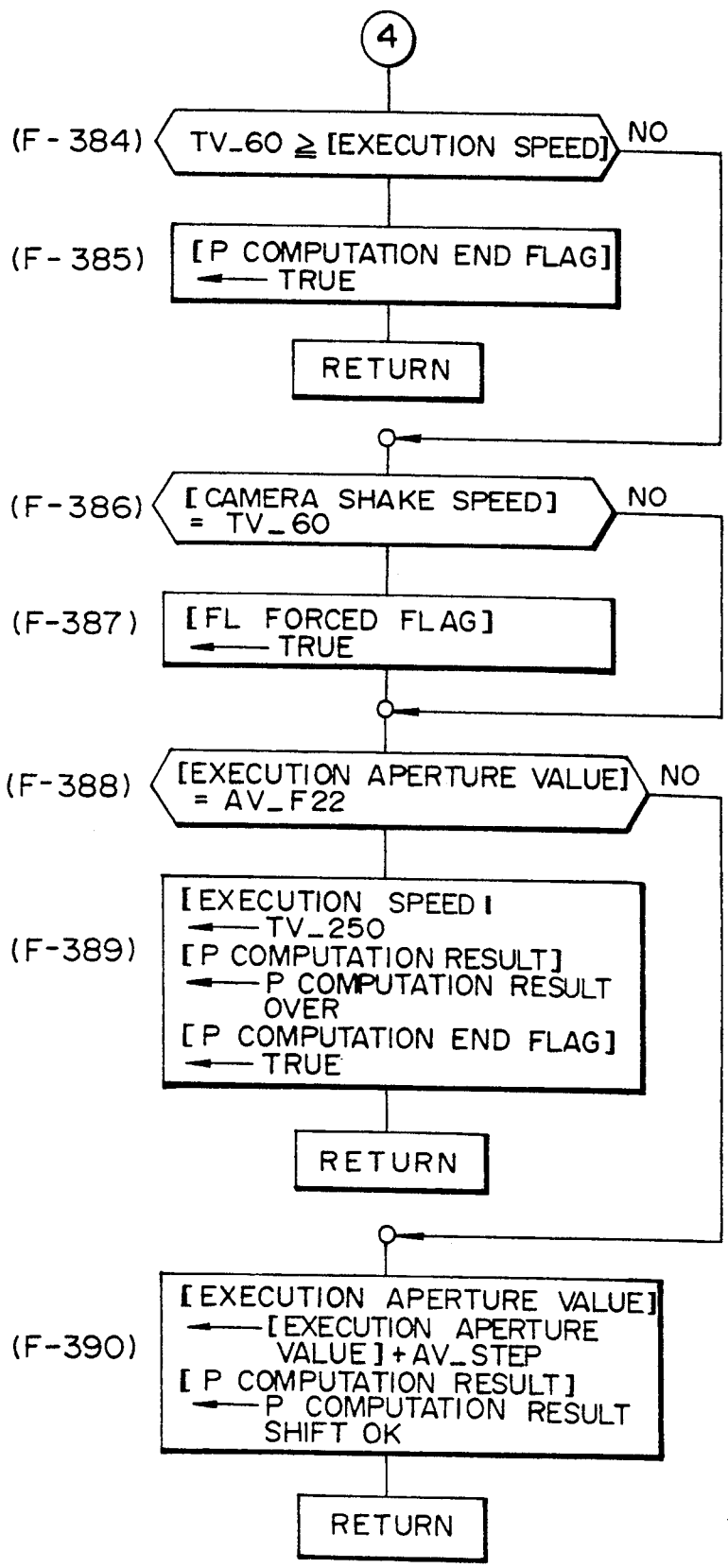

10-3-2 P Computation Routine (FIG. 33)

In this routine, an appropriate shutter speed is automatically in accordance with the brightness of the subject in reference to the aperture value specified by the aperture dial 11. However, when an appropriate exposure control is impossible only with a change of the shutter speed, the aperture is automatically shifted. In other words, the exposure is controlled so that, when the brightness of the subject is dark and the shutter speed slower than the critical shutter speed for camera shake is selected, the aperture value is changed to the opening side and, when the subject is light and the shutter speed faster than the maximum shutter speed is selected, the aperture value is changed to the closing side. The P computation routine is for computing this shift of the aperture. In this routine, the P computation end flag is reset, the P computation result is changed to the P computation result non-shift OK, the high speed limit excess flag, low speed limit excess flag and FL forced flag are reset, current brightness + current sensitivity + input compensation value is computed and the result of this computation is regarded as tv0 (step FS-350). To reduce the computation time, tv0 which can be computed at this timing is computed in advance. Then, the P0LOOP routine described below is executed until the P computation end flag is set (steps FS-351 and 352) and the operation is returned.

10-3-3 P-LOOP Routine (FIGS. 34A to 34E)

In this routine, the aperture exposure adjusted value (av_adjust) is obtained from the execution aperture value and the computed value of (aperture exposure adjusted value + OFFSET + execution aperture value) is assumed as tv1 (step F-355). Then, tv1 - ≧ tv0 is determined and, when tv1 ≧ tv0 is given or the shutter speed is slower than 60 seconds, the values corresponding to the control values shown in FIGS. 27 and 28 are unavailable and therefore the low speed limit excess flag is set (steps F-356 and 357). In this case, when the execution aperture value is F 2.0 as the open aperture, the critical shutter speed for camera shake is set as the execution speed, P computation result "under" is set as the result of P computation, the P computation end flag is set (steps F-358 and 359) and the operation is returned. If the execution aperture value is not F 2.0 as the open aperture and the aperture value can be increased to the opening side when the shutter speed is slower than 60 seconds, the execution aperture value is changed by increasing the execution aperture value as much as a half aperture, setting P computation result shift OK as the P computation result (steps F-358 and 360) and returning the operation. When the shutter speed is faster than 60 seconds and the shutter speed computation is possible for appropriate exposure, the result of computation of (tv0 − tv1) is set as the execution speed (step F-361). When the set execution speed is slower than the critical shutter speed for camera shake and the FL forced flag is set (steps F-362 and 363), the P computation end flag is set (step F-364) and the operation is returned. When the set execution speed is slower than the critical shutter speed for camera shake and the FL forced flag is reset, the low speed limit excess flag is set (step F-365). When the execution aperture value is F 2.0 as the open aperture, the critical shutter speed for camera shake is set as the execution speed, P computation result "under" is set as P computation result, the P computation end flag is set (steps F-366 and 367) and the operation is returned. When the execution aperture value is not set to F 2.0 as the open aperture and the aperture can be expanded to the opening side in case the shutter speed is slower than the speed for camera shake, the execution aperture value is changed by increasing the execution aperture value as much as a half step, setting P computation result shift OK as the P computation (step F-368) and returning the operation so that an appropriate shutter speed can be computed.

When the execution speed is faster than the maximum speed, the high speed limit excess flag is set (steps F-369 and 370). When the execution aperture value is F 22 as the minimum aperture in case the execution speed is faster than the maximum speed, the maximum speed is set as the shutter execution speed, P computation result "over" is set as the P computation result, the P computation end flag is set (steps F-371 and 372) and the operation is returned. When the execution speed is faster than the maximum speed and the execution aperture value is not set to F 22 as the minimum aperture and can be further stopped down, the execution aperture value is changed by increasing the execution aperture valve as much as a half step, setting P computation result shift OK as the P computation (step F-373) and returning the operation so that an appropriate shutter speed can be computed. If the P computation flash mode is not the P flash computation mode when the execution speed is lower than the maximum speed, the P computation end flag is set (steps F-374 and 375) and the operation is returned.

The shutter speed is selected through the above processing so that the set aperture value is obtained. However, if the shutter speed is out of the range of interlock, the aperture value which is set as described above is gradually changed and the shutter speed is controlled to be within the range of interlock. In other words, it is controlled so that it is controlled so that the aperture value as close to the set aperture value as possible is obtained.

When the P computation flash mode is the P flash computation mode, the processing of step (F-376) and following steps is carried out. The significance of this processing is described below, referring to FIG. 39. The appropriate aperture value for flash is obtained in view of only the distance to the subject without taking an external light into account as described later and therefore it may differ from the execution aperture value. In this case, if flash photography is executed with the execution aperture value, the flash is insufficient as "under" or excessive as "over". For example, if flash photography is carried out with the execution aperture value in the case that the external light is extremely bright and the distance to the subject is long and therefore the appropriate aperture value for flash is smaller than the execution aperture value, the flash is insufficient as "under". On the contrary, if flash photography is carried out with the execution aperture value in the case that the external light is dark and the distance to the subject is short and therefore the appropriate aperture value for flash is larger than the execution aperture value, the flash is excessive as "over". The aperture should be stopped down to avoid such over-flash. In case of variable aperture synchro photography, it is necessary to move the shutter while the shutter is open and change the shutter speed (execution speed) to be slower than 1/60 seconds for the relation to the aperture speed. The aperture is changed to eliminate under or over-flash while the execution speed is within the range of critical shutter speed for camera shake to 1/60 seconds.

This change of the aperture is shown in FIG. 39. At the timing when the operation has proceeded to step (F-376), the execution speed is one of 1/60 ~ 1/250 seconds shown in [2] or 1/15 (critical shutter speed for camera shake) ~ 1/60 seconds shown in [3]of the table. When the appropriate aperture value for flash is equal to the execution aperture value in the case that the execution speed is 1/60 ~ 1/250 seconds or critical shutter speed for camera shake ~ 1/60 seconds as shown with OK in Table 7, the aperture is not changed since the under or over-flash as described above does not occur. On the contrary, When the appropriate aperture value for flash is smaller than the execution aperture value in the case that the execution speed is 1/60 ~ 1/250 seconds or critical shutter speed for camera shake ~ 1/60 seconds, the aperture is opened to avoid the above described underflash. When the appropriate aperture value for flash is larger than the execution aperture value in the case that the execution speed is 1/60 ~ 1/250 seconds, the aperture is stopped down to avoid the above described over-flash. Also, when the appropriate aperture value for flash is larger than the execution aperture value in the case that the execution speed is critical shutter speed for camera shake ~ 1/60 seconds, the over-flash occur. However, in case of this execution speed, the above described over-flash can be eliminated owing to the variable aperture synchro photography described later and therefore the aperture is not changed.

When the execution speed is 1/250 seconds as the high speed limit or over as shown in column [1] of FIG. 35, the high speed limit excess flag is set and the aperture is stopped down. These processings are executed in steps (F-370 and 373). When the execution speed is below the critical shutter speed for camera shake as the low speed limit as shown in column [4] of FIG. 39, the low speed limit excess flag is set and the aperture is opened. These processings are executed in the above described steps (F-357 and 360). The high speed limit excess flag and the low speed limit excess flag are utilized as described below. More specifically, when the aperture is changed, this P-LOOP routine is repeatedly executed, alteration of the aperture as close to the appropriate aperture for flash as possible and the shutter speed is executed. In this case, if the high speed limit excess flag or the low speed limit excess flag is set, repetition of this P-LOOP routine is stopped to avoid infinite looping.

Step (F-376) and following steps of this P-LOOP routine are described below.

When the appropriate aperture value for flash obtained from the flash appropriate F value computation routine described later is equal to the execution aperture value, the P computation end flag is set (steps F-376 and 377) and the operation is returned. When the P computation end flag is set and the operation is returned as described above, the repetition of this P-LOOP routine is stopped as known from step (F-351).

When the appropriate aperture value for flash is not equal to the execution aperture value, the processing as described below is carried out. When the appropriate aperture value for flash is smaller than the execution aperture value or as shown in [2] or [3] of [A] of FIG. 39 and the high speed limit excess flag is set (steps F-378 and 379), the P computation end flag is set (step F-380) and the operation is returned. When the appropriate aperture value for flash is as shown in [2] or [3] of [A] of FIG. 39 and the high speed limit excess flag is set, it is determined whether or not the execution aperture value is F 2.0 for the open aperture (F-381). If the execution aperture value is F 2.0, the aperture is not further opened and therefore the execution aperture value is set as the critical shutter speed for camera shake to minimize the under-flash, he P computation result is set as P computation result "under", the P computation end flag is set (step F-382) and the operation is returned. If the appropriate aperture value for flash is not F 2.0, the aperture can be further opened and therefore the execution aperture value is opened as much as a half step (AV-STEP), the P computation result is set as the P computation result shift OK (step F-383) and the operation is returned.

When the appropriate aperture value for flash is determined larger than the execution aperture value in step (F-378), that is, as shown in [C] of FIG. 35, the P computation end flag is set (steps F-384 and 385) if the execution speed is 1/60 seconds or less and the operation is returned. If the execution speed is faster than 1/60 seconds and the critical shutter speed for camera shake is 1/60 seconds, the FL forced flag is set to avoid repetition of the values shown in [2] and [3] of [C] of FIG. 39 and the operation is returned. On the contrary, if the execution speed is faster than 1/60 seconds and the critical shutter speed for camera shake is not 1/60 seconds, it is determined whether or not the execution aperture value is F 22 for the minimum aperture (step F-388). If it is F 22, the aperture cannot be further stopped down and therefore the execution speed is set to 1/250 seconds as the high speed limit to minimize the over-flash, the P computation result is determined as over , the P computation end flag is set (step F-389) and the operation is returned. If the execution speed is not F 22, the aperture can be further stopped down as much as a half step (AV-STEP), the P computation result is set as P computation result shift OK (step F-390) and the operation is returned.

Figure 36C:
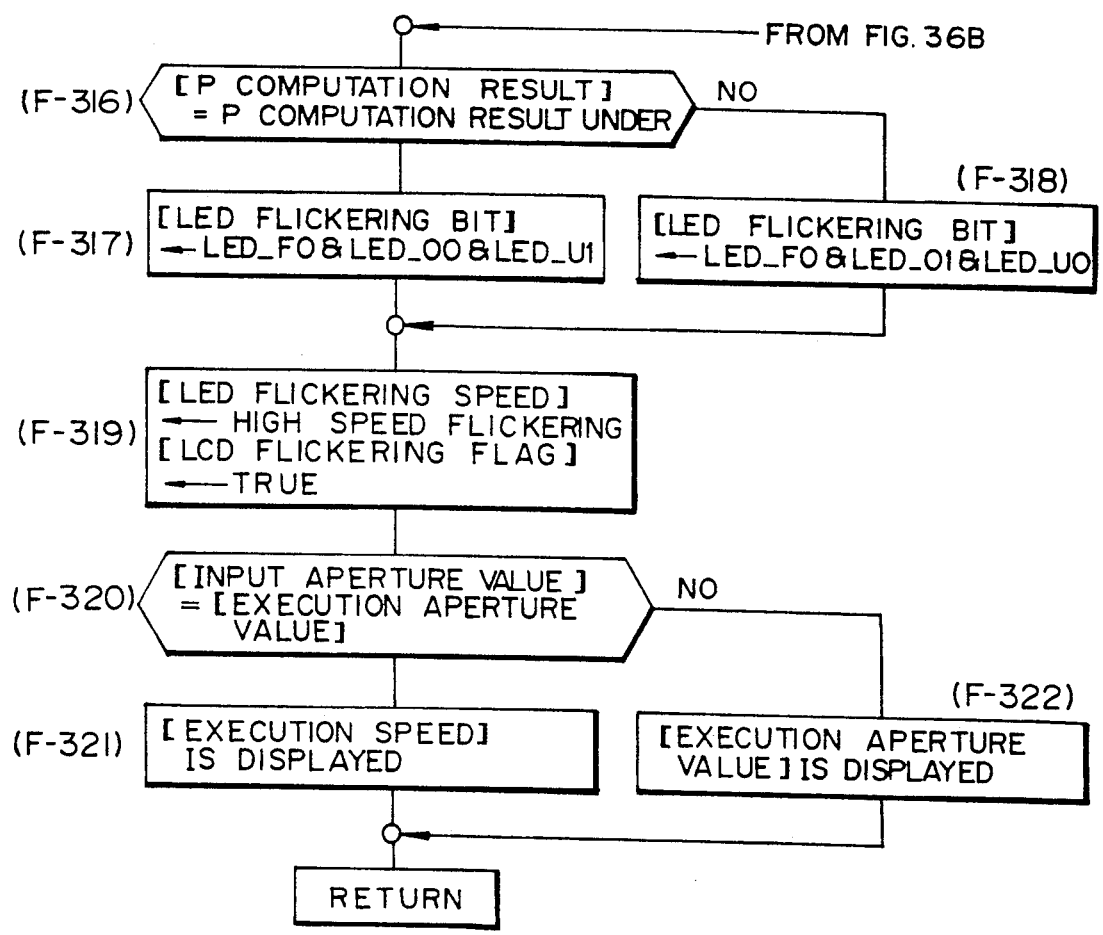
Figure 37B:
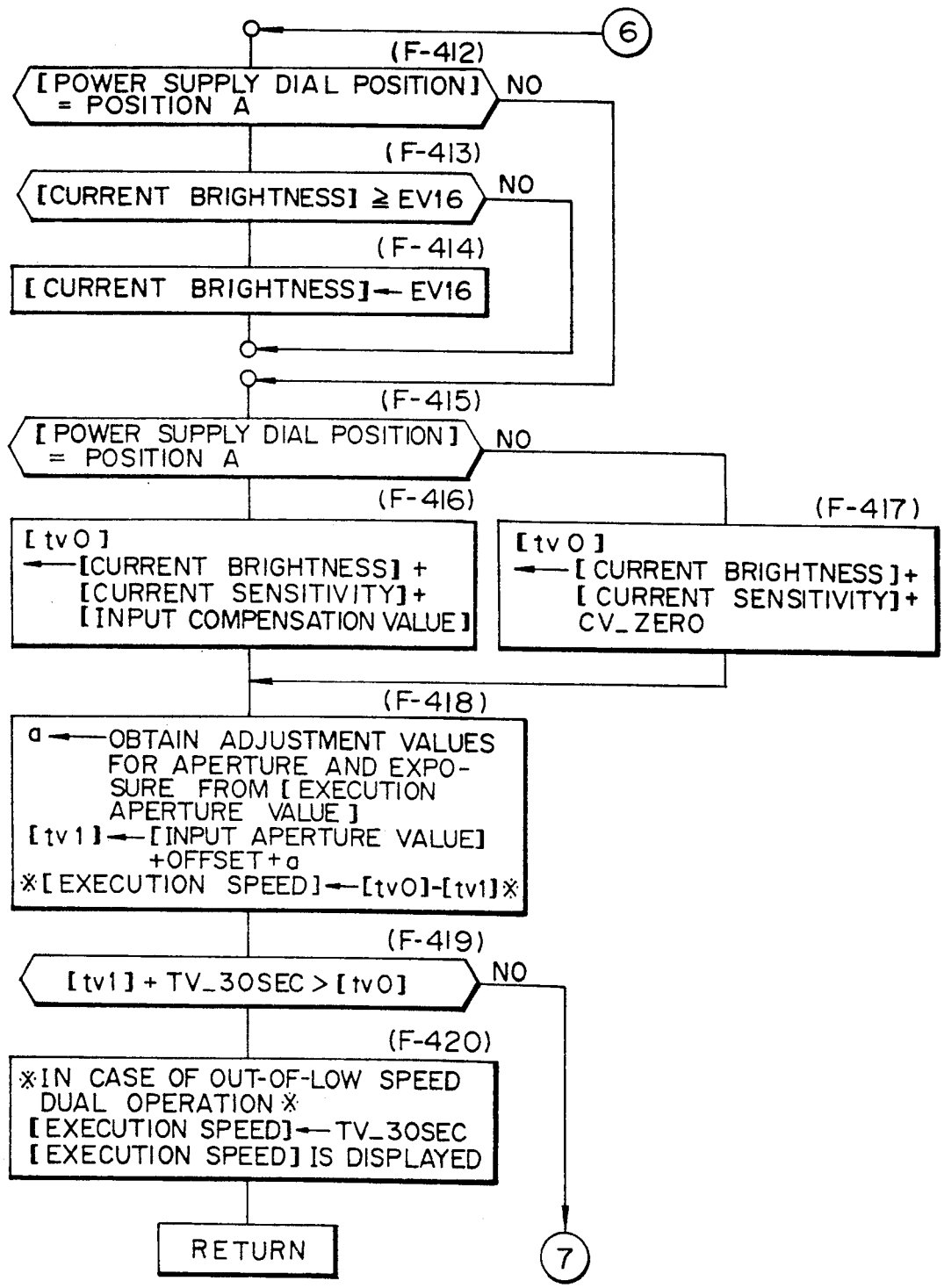
Figure 37C:
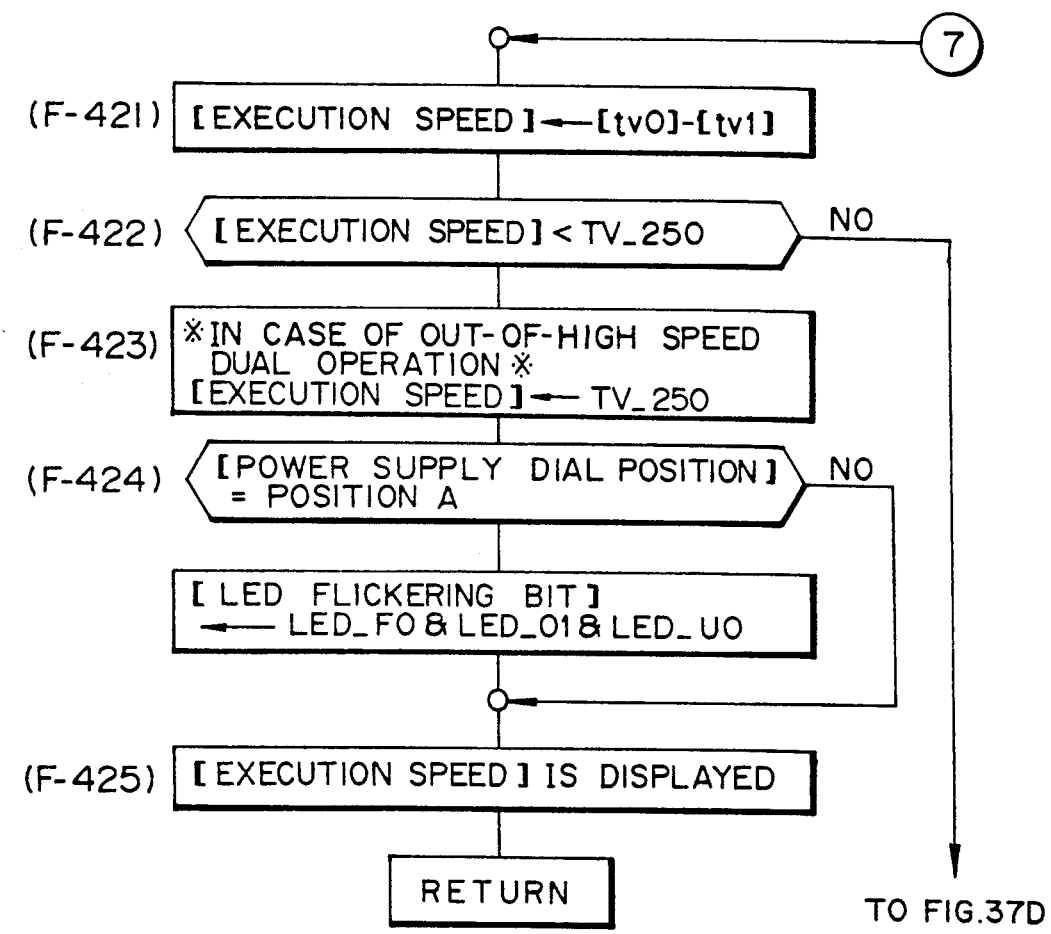
Figure 37D:
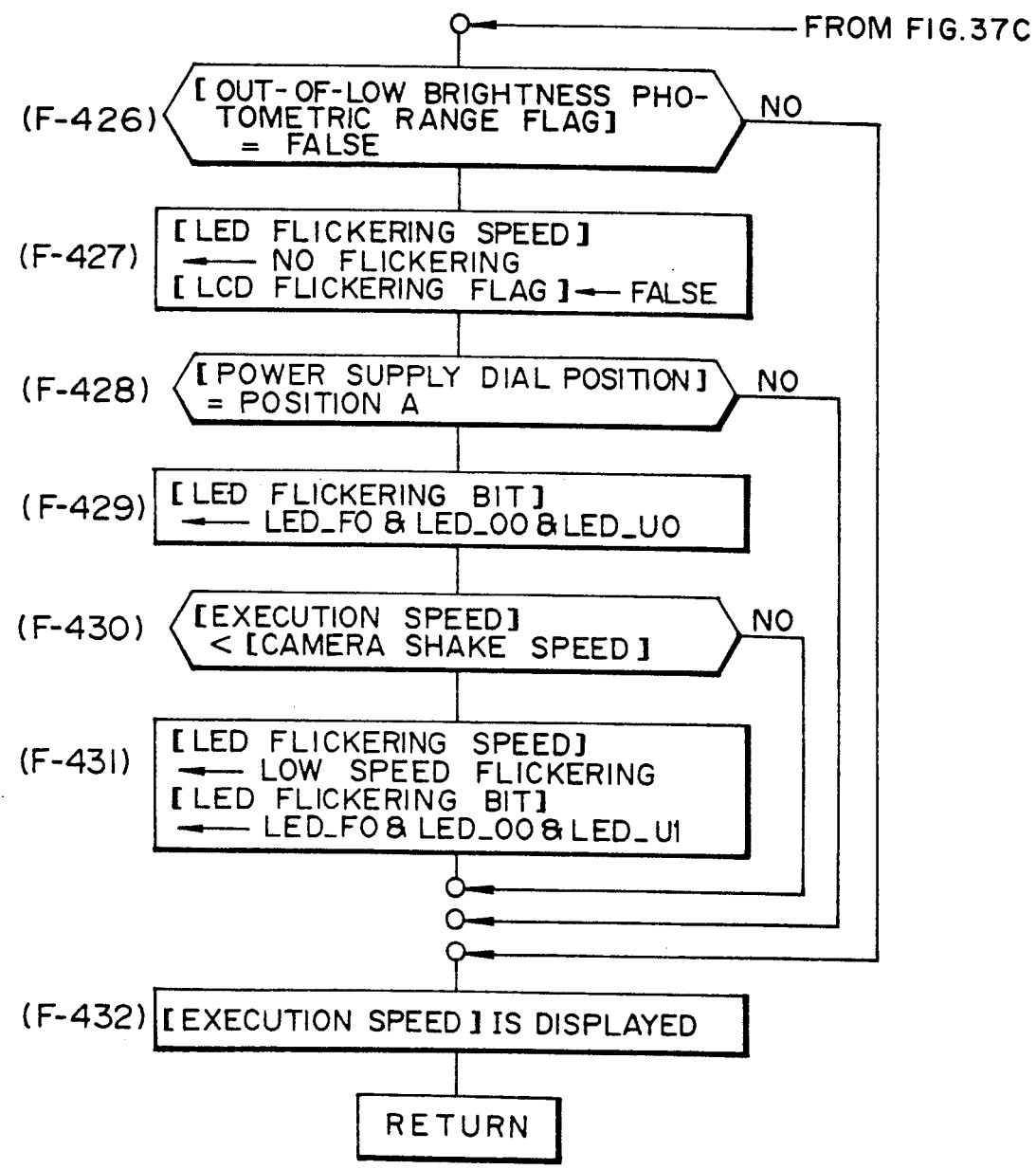

10-3-4 P Mode S1 Computation Routine (FIGS. 36A to 36C)

This routine is used to obtain the shutter speed suited to the preset aperture value according to the program line diagram as shown in FIG. 4. If an appropriate exposure is not obtained only by changing the shutter speed, the aperture value is also changed.

In this routine, "INPUT APERTURE VALUE" is regarded as "EXECUTION APERTURE VALUE" and "P COMPUTATION FLASH MODE" is regarded as the regular light computation mode (step F-300). Then, whether the current brightness is a minus value larger than LV_MAX (108), that is, EV0 or less is determined (step F-301) and, if it is EV0 or less, the processing of steps (F-302 ~ 308) is executed. In other words, the P computation routine is carried out, assuming that the current brightness is 0 (step F-302). When the P computation result is P computation result non-shift OK the shutter speed can be computed without shifting the aperture value set by the user (this case occurs when the external light is extremely dark and the ISO sensitivity is abnormally high), the execution speed is displayed, "LED FLICKERING SPEED" is displayed in high speed flickering, "LED FLICKERING BIT" is displayed as "UNDER" and the LCD flickering flag is set to display the "UNDER" alarm (steps F-303 and 304) and the operation is returned. When the input aperture value is equal to the execution aperture value or an appropriate exposure is obtained without changing the aperture value set by the user in the case that the P computation result is not P computation result shift OK, the execution shutter speed is displayed and, when "INPUT APERTURE VALUE" is not equal to "EXECUTION APERTURE VALUE" and the appropriate exposure cannot be obtained with the aperture value set by the user and therefore the aperture value is changed, the execution aperture value as the result of alteration is displayed (steps F-305 ~ 307). The LED flickering flag is displayed in high speed flickering. "LED FLICKERING BIT" is displayed as "UNDER" and the LCD flickering flag is set to display the "UNDER" alarm (step F-308) in flickering and the operation is returned.

When "CURRENT BRIGHTNESS" is determined EV0 or over in step (F-301), the current brightness is forcibly set to EV16 if the current brightness is larger than EV16 and if it is not larger than EV16, the current brightness is not changed, nothing of the LED flickering BIT is displayed, the LED flickering speed is set without flickering, the LCD flickering flag is reset with nothing displayed and the P computation routine is executed (steps F-309 ~ 311). Then, if the P computation result is P computation result non-shift OK, the execution speed is displayed (steps F-312 and 313) and the operation is returned. On the contrary, if it is not P computation result non-shift OK and is P computation result shift OK, the execution aperture value is displayed (steps F-314 and 315) and the operation is returned. If the P computation result is not P computation result shift OK, the bit status of LED flickering BIT is changed so that "UNDER" is displayed in flickering if the P computation result is "under" and "OVER" is displayed in flickering if the P computation result is "over" (steps F-316 ~ 318). Then "LCD FLICKERING FLAG" is set so that the LED flickering speed is high speed flickering (step F-319). If "INPUT APERTURE VALUE" is equal to "EXECUTION APERTURE VALUE", the execution speed is displayed and, if the input aperture value is not equal to the execution aperture value, the execution aperture value is displayed (steps F-320 ~ 322) and the operation is returned.

10-3-5 A-M Mode S1 Computation Routine (FIGS. 37A to 37D)

This routine is executed when the switch S1 is set to ON in the A (aperture priority) mode or M (manual) mode.

If the manual mode is selected and the input speed is set for time exposure (TIME in the table) in this routine, the LED flickering speed is displayed without flickering, the LCD flickering flag is reset, the execution speed is set as the input speed (steps F-400 ~ 402) and the operation is returned.

When the input speed is not set for time exposure in the aperture priority mode or the manual mode, the LED flickering speed is set to high speed flickering to temporarily set the low brightness "UNDER" alarm and the LCD flickering flag is set (step F-403). In the aperture priority mode, the bit information displaying "UNDER" is set to LED flickering BIT and, in the manual mode, this setting is not carried out (steps F-404 and 405). Then, the input aperture value is set as the execution aperture value and the low brightness out-of-photometric range flag is reset (step F-406). If a value larger than LV_MAX 9108) shown in the table, that is a minus value (EV is 0 or less) is set as the current brightness, EV0 is set a the current brightness and the low brightness out-of-photometric range flag is set but, if EV less than 0 is not set, this processing is carried out (steps F-407 and 408). When the manual mode is selected and the current brightness is less than EV3, EV3 is set as the current brightness and, in other cases, this processing is not carried out (steps F-409 ~ 511). When the aperture priority mode is selected and the current brightness is EV16 or over, EV16 is set as the current brightness and, in other cases, this processing is not carried out (steps F-512 ~ 514).

In the aperture priority mode, the computation of (current brightness + current sensitivity + input compensation value) is carried out and the computed value is set as tv0 and, in the manual mode, the computation of (current brightness + current sensitivity + CV ZERO) is carried out and the computed value is set as tv0 (steps F-415 ~ 417). The aperture exposure adjust value (av_adjust) is obtained from the execution aperture value and set in variable [a] and the computed value from computation of (input aperture value + OFFSET + aperture exposure adjust value) is set as tv1 (step F-418). Whether the value of tv1 +6 (30 seconds) is larger than tv0, that is, the execution speed obtained with (tv0 − tv1) is longer than 30 seconds in case of tv0 and v1 shown above is determined and, when the execution speed is longer than 30 seconds, 1/30 seconds is set as the execution speed, 30 seconds are displayed (steps F-419 and 420)and the operation is returned. With the above processing, the slowest execution speed is 30 seconds in the aperture priority mode and the manual mode. When the execution speed is shorter than 30 seconds in case of tv0 and v1 shown above, this execution speed is temporarily set as the execution speed (step F-421). If the set execution speed is faster than the highest speed (1/250 seconds), the execution speed is set again to 1/250 seconds as the highest speed (step F-422 and 423). In case of the aperture priority mode, "OVER" is displayed in flickering in the viewfinder, 1/250 seconds is displayed on the liquid crystal panel and the operation is returned and, in case of the manual mode, only 1/250 seconds is displayed without displaying "OVER" and the operation is returned (steps F-424

~ 426). With the above processing, the highest execution speed is 1/250 seconds in the aperture priority mode and the manual mode.

When the execution speed is less than the critical shutter speed for camera shake set by processing of steps (F-428 ~ 434), the execution speed is displayed in low speed flickering and the operation is returned.

Figure 38A:
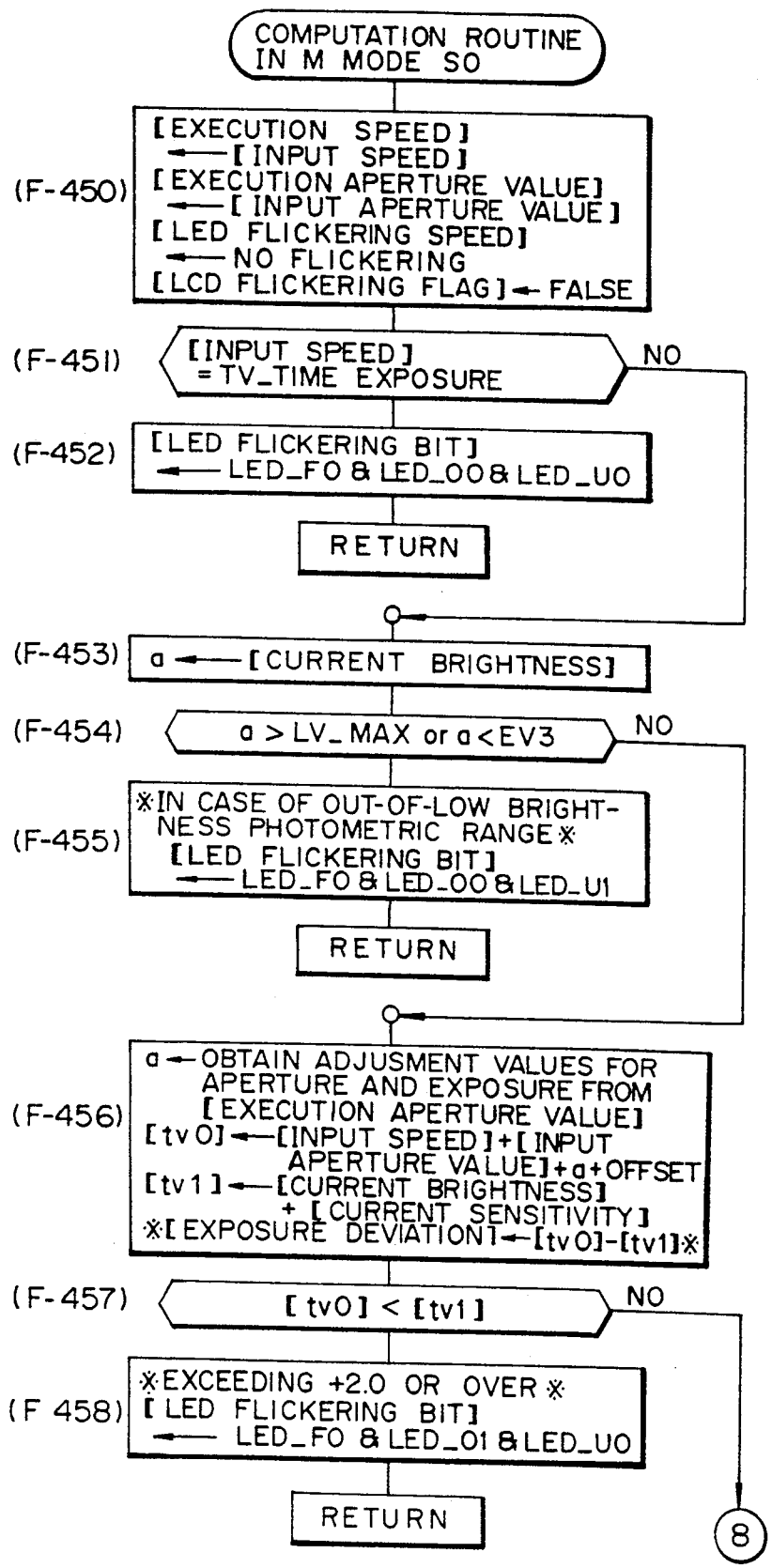
FIGS. 38A to 38B are respectively a flow chart showing a computation routine in the M mode S0.
Figure 38B:
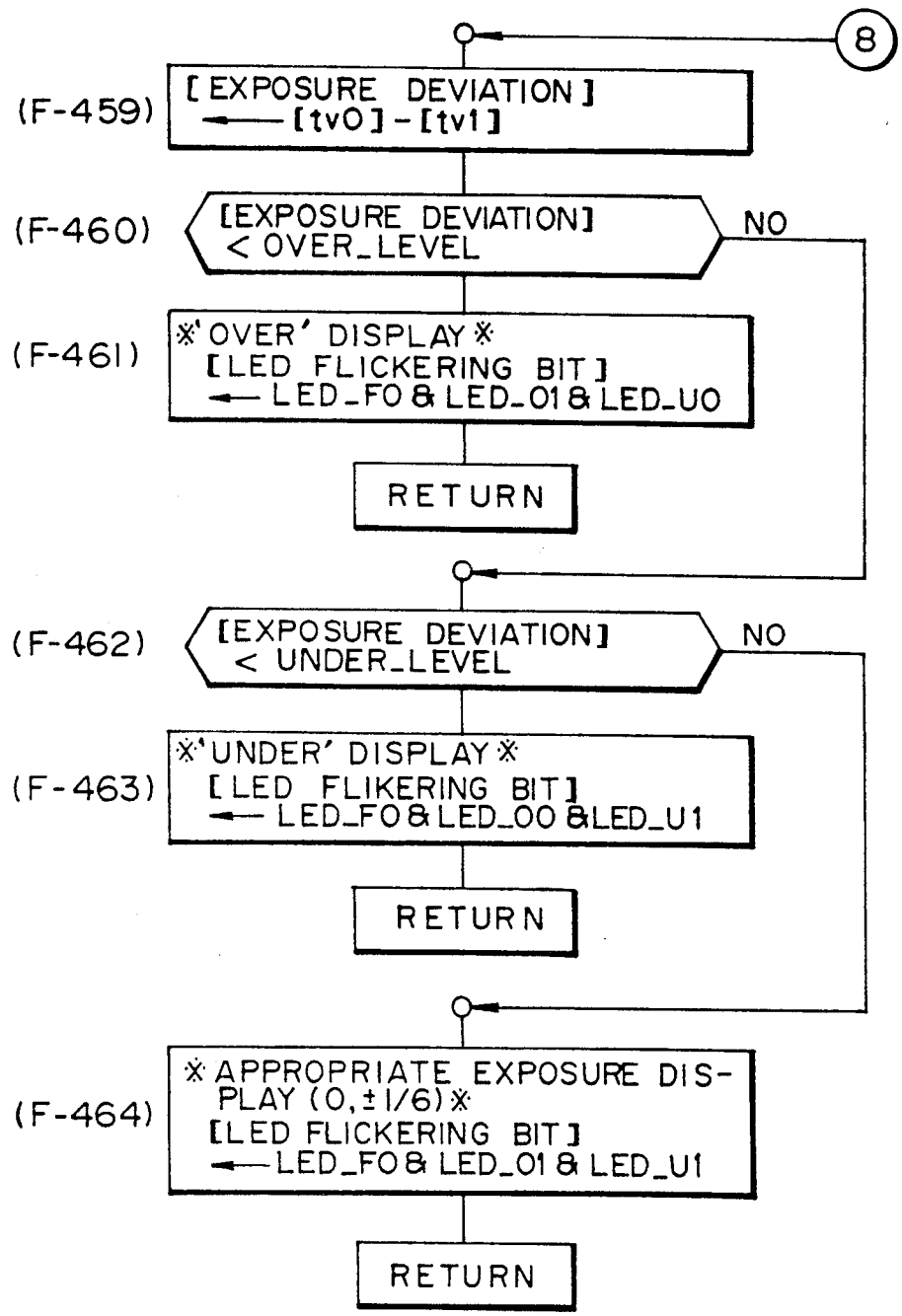

10-3-6 M Mode S0 Computation Routine (FIGS. 38A and 38B)

This routine is for displaying "+" and "−" with LEDs in the viewfinder in the manual mode.

In this routine, the following formula transformed from Formula 1 is used.

[Formula 2]

*Exposure deviation (cv) = Input speed (tv) + Input aperture value (av) + OFFSET = Aperture exposure adjusted value (av adjust) − {Current brightness (1v) + Current sensitivity (sv)}*

Initialization is conducted by setting the input speed as the execution speed, the input aperture value as the execution aperture value and the LED flickering speed as a display without flickering (step F-450). If the input speed is set for time exposure, the bit information indicating that nothing is displayed with LEDs in the viewfinder is set as the LED flickering BIT (steps F-451 and 452) and the operation is returned. If the input speed is not set for time exposure, the current brightness is set as variable [a] and, if the current brightness is is out of the photometric range of low brightness, that is, it is greater than LV_MAX (minus value) or smaller than EV3, the bit information indicating that nothing is displayed with LEDs in the viewfinder is set as the LED flickering BIT (steps F-453 and 455) and the operation is returned.

When the current brightness is within the photometric range of low brightness, the aperture exposure adjusted value (av_adjust) is obtained from the execution aperture value and set as variable [a], a computed value obtained from computation of input speed (tv) + input aperture value (av) + OFFSET + aperture exposure adjusted vale (av_adjust) is set as tv0 and a computed value obtained from computation of {current brightness (1v) + current sensitivity (sv)} is set as tv1 (step F-456). In this case, the value of [tv0] − [tv1] is the exposure deviation (cv). When tv0 is smaller than tv1 and the computed value of exposure deviation (cv) is a minus value, that is, =2.0 or over, the bits of the LED flickering BIT are processed to flicker the OVER alarm mark "+" (steps F-457 and 458) and the operation is returned.

If the computed value of exposure deviation (cv) is not +2.0 or over, a computed value obtained from computation of [tv0] − [tv1] is set as variable "EXPOSURE DEVIATION" (step F-459). If variable "EXPOSURE DEVIATION" is smaller than OVER_LEVEL (12−1=11) shown in the table, the exposure is excessive and therefore the bits of the LED flickering BIT are processed to flicker the OVER alarm mark "+" (steps F-460 and 461) and the operation is returned. If variable "EXPOSURE DEVIATION" is larger than UNDER LEVEL (12+1=13) shown in the table, the exposure is insufficient and therefore the bits of the LED flickering BIT are processed to flicker the UNDER alarm mark "−" (steps F-462 and 463) and the operation is returned. If variable "EXPOSURE DEVIATION" is larger than OVER LEVEL and smaller than UNDER LEVEL, that is, the exposure deviation (compensated value:cv) is 0.0 or ±1/6, the bits of the LED flickering BIT are processed to simultaneously display "+" and "−" in flickering (step F-464) to indicate appropriate exposure and the operation is returned.

Figure 39A:
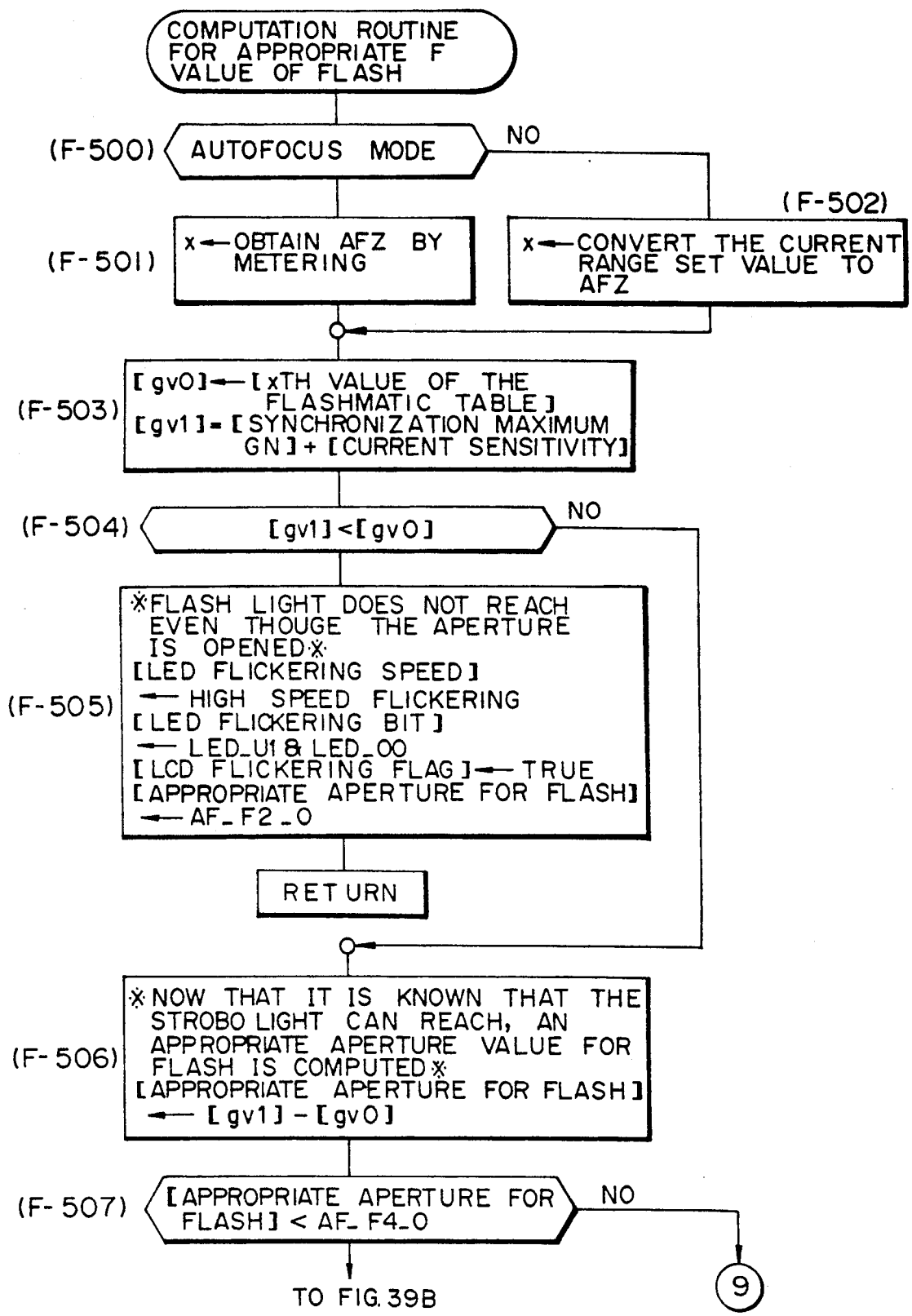

10-3-7 Computation Routine for Appropriate F Value of Flash (FIGS. 39A to 39C)

This routine is for obtaining an appropriate F value (aperture value) from the distance to the subject in the flash mode. The flash mode is set by mounting the flash in the program mode.

In this routine, an appropriate aperture for flash is obtained using the formula given below:

[Formula 3]

*[APPROPRIATE APERTURE FOR FLASH] = [imp_gv (guide No.)] + [CURRENT SENSITIVITY] + [FLASHMATIC TABLE, afz]*

In this routine, a value of AFZ is obtained based on the distance to the subject obtained from metering and set in variable [X] in the auto focus mode and the value of AFZ is obtained based on the distance to the subject which is currently set and set in variable [X] in other modes (steps F-500 ~ 502). the Xth control value of the Flashmatic table is determined as gv0 and a computed value of maximum synchronized GN + current sensitivity is determined as gv1 (step F-503). If gv1 is smaller than gv0, the distance to the subject is as far as the flash light cannot reach even though the aperture is opened. In this case, the UNDER alarm mark [−] is displayed in high speed flickering, the LCD flickering flag is set, the appropriate aperture for flash is set to F 2.0 (steps F-504 and 505) and the operation is returned. If gv1 is larger than gv0, the flash light can cover the distance to the subject and a computed value obtained from computation of [gv1] − [gv0] is set as the appropriate aperture for flash (step F-506). If the computed appropriate aperture for flash is smaller than F 4.0, the distance to the subject is longer than the synchronizable distance. In this case, for the control by opening the aperture, in other words, with the computed appropriate aperture for flash, no alarm marks are displayed, the LCD flickering flag is reset, the computed appropriate aperture for flash is formalized (steps F-507 and 508) and the operation is returned. The appropriate aperture for flash is formalized for the reason described below. The aperture value as the control value is limited to 3's multiple whereas the computed appropriate aperture for flash (control value) may be a value other than 3' multiple and therefore it is rounded off to a 3' multiple. Specifically, this rounding off is carried out through computation of int { ([APPROPRIATE PAERTURE FOR FLASH] +1)/3} ×3. When the computed appropriate aperture for flash is F 4.0 or over, the distance to the subject is shorter than the synchronizable distance and therefore the aperture need be stopped down. In this case, a computed value of minimum synchronizing guide No. + current sensitivity is set in variable [a] (step F-509) and, when this computed value is gv0 or under (step F-510), synchronizing adjustment is possible with the appropriate aperture for synchronizing adjustment and therefore no alarm marks are inhibited to be displayed to ensure the control with the appropriate aperture for synchronizing adjustment, the LCD flickering flag is reset, the appropriate aperture for synchronizing adjustment is set as the appropriate aperture for flash (step F-516) and the operation is returned.

When the computed appropriate aperture for flash is smaller than F 4.0, synchronizing adjustment is impossible with the appropriate aperture for synchronizing adjustment and therefore the appropriate aperture for flash with the minimum guide No. for synchronizing adjustment is computed. In other words, a computed value of variable [a] − gv0 is set as the appropriate aperture for flash (steps F-510 and 511). When the computed appropriate aperture for flash is larger than F 22, an over-flash occurs even with the minimum aperture set by the minimum guide No. for synchronizing adjustment and therefore the OVER alarm mark [+] is displayed in high speed flickering, the LCD flickering flag is set, the appropriate aperture for flash is set to F 22 (steps F-504 and 505).and the operation is returned (steps F-512 and 513). When the computed appropriate aperture for flash is smaller than F 22 and the appropriate aperture for flash is larger than the appropriate aperture for synchronizing adjustment, for the control by stopping down the aperture, in other words, with the computed appropriate aperture for flash, no alarm marks are inhibited to be displayed, the LCD flickering flag is reset, the computed appropriate aperture for flash is formalized (steps F-514 and 515) and the operation is returned.

Figure 40B:
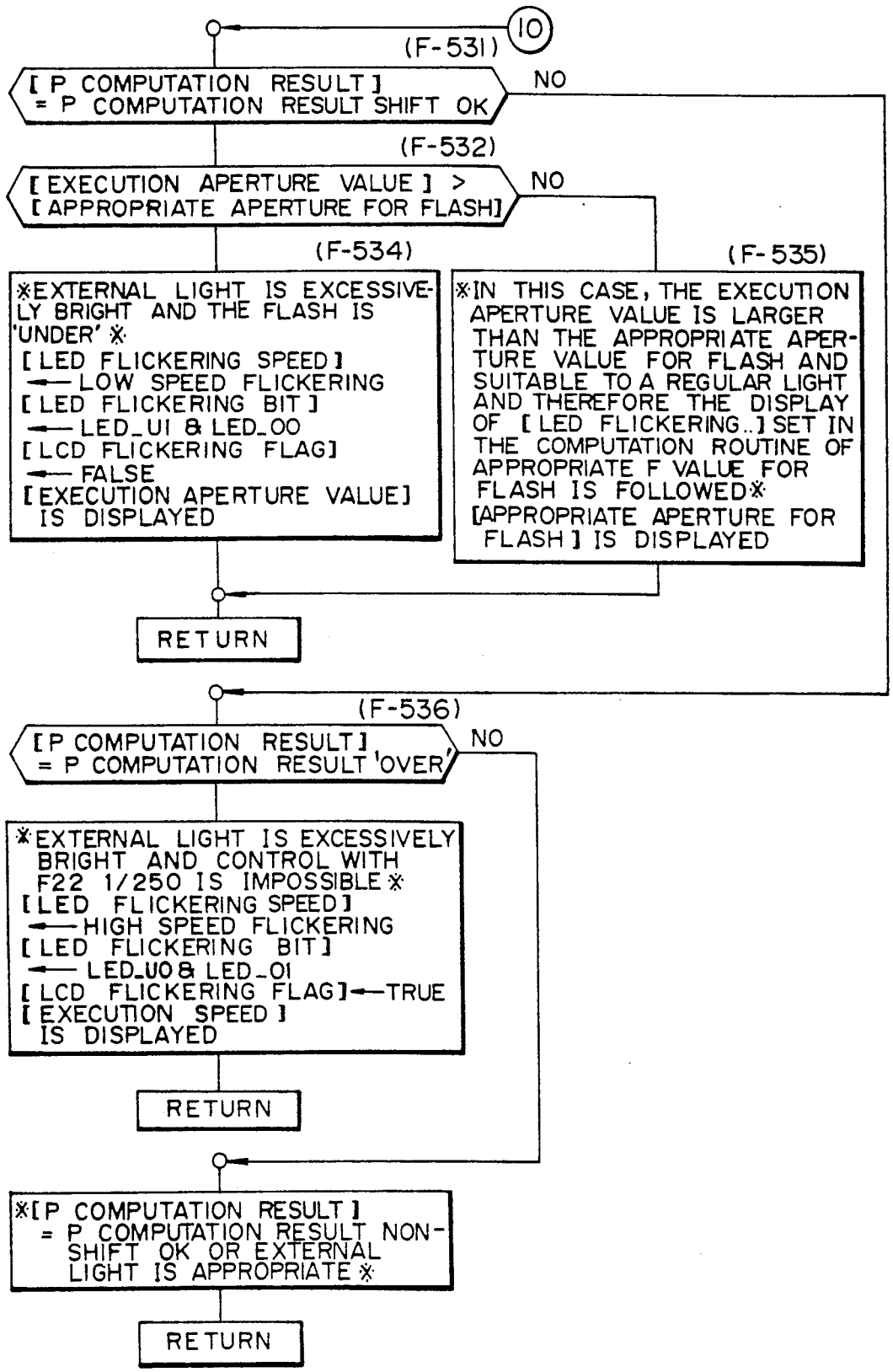

10-3-8 Computation Routine in Flash Mode S1 (FIGS. 40A and 40B)

This routine is executed in the flash mode when the flash unit is mounted on the camera and the switch S1 is set to ON.

In this routine, the computation routine of the appropriate F value for flash is executed and it is determined whether or not the current brightness is larger than LV_MAX or smaller than EV0 (steps F-520 and 521). As a result, if it is smaller than EV0, the current brightness is set to EV0 and the photography is to be done with EV0 or over in the flash mode (step F-522). If the current brightness is EV0 or over, it is determined whether the current brightness is EV16 or over and, if it is EV16 or over, the current brightness is set to EV16 and the photography is to be done with EV 16 or less in the flash mode. If the current brightness is within the range of EV0 ∼ EV16, the current brightness need not be changed.

As a next step, the execution aperture value is set to the input aperture value entered by the dial 11 and it is determined whether or not the execution aperture value (input aperture value) is larger than the appropriate aperture for flash (steps F-525 and 526). As a result, when the input aperture value is larger than the appropriate aperture for flash, it means that the aperture value entered by the user causes the "under" flash and therefore the appropriate aperture for flash is set as the execution aperture value (step F 527). When the input aperture value is less than the appropriate aperture for flash, it means that the aperture value entered by the user does not cause the "under" flash and the execution aperture value is made to remain as the input aperture value with a regard for the user's intention.

Then, the P computation flash mode is set as the P flash computation mode and the P computation routine is executed (step F-528. As a result of execution of the P computation routine, it is determined whether the result of P computation is P computation "under" result (step F-529) and, if it is P computation "under" result, the appropriate aperture for flash is displayed (step F-530) and the operation is returned.

When the result of P computation is "under", it is determined whether or not the result of P computation is P computation result shift OK (step F-531). As a result, when P computation result shift OK is given, it is determined whether the execution aperture value is larger than the appropriate aperture and, if the execution aperture value is larger than the appropriate aperture, it means that the external light is excessively bright and the flash is "under" and therefore the "UNDER" alarm mark is displayed in low speed flickering, the execution speed is displayed (steps F-532 and 533) and the operation is returned. On the contrary, when the execution aperture value is smaller than the appropriate aperture, the aperture with the execution aperture value is more largely opened than in case of the appropriate aperture for flash and suitable for regular light and therefore the LEDs are flickered according to the setting in the computation routine of appropriate F value for flash, the appropriate aperture for flash is displayed (step F-534) and the operation is returned.

When it is determined that the result of P computation is not set as P computation result shift OK in step (F-531), it is determined whether the result of P computation is P computation "over" result (step F-535). As a result, if the result of P computation is "over", it means that the external light is excessively bright and therefore the flash is "over" even with the maximum aperture of F 22 and the highest shutter speed of 1/250 seconds and the control is impossible. In this case, the "OVER" alarm mark is displayed in high speed flickering, the execution speed is displayed in flickering (step F-536) and the operation is returned. If the result of P computation is not "over", it means P computation result non-shift OK, that is, the external light is appropriate and the operation is directly returned.

The shutter speed, first aperture value and second aperture value are determined to obtain an appropriate exposure for variable aperture synchro photography through the above described P computation routine, P-LOOP routine, computation routine of appropriate F value for flash and computation routine in flash mode S1. In this case, the intention of the user is regarded wherever possible while referring to the input aperture value. In the flash photography, the user is allowed to select the critical shutter speed for camera shake. In addition, the user is allowed to obtain the appropriate exposure both in the auto focus mode and the manual focus mode by automatically setting the aperture from the metered or preset distance to the subject and the guide No.entered.

Figure 41A:
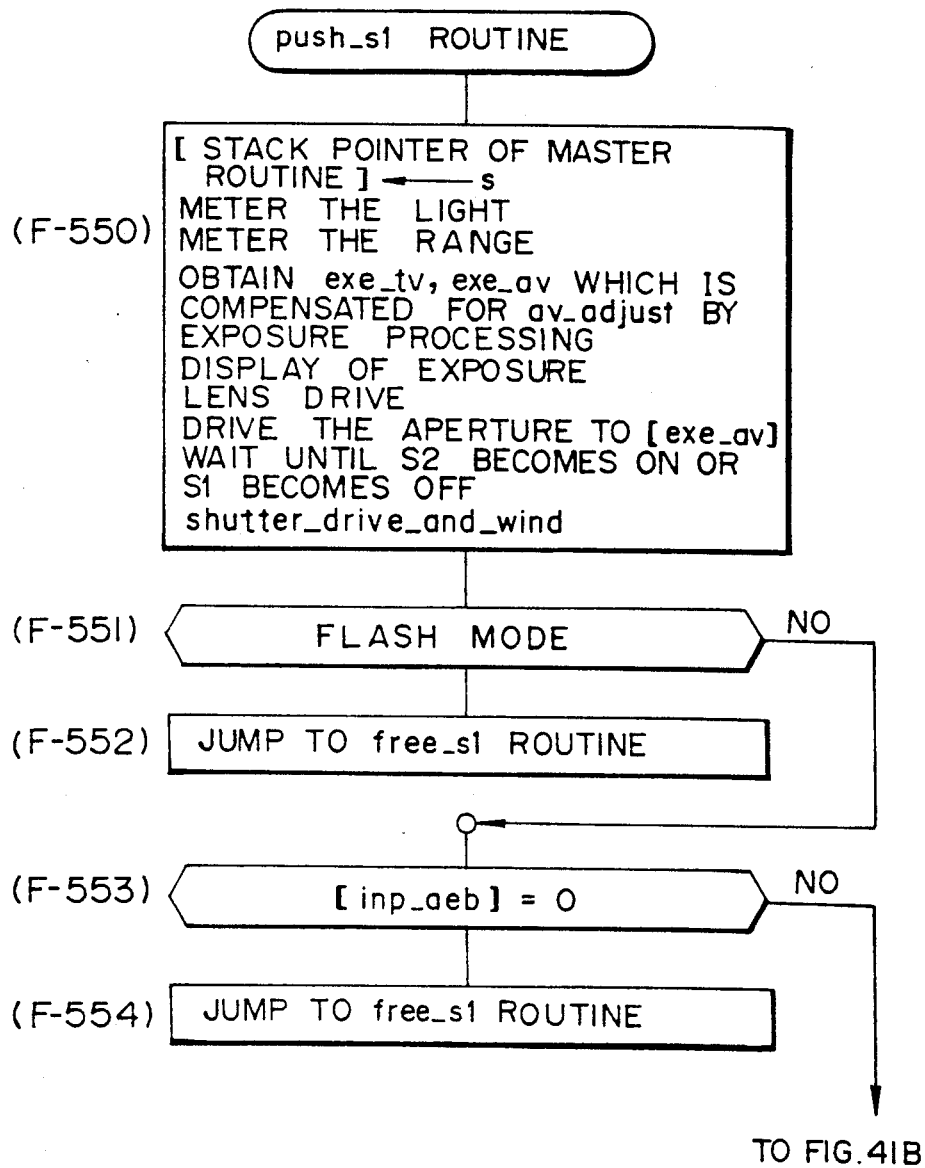
Figure 4I:
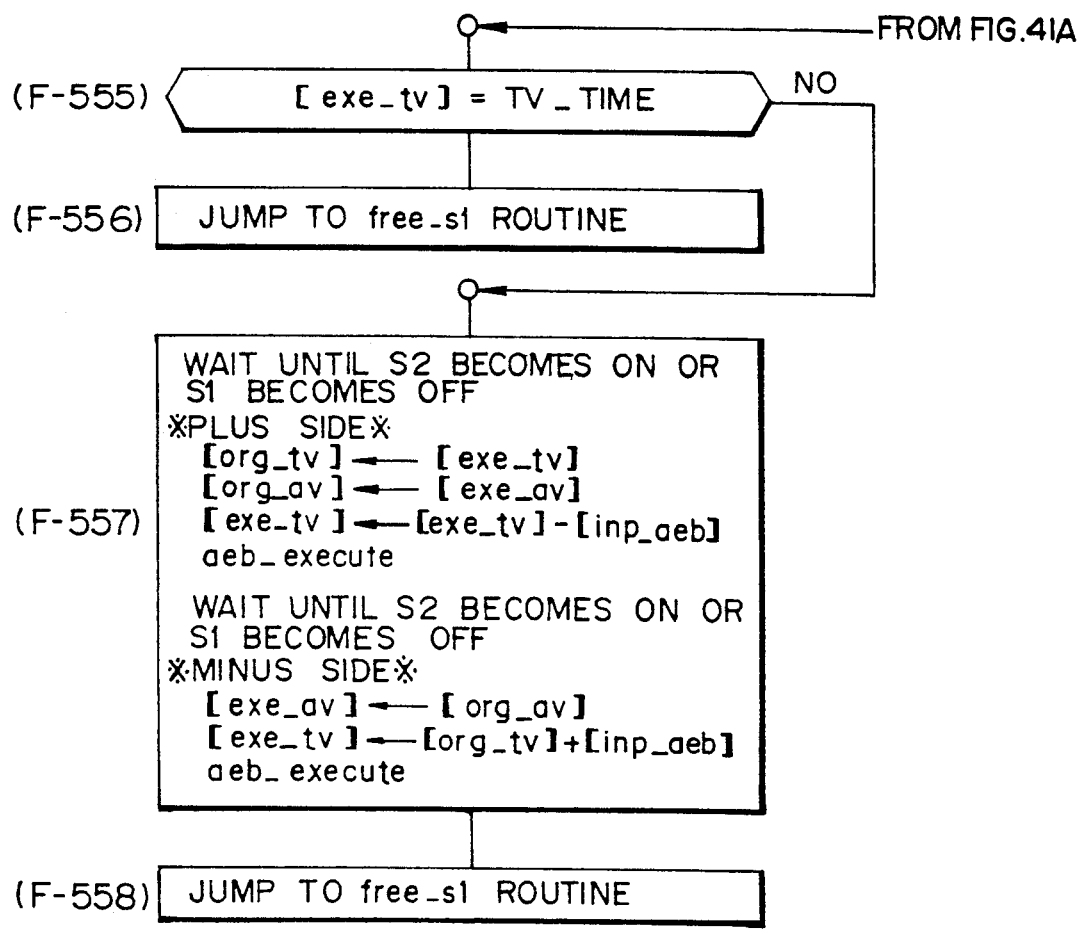

10-3-9 push_s1 Routine (FIGS. 41A and 41B)

This routine is executed when the switch S1 is turned on. In this routine, the contents of the stack pointer of the microcomputer are set in the stack pointer of the master routine, the execution aperture value is obtained by photometry, range metering and exposure computation and set in variables [exe_tv] and [exe_av], the exposure is displayed, the lens is driven, the aperture is driven based on the execution aperture value, and a routine which waits until S2 is set to ON or S1 is set to OFF, that is, the shutter_drive_and_wind routine is executed (step F-550). If the flash mode is selected, the operation jumps to the free_s1 routine (steps F-551 and 552). If the flash mode is not selected, it is determined whether or not the bracket shift value set in variable [np_aeb] is 0 (step F-553). As a result, if the bracket shift value is 0, the operation jumps to the free-s1 routine (step F-554). If the bracket shift value is not 0, it is determined whether the execution speed set in variable

[exe-tv] is TIME (time exposure of 30 seconds or over) (step F-555).

If the execution speed is not TV_TIME, that is, time exposure, the operation proceeds to step (F-557), the routine which waits until S2 is set to ON or S1 is set to OFF is executed, the execution speed in variable [exe_tv] is saved in variable [org_tv], the execution aperture value in variable [exe_tv] is decreased as much as the bracket shift value in variable [inpg_aev] and the aeb execute routine is executed. In this case, the execution speed becomes slower. Then, the routine which waits until S2 becomes ON or S1 becomes OFF is executed, the execution aperture value in variable [exe_av] is saved in variable [org_av], the execution aperture value in variable [exe_tv] is increased as much as the bracket shift value in variable [inpg_aeb] and the aeb_ execute routine is executed. In this case, the execution speed becomes faster. When the processing of step (F-557) is finished, the operation jumps to the free_s1 routine (step F-557).

Figure 42:
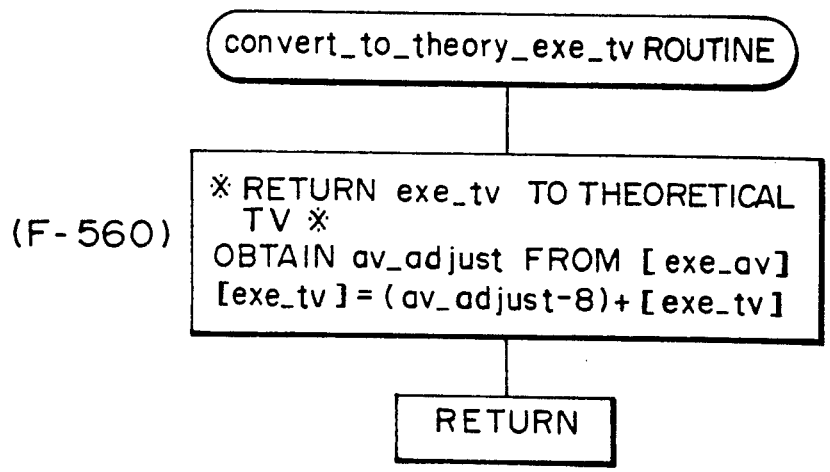
FIG. 42 is a flow chart showing the convert_to_theory exe_tv routine.

10-3-10 convert_to_theory_exe-tv Routine (FIG. 42)

This routine is for returning the execution speed (exe_tv) to a theoretical TV (shutter speed). In this routine, av_adjust (aperture exposure adjust value) is obtained from the execution aperture value in variable [exe_av] and a value obtained by subtracting 8 from the aperture exposure adjust value is added to the current execution aperture value in variable [exe_av] (step F-560).

Figure 43:
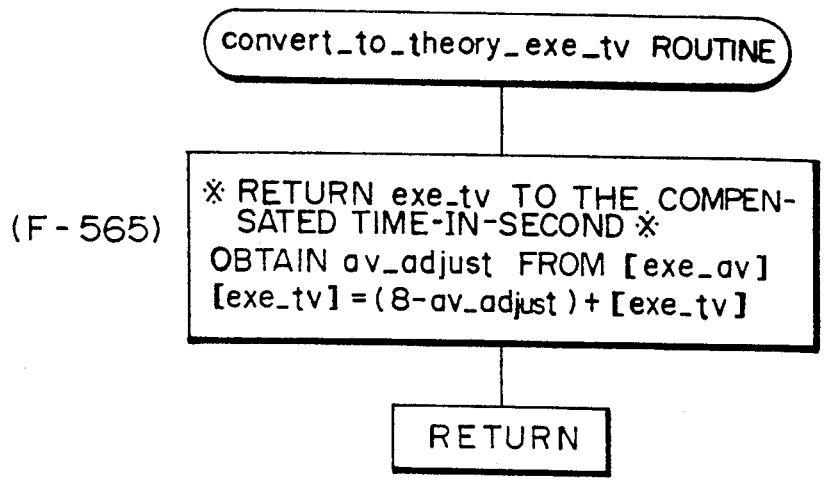
FIG. 43 is a flow chart showing the convert_to_run_exe_tv routine.

10-3-11 convert_to_run_exe_tv Routine (FIG. 43)

This routine is for returning the execution speed (exe_tv) to a compensated time-in-second. In this routine, av_adjust (aperture exposure adjust value) is obtained from the execution aperture value in variable [exe av] and a value obtained by subtracting the aperture exposure adjust value from 8 is added to the current execution aperture value in variable [exe av] (step F-565).

Figure 44A:
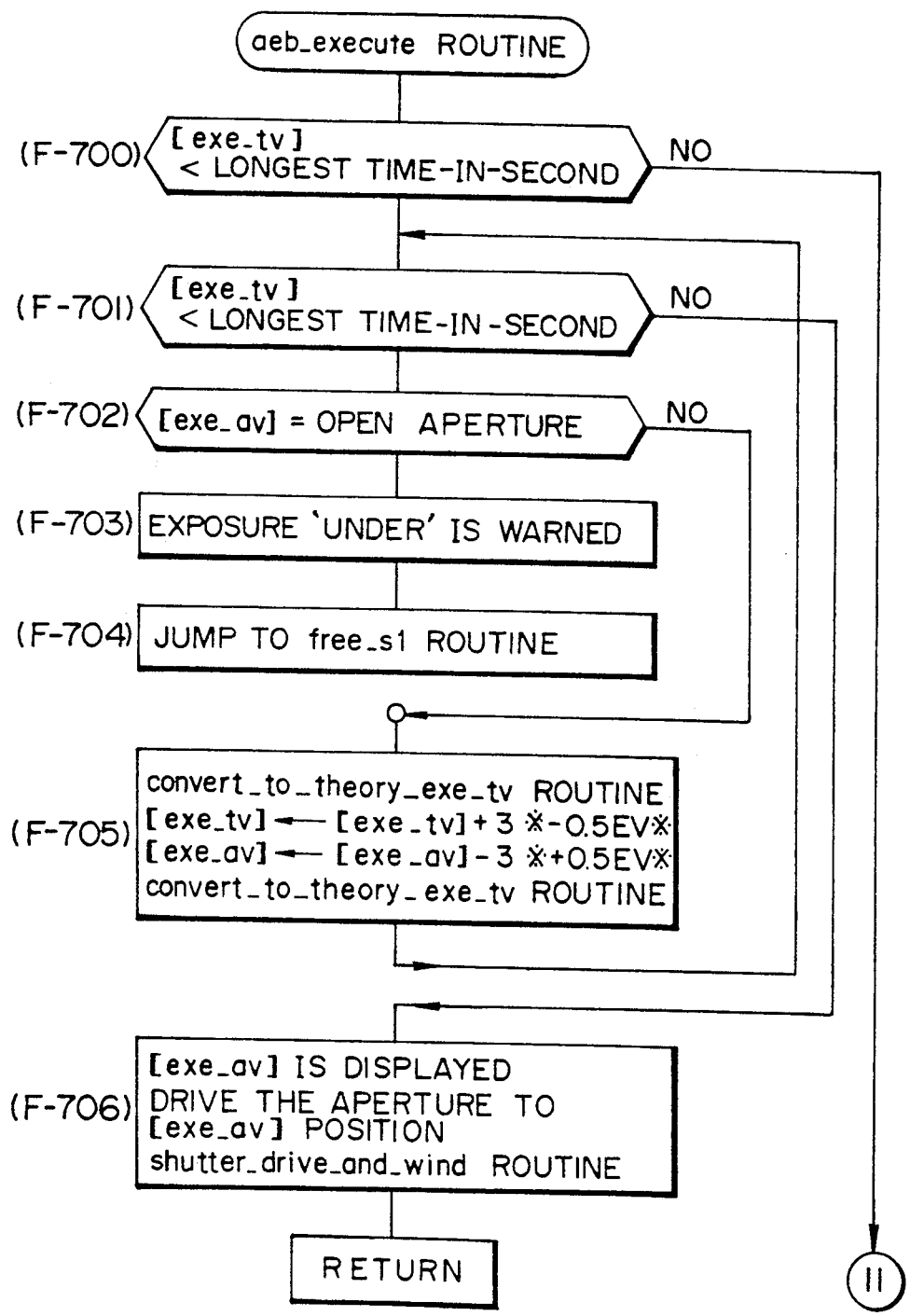
FIGS. 44A to 44B are respectively a flow chart showing the aeb_execute routine.
Figure 44B:
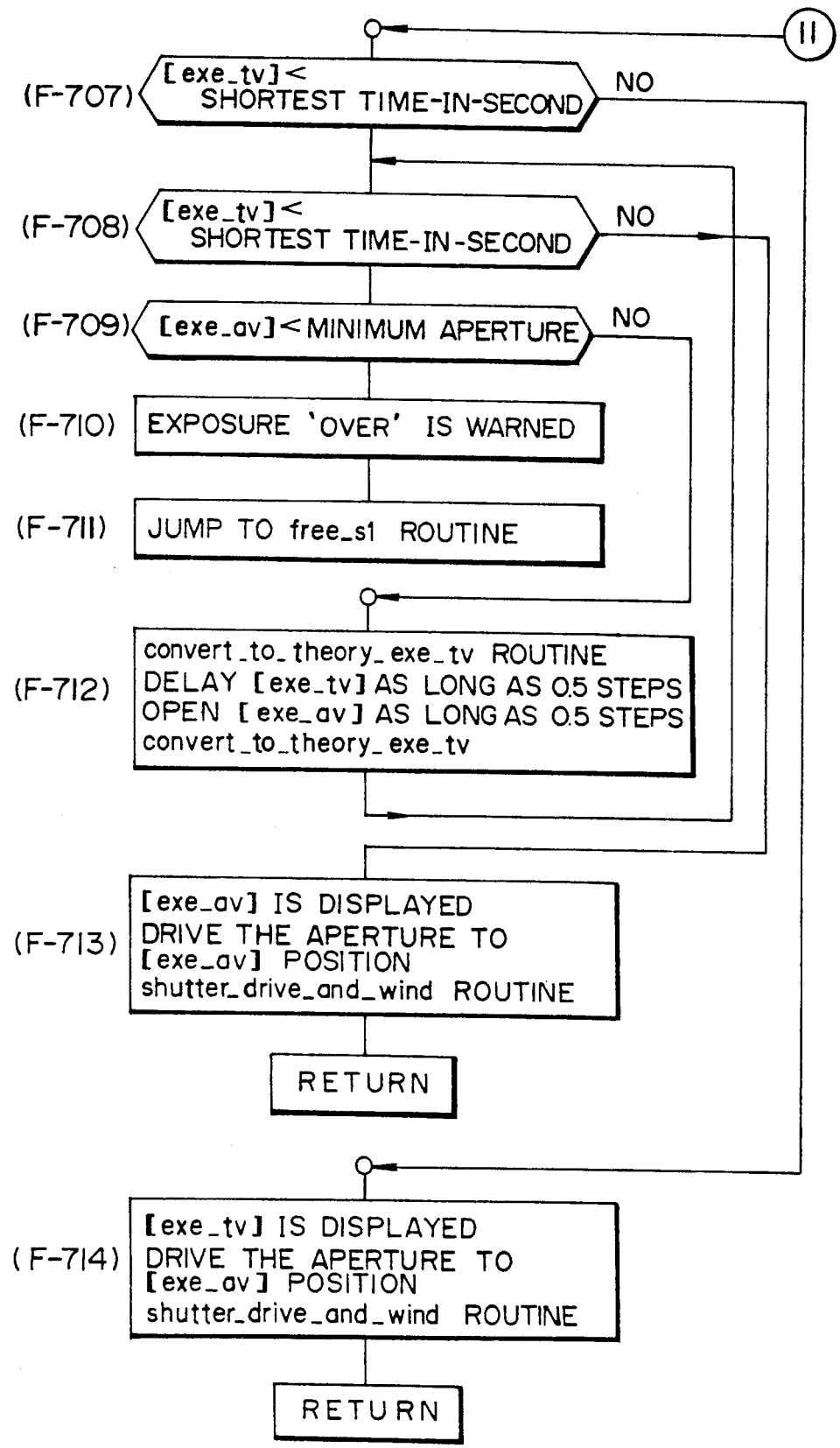

10-3-12 aeb_execute Routine (FIGS. 44A and 44B)

This routine is for executing the auto bracket photography. In this routine, it is determined whether the execution speed is slower than the longest time-in-second (step F-702). As a result, if the execution aperture value is the open aperture value, the 'UNDER' exposure alarm is generated and he operation jumps to the free_s1 routine (steps f-703 and 704). If the execution aperture value is not the open aperture value, the convert_to_theory_exe_tv routine is executed, the execution shutter speed is quickened by a half step, the execution aperture value is opened by a half step, the convert_to_theory_exe_tv routine is executed (step F-705) and the operation is returned to step (F-701). When is is determined that the execution shutter speed is faster than the critical shutter speed for camera shake in step (F-701), it means that the control is enabled and therefore the execution shutter speed is displayed, the aperture is driven to the position of the execution aperture value, the shutter_drive_and_wind routine is executed (step F-706) and the operation is returned.

When the execution shutter speed is determined faster than the critical shutter speed for camera shake in step (F-701), it is determined whether the execution shutter speed is faster than the fastest time-in-second (step F-707). As a result, if the execution shutter speed is faster than the fastest time-in-second, it is determined again whether the execution shutter speed is faster than the fastest time-in-second (step F-708). As a result, if the execution shutter speed is faster than the fastest time-in-second, it is determined that the execution aperture value is the minimum aperture value (F22) (step F-709). As a result, if the execution aperture value is the minimum aperture value (F22), the "OVER" exposure alarm is generated and the operation jumps to the free_s1 routine (steps F-710 and 711). If the execution aperture value is not the minimum aperture value (F22), the convert_to_theory_exe_tv routine is executed to delay the execution shutter speed by a half step and open the execution aperture value by a half step, the convert_to_run_exe_tv routine (step F-712) and the operation is returned to step (F-708). When the execution shutter speed is determined slower than the fastest time-in-second in step (F-708), it means that the control is enabled and therefore the execution speed is displayed, the aperture is driven to the position of execution aperture value, the shutter_drive_and_wind routine is executed (step F-713) and the operation is returned. When the execution shutter speed is determined slower than the fastest time-in-second in step (F-707), it means that an appropriate execution shutter speed has been selected from the beginning and therefore the execution shutter speed is displayed without changing the execution speed and the execution aperture value, the aperture is driven to the position of the execution aperture value, the shutter_drive_and_wind routine is executed (step F-714) and the operation is returned.

Figure 45A:
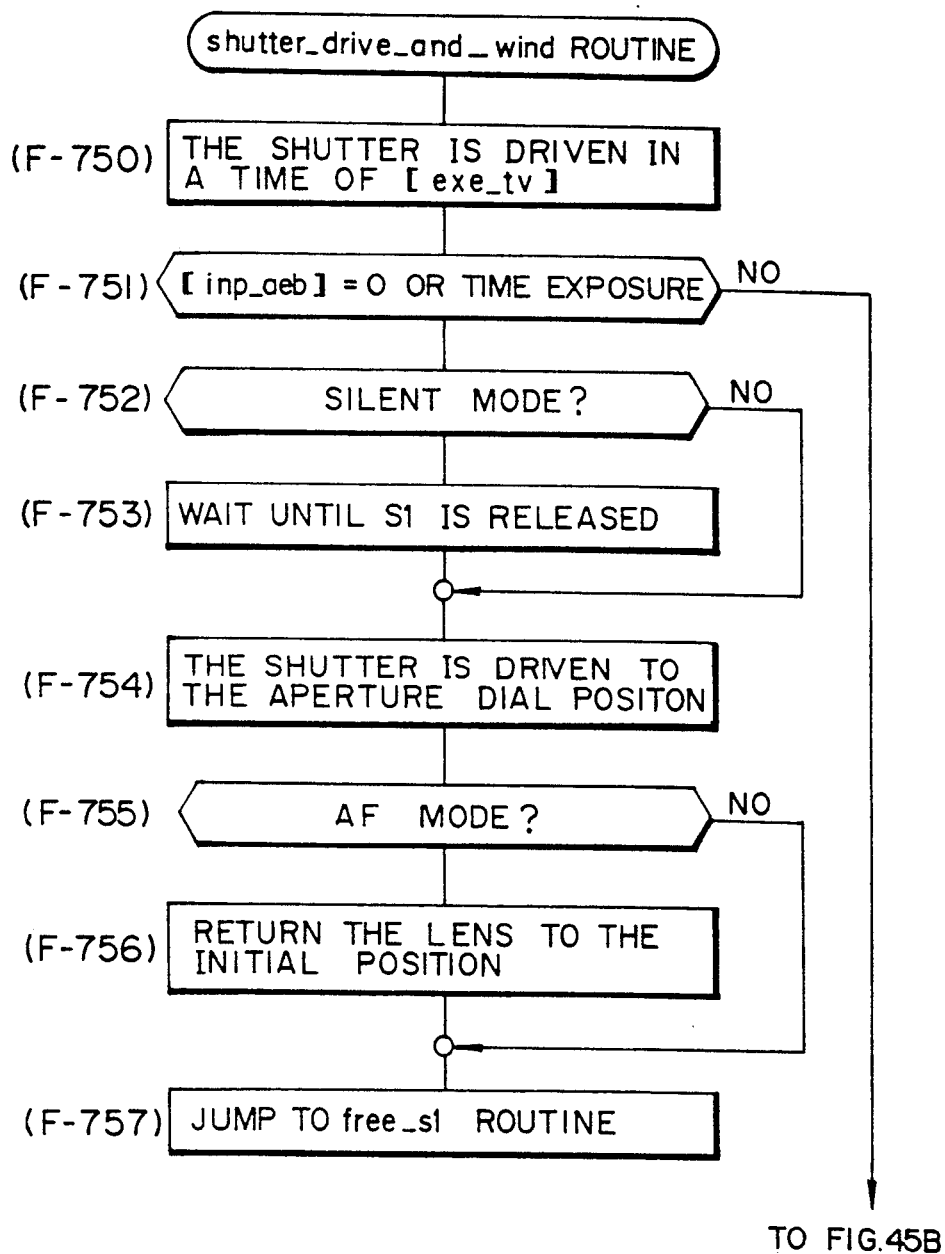
FIGS. 45A to 45B are respectively a flow chart showing the shutter_drive_and_wind routine.
Figure 45B:
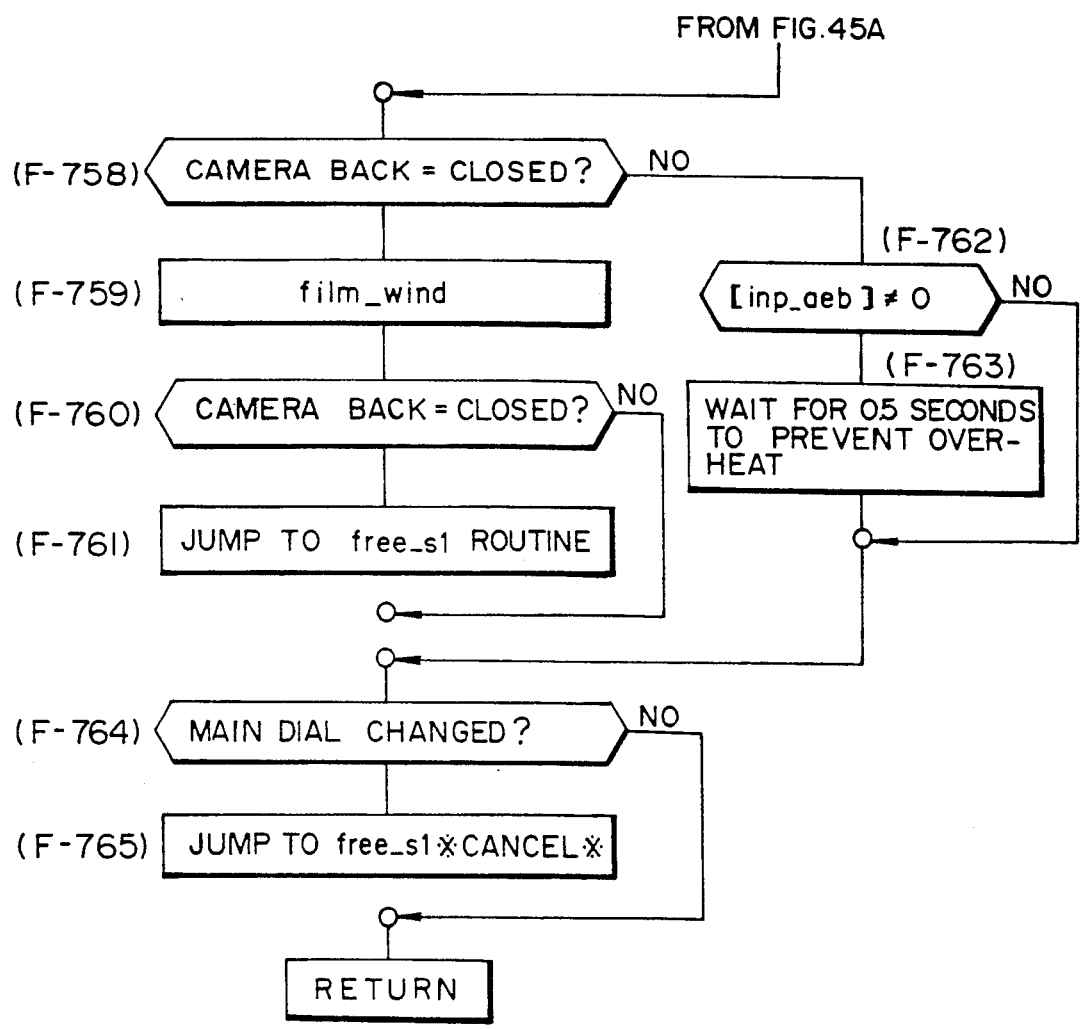

10-3-13 shutter_drive_and_wind Routine (FIGS. 45A and 45B)

This routine relates to driving of the shutter and taking up of the film in auto bracket photography. In this routine, The Shutter Execute routine is called, the shutter is driven in the time-in-second of [exe_tv] and it is determined whether the bracket shift value in variable [inp_aeb] is 0 or the time exposure is set (steps F-750 and 751). As a result, if the bracket shift value is 0 or the time exposure is set, it is further determined whether the silent mode is selected (step F-752). As a result, if the silent mode is selected, the operation waits until the switch S1 is released (step F-753) and, if the silent mode is not selected, the aperture is driven to the position of the aperture dial (step F-754). If the AF mode is selected, the operation jumps to the free_s1 routine after the lens has been returned to the initial position and, if the AF mode is not selected, the lens is not returned to the initial position and the operation jumps to the free_s1 routine (steps F-755~757). When the bracket shift value is not 0 and time exposure is not set, it is determined whether the camera back is closed (step F-758). As a result, if the camera back is closed, it is determined whether the camera back is opened after the film has been taken up (steps F-759 and 760). As a result, if the camera back is opened, the operation jumps to the free_s1 routine (step F-761) and, the camera back is closed, the operation proceeds to step (F-764). When it is determined in step (F-758) that the camera back is opened, it means that subsequent photography is continuously carried out if the bracket shift value is not 0 and therefore the operation waits for 0.5 seconds to prevent overheating of the shutter (steps F-762 and 763) and proceeds to step (F-764). If the bracket shift value is 0, the operation immediately proceeds to step (f-764). In step (F-764), it is determined whether the setting of the main dial is changed. As a result, if the setting is changed, the operation jumps to the free_s1 routine to cancel the auto bracket operation (step F-765) and, if the setting is not changed, the operation is returned.

Figure 46:
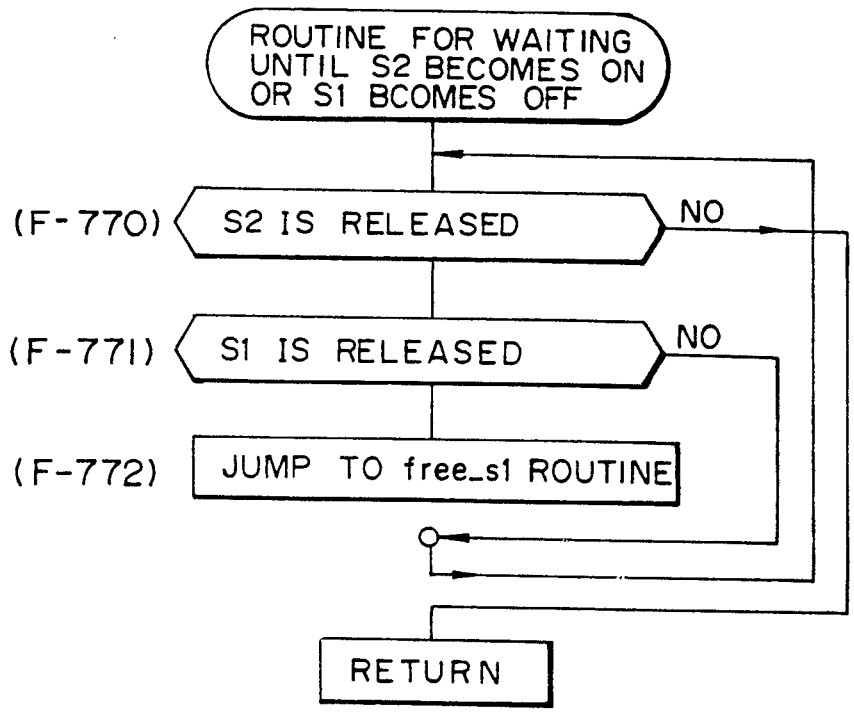
FIG. 46 is a flow chart showing the routine until S2 is ON or S1 is OFF.

10-3-14 Routine Until S2 Is Set to ON or S1 Is Set to OFF (FIG. 46)

This routine is for stopping the photography after exposing one or two frames when the switch S1 is turned off in the auto bracket operation. However, the photography of a frame being exposed is finished and the photography of the following frame is stopped. In this routine, it is determined whether the switch S2 is set to OFF (step F-770). As a result, if the switch S2 is set to OFF, it is determined whether the switch S1 is set to OFF (step F-771). As a result, if the switch S1 is set to OFF, the operation jumps to the free_s1 routine (step F-772). Returning of the operation from this free_s1 routine to the master routine causes photography of the following frame to be stopped and, if the switch S1 is set to ON, the operation is returned to step (F-770). When it is determined that the switch S2 is set to ON in step (F-770), returning of the operation allows photography of the following frame with a changed exposure.

Figure 47:
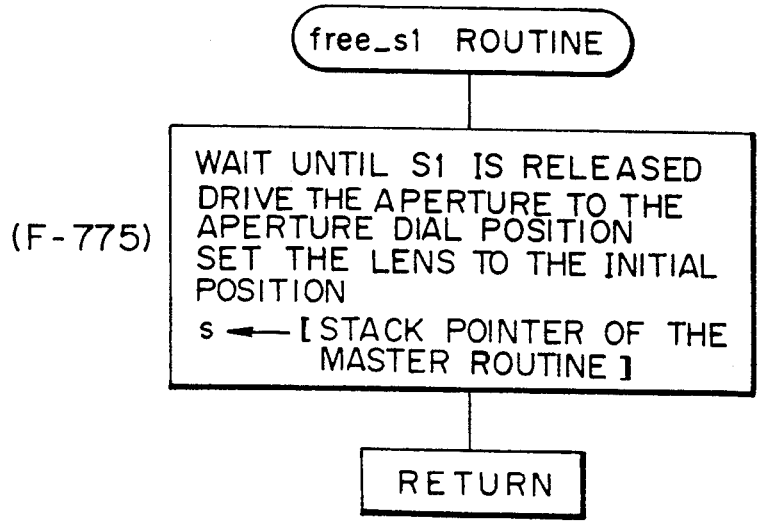
FIG. 47 is a flow chart showing the free_S1 routine.

10-3-15 free_s1 Routine (FIG. 47)

In this routine, the aperture is moved to the preset aperture dial position, the lens is moved to the initial position (only in the AF mode), the contents of [STACK POINTER REGISTER OF MASTER ROUTINE] are set in the stack pointer [s] (F-775) and the operation is returned.

Figure 48:
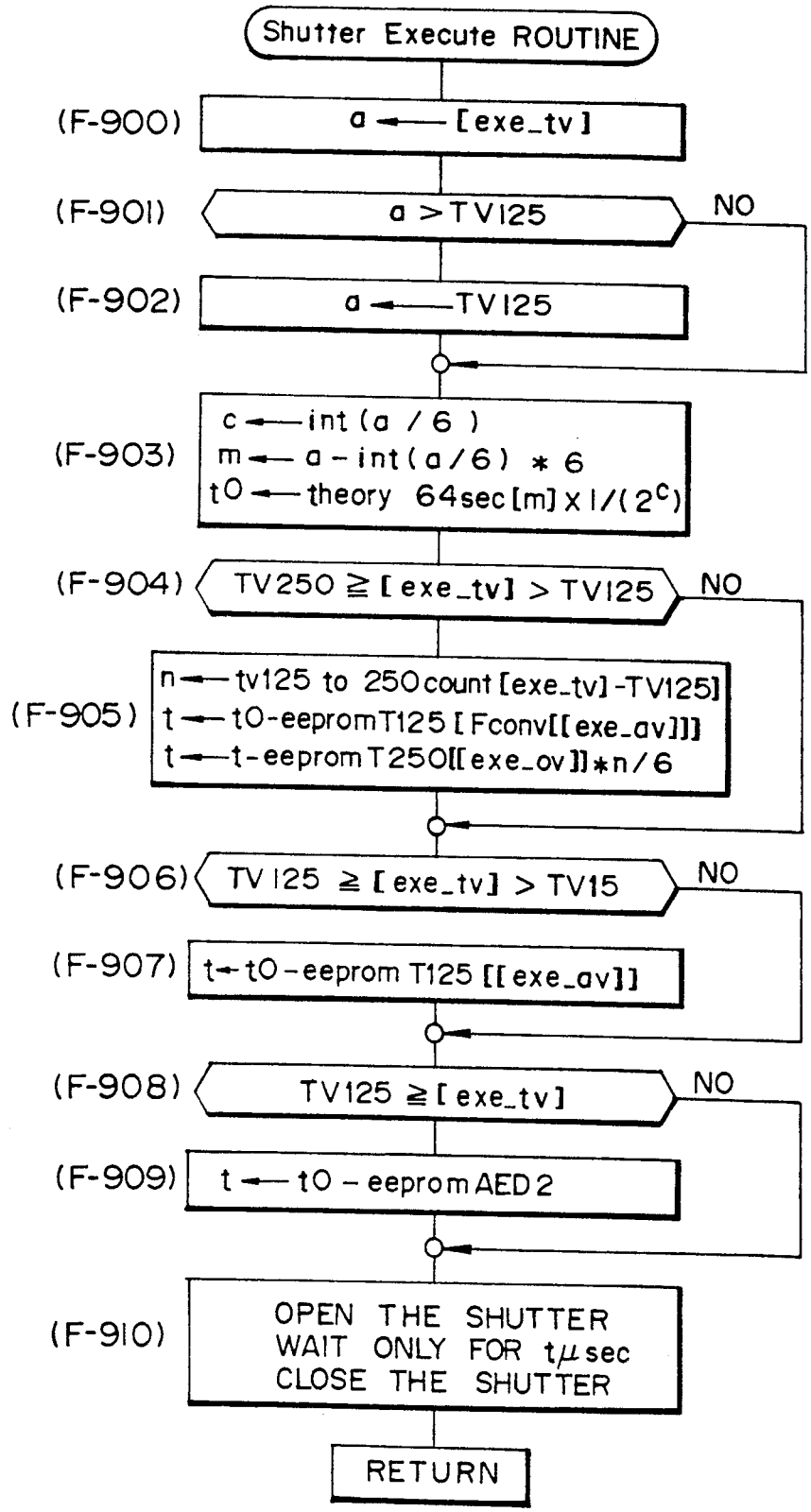
FIG. 48 is a flow chart showing the Shutter Execute routine.
Figure 53A:
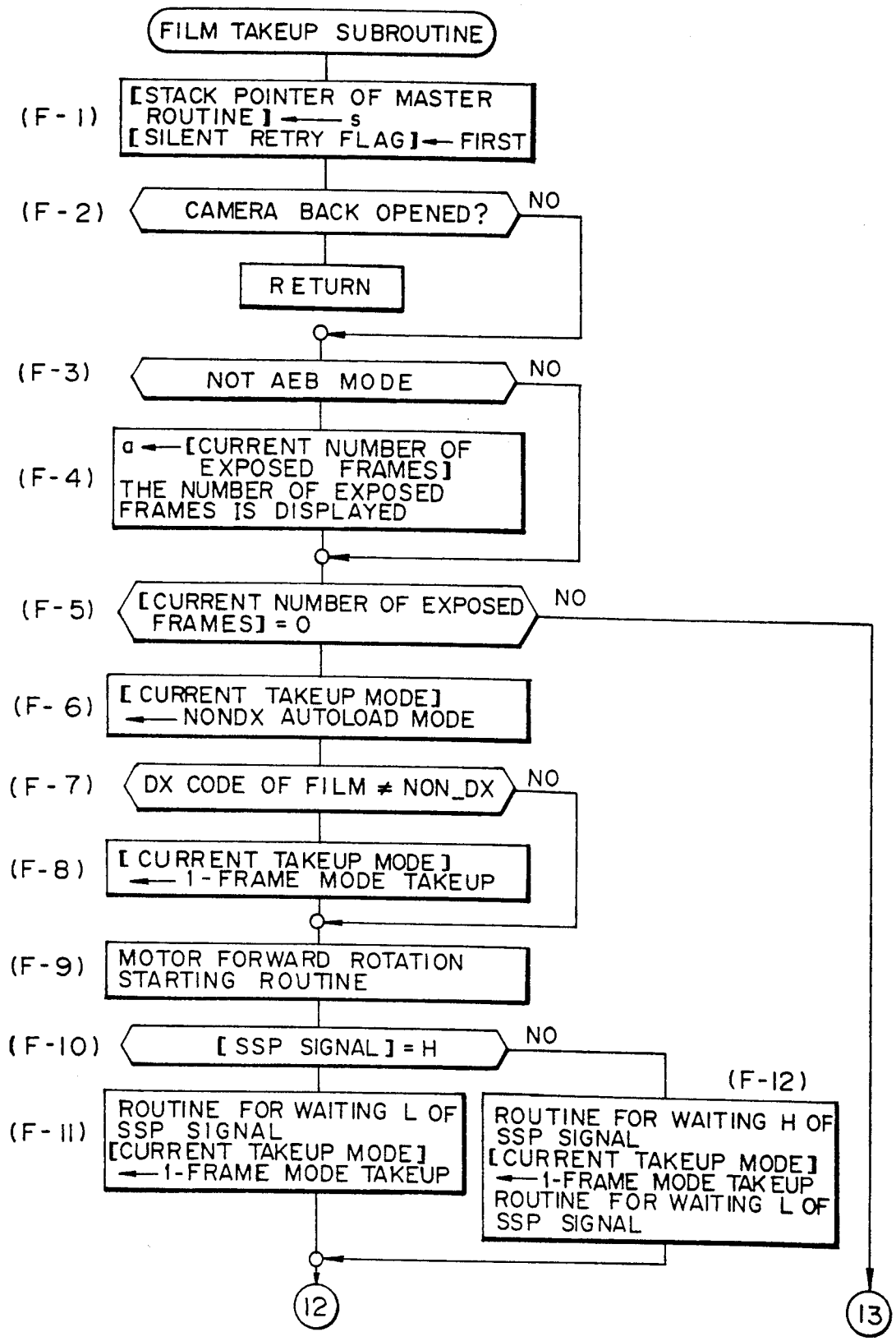
FIGS. 53A to 53E are respectively a flow chart showing the film takeup subroutine.
Figure 53B:
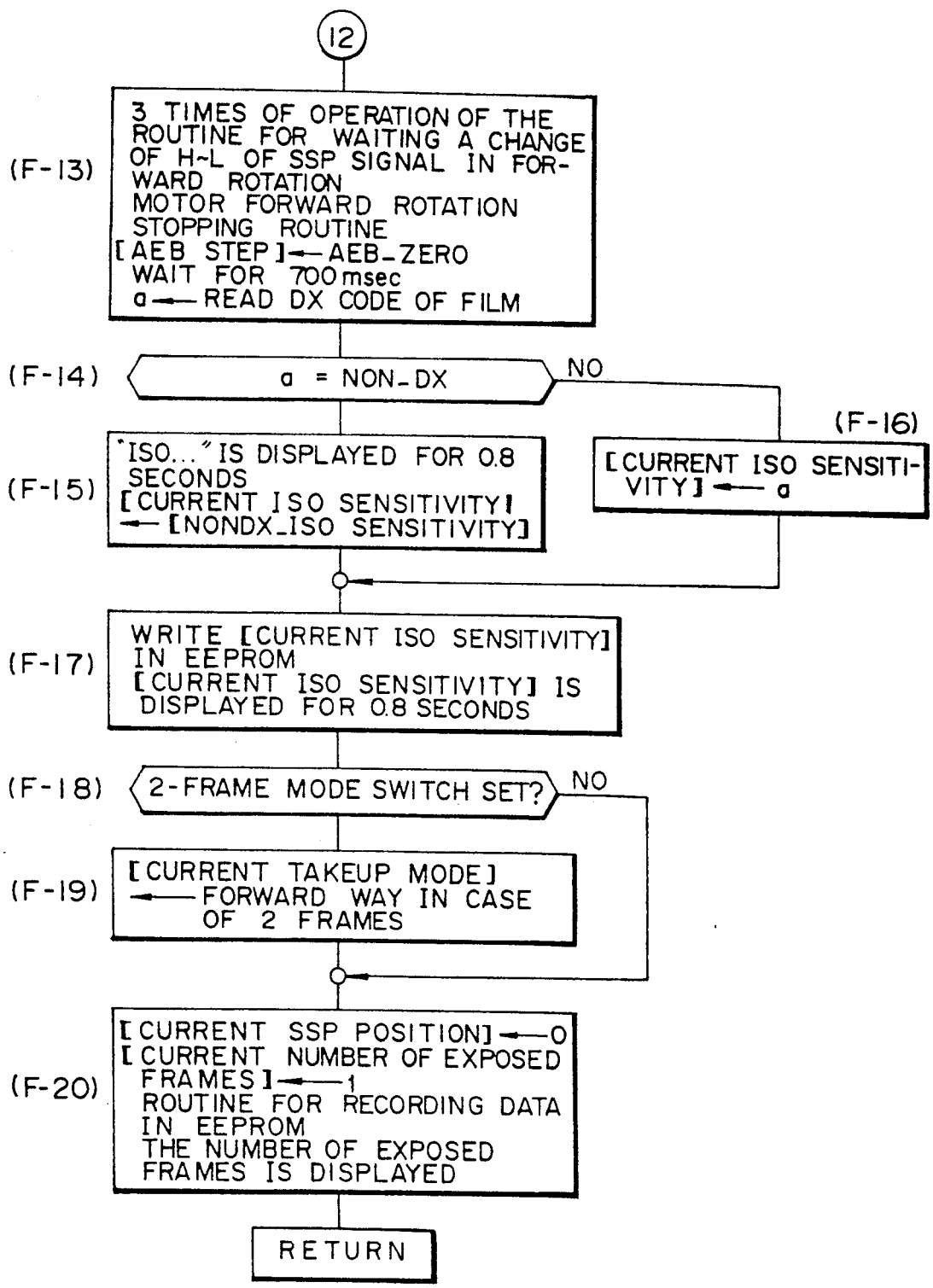
Figure 53C:
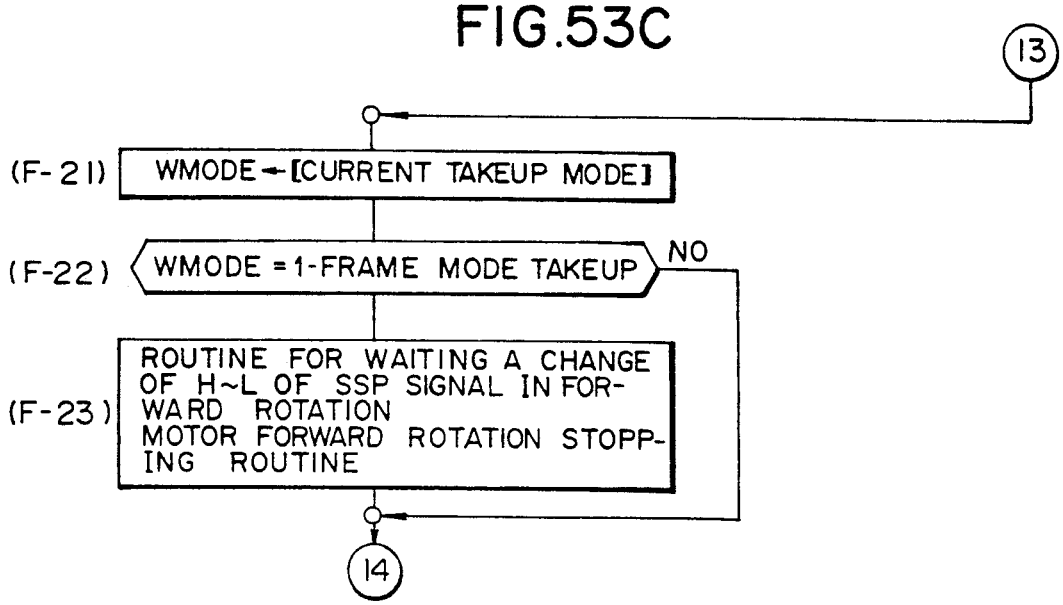
Figure 53D:
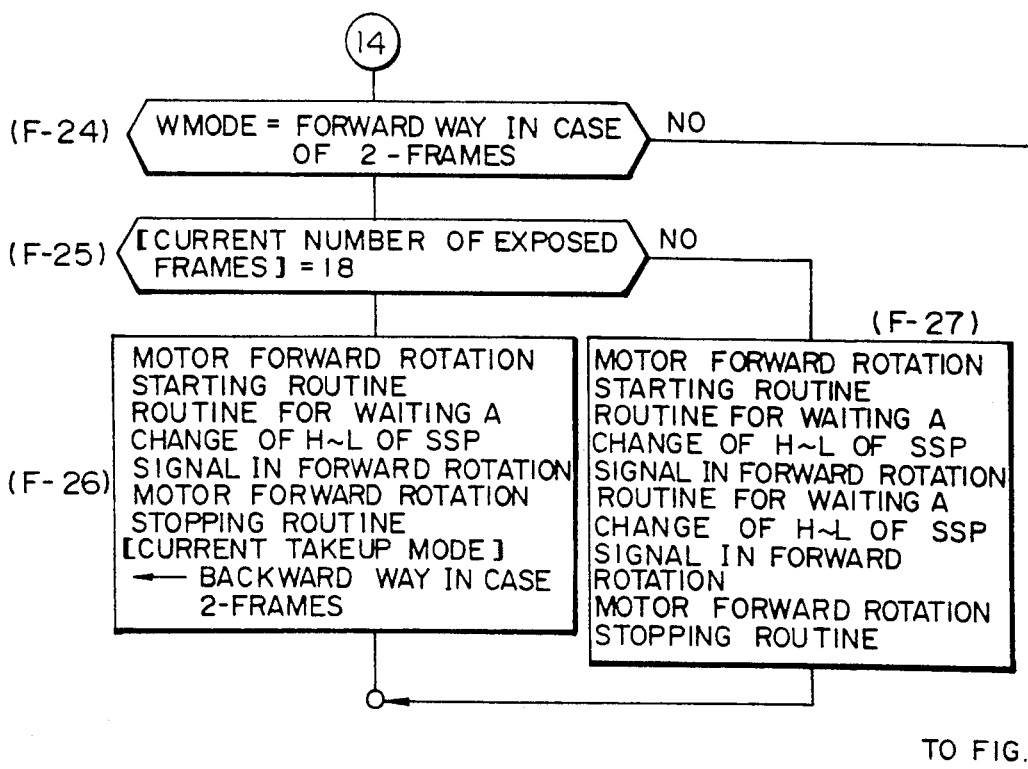
Figure 53E:
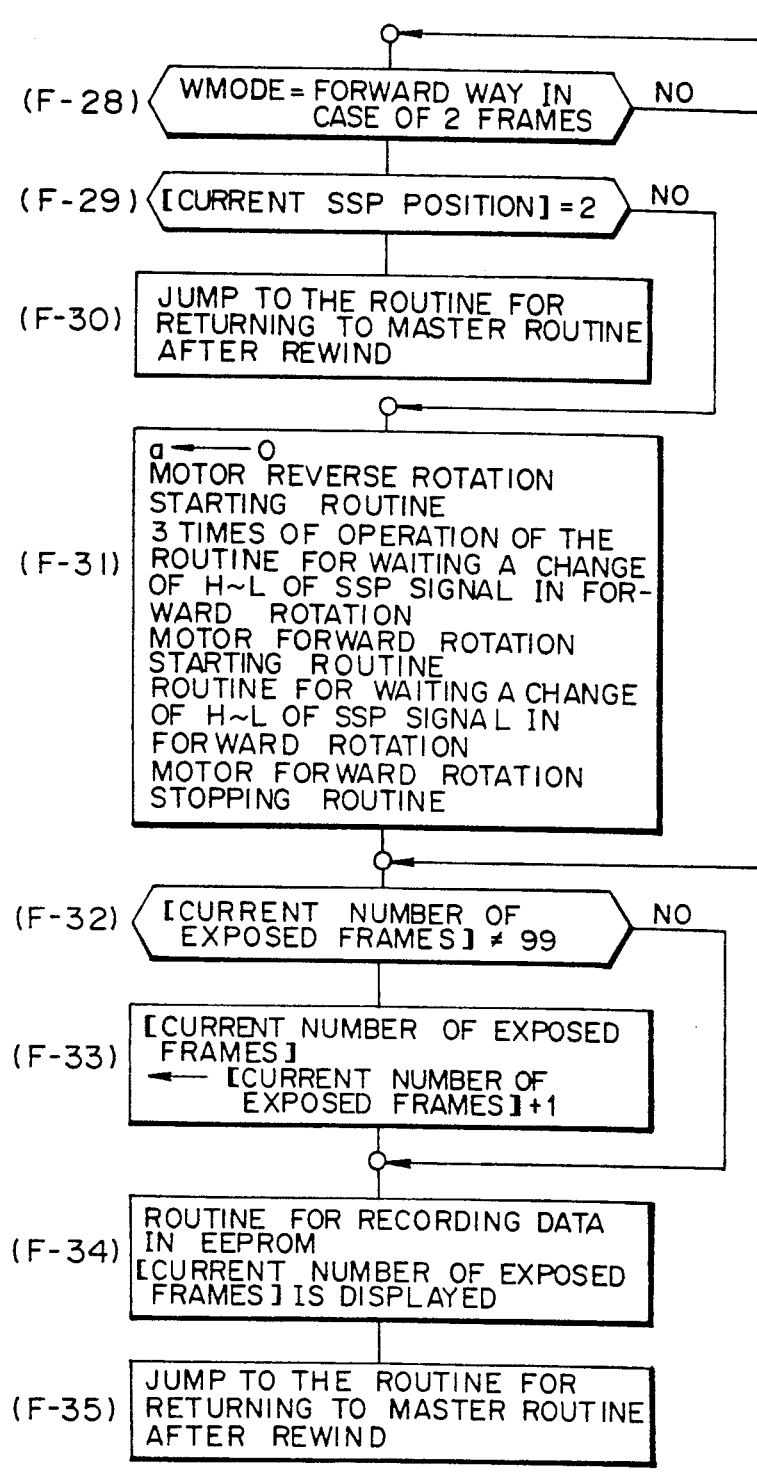

10-3-15-1 Shutter Execute Routine (FIG. 48)

In this routine, the power supplying time for the shutter is determined according to [exe_av] indicating the current aperture value and [exe_tv] indicating the shutter speed to be executed and the shutter is opened and closed. If the shutter opening and closing time tin all combinations of the execution shutter speed [exe_tv] and the set aperture value [exe_av] is stored, the shutter operation can be accurately controlled. However, a huge storage capacity will be required and adjustment will need a lot of time.

Therefore, in this routine, the storage area is saved by using interpolation. In this case, such saving is realized by the following computation.

---

(1) In case the shutter speed is 30 ~ 1/15 seconds:
    t ← Theoretical time-in-second - eepromAED2
(2) In case the shutter speed is 1/18 ~ 1/125 seconds:
    t ← Theoretical time-in-second - eepromT125 [CURRENT APERTURE VALUE]
(3) In case the shutter speed is 1/144 seconds:
    t ← Theoretical time-in-second - eepromT125 [CURRENT APERTURE VALUE]
    - 2 × eepromT250 [CURRENT APERTURE VALUE]
(4) In case the shutter speed is 1/160 seconds:
    t ← Theoretical time-in-second - eepromT125 [CURRENT APERTURE VALUE]
    - 3 × eepromT250 [CURRENT APERTURE VALUE]
(5) In case the shutter speed is 1/180 seconds:
    t ← Theoretical time-in-second - eepromT125 [CURRENT APERTURE VALUE]
    - 4 × eepromT250 [CURRENT APERTURE VALUE]

-continued (6) In case the shutter speed is 1/200 seconds:
    t ← Theoretical time-in-second - eepromT125 [CURRENT APERTURE VALUE]
    - 5 × eepromT250 [CURRENT APERTURE VALUE]
(7) In case the shutter speed is 1/228 seconds:
    t ← Theoretical time-in-second - eepromT125 [CURRENT APERTURE VALUE]
    - 6 × eepromT250 [CURRENT APERTURE VALUE]
(8) In case the shutter speed is 1/250 seconds:
    t ← Theoretical time-in-second - eepromT125 [CURRENT APERTURE VALUE]
    - 6 × eepromT250 [CURRENT APERTURE VALUE]

---

As described above, "t" is computed from the current aperture value set in [exe_av] and the shutter speed set in [exe_tv] and the shutter is opened and closed for this duration of time.

The algorithm to realize this computation is described below, referring to the flow chart shown in FIG. 48.

In this case, the opening and closing time of the shutter is computed using the constants shown in FIGS. 49 and 50. The constants shown in FIG. 50 are stored in the EEPROM 88 and the optimal values are stored in each camera in adjustment of the shutter time-in-second in the assembly process.

In steps (F-900)~(F-902), when he shutter speed of [exe_tv] is faster than 1/125 seconds, TV125 is set in variable [a] and, in other cases, [exe_tv] is set in variable [a].

In step (F-903), a quotient obtained by dividing variable [a] with 6 is set in variable [c] and the remainder is set in variable [m]. Since 1EV of the shutter speed [exe_tv] is indicated in six steps as shown in FIG. 28, the above computation is carried out to obtain the theoretical time-in-seconds of shutter speeds corresponding to these steps. Specifically, in step (F 903), $$t0 \leftarrow theory64sec\ [m] \times 1/(2^c)$$

from the above expression, the theoretical time-in-second of the shutter speed to be currently executed ca be obtained in variable [t0].

If the shutter speed [exe_tv] is faster than 1/125 seconds, the following computation is carried out in step (F-05).

--- n ← tv125to250count[[exe tv] - TV125]
t ← t0 - eepromT125[Fconv[exe av]]
    - eepromT250[[exe av]]*n/6

---

Consequently, the shutter opening and closing time t in reference to the shutter speed to be executed and the current aperture value is obtained.

If the shutter speed is 1/18~1/125 seconds, the following computation is carried out in step (F-907) and the shutter opening and closing time t is obtained.

$$t \leftarrow t0 - eepromT125[[exe\_av]]$$

If the shutter speed is longer than 1/15 seconds, the following computation is carried out as in step (F-909) and the shutter opening and closing time t is obtained.

t ← t0 − eepromAED2

In step (F-910), the shutter is actually opened and closed only for the shutter opening and closing time t thus obtained and the operation is returned.

As described above, in this routine, the shutter opening and closing time is obtained in response to the shutter speed and the preset aperture value and therefore an accurate shutter speed can be realized in combinations of all aperture values and shutter speeds.

The shutter speed to be set in [exe_tv] and currently executed can be entered by the up button 12 and the down button 14 or automatically determined by the microcomputer based on the brightness of the subject measured by the photometric circuit 84, the aperture value set by the aperture setting dial 11, film sensitivity and exposure compensation value.

11. Film Feed Flow

The film takeup subroutine and the film rewind subroutine are described below. In these subroutines, the film feed control is carried out to implement the film end remaining function, film rewind temporary halt function, silent function (reducing a film feeding sound) and 2-frame feed function. FIGS. 51 and 52 show the constants and variables to be used in this routines. For example, the first and second film takeup commands are set in variable [SILENT RETRY FLAG]. When the first command is set, it means that low voltage driving has not been tried to reduce the film feed sound and, when the second command is set, it means that low voltage driving has been tried to reduce the film feed sound. When the film is tensioned and cannot be taken up in low voltage driving, the film is taken up with a regular voltage (including the returning of two frames in feeding). The details of this operation are described referring to the flow chart. In addition to the items shown in the table, the timer overflow flag is used. This timer overflow flag is set in the hardware when the film is tensioned during feeding and the timer overflows.

11-1 Film Takeup Subroutine (FIGS. 53A to 53E)

After an exposure operation has been carried out, the microcomputer 80 controls the film feed motor MF as described below for taking up the film.

To enable to return the operation to the master routine after executing the film takeup subroutine, the contents of the stack pointer of the microcomputer 80 in variable [s] are stored in variable [STACK POINTER OF MASTER ROUTINE] and the first command is set in variable [SILENT RETRY FLAG] to initialize this flag (step F-1). Then it is determined whether the camera back 24 is opened (step F-2) and, if the camera back 24 is opened, the operation is directly returned without nothing to be done. If the camera back 24 is closed, the exposure is automatically changed and it is determined whether the auto bracket mode (AEB) for continuous photography of a plurality of frames is selected (step F-3). As a result, if the auto bracket mode is not selected, the contents of variable [CURRENT NUMBER OF EXPOSED FRAMES] are stored in variable [a] and displayed on the display panel 19 (step F-4) and the operation proceeds to step (F-5). If the auto bracket mode is selected, the shutter speed is displayed on the display panel 19 as described above and therefore the step (F-4) is skipped and the operation proceeds to step (F-5).

In step (F-5), it is determined whether the contents of variable [CURRENT NUMBER OF EXPOSED FRAMES] are [0]. As a result, if the [CURRENT NUMBER OF EXPOSED FRAMES] is [0], it means that a film is not yet automatically loaded and therefore automatic loading is carried out in the routine of steps (f-6) ~ (F-20) and the operation is returned. If the contents of variable [CURRENT NUMBER OF EXPOSED FRAMES] are not [0], it means that the film which has already been automatically loaded is set and the operation proceeds to step (F-21) without auto load.

Auto load is carried out as described below. Variable [CURRENT TAKEUP MODE] is temporarily set as the non-DX auto load mode (which is set with the shortest time of the timer to detect excessive tensioning of the film being fed) (step F-6). Then the following processing is carried out to recognize whether or not the film is loaded. In other words, it is determined whether a code read in the DX code read circuit 83 is the n-n-DX code (step F-7). As a result, if it is the DX code, it means that the DX film is loaded and therefore the one frame takeup is set as variable [CURRENT TAKEUP MODE] (step F-8) and the motor forward rotation start routine is executed (step F-9). When the DX code is not read, it means that the non-DX film is loaded or a film is not loaded and therefore the motor forward rotation start routine of (step F-9) is executed without setting the one frame takeup to determine whether or not. In this case, whether the film is positioned in the exposure frame can be determined from the presence of the SSP signal when the motor forward rotation start routine has been executed In the next step, it is determined whether the SSP signal for which a set of [H] level and [L] level corresponds to one frame is [H] level. As a result, if the SSP signal is [H] level, the one frame takeup is set as variable [CURRENT TAKEUP MODE] after executing the routine for waiting the L level of SSP signal (step F 11). If the SSP signal is [L] level, the one frame takeup is set as variable [CURRENT TAKEUP MODE] after executing the routine for waiting the H level of SSP signal and the SSP signal L waiting routine is executed to keep the pace with step (f-12) (step F-12). Such processing allows to adjust feeding of the film so that the SSP signal has [H] level at the intermediate part of the frame and [L] level at the end of the frame (between two frames) regardless of the relative positions of the film and the sprocket when the film is loaded. This adjustment ensures accurate control of the number of exposed frames of the film.

After the SSP signal H ~ L change waiting routine is executed three times in forward rotation of the motor, auto loading is carried out by executing the motor forward rotation stop routine and taking up three frames, [0] is set in variable [AEB STEP], and the DX code of the film is read after the position of the film is stabilized with lapse of 700 m sec.and set variable [a] (step F-13). Then it is determined whether the contents of variable [a] is "non-DX" (step F-14). As a result, if it is "non-DX", {ISO —] is displayed for 0.8 seconds, the specified non-DXISO sensitivity, for example, ISO100, is set in variable [CURRENT ISO SENSITIVITY] (step F-15), and the operation proceeds to step (F-17). If it is "DX code", the DX code in variable [a] is set invariable [CURRENT ISO SENSITIVITY] (step F-18) and the operation proceeds to step (F-17). In step (F-17), "IR550" of an ordinary film is temporarily set in variable [TYPE OF INFRARED FILM] and the contents of variable [CURRENT ISO SENSITIVITY] are entered into the EEPROM 88 and displayed on the display panel for 0.8 seconds.

Next, it is determined whether the 2-frame mode switch (rewindless switch 98) is set to ON (step F-18) and, if the 2-frame mode switch is turned on, the two frame feed forward way is set in variable [CURRENT TAKEUP MODE] (step F-19) and the operation proceeds to step (F-20). On the contrary, if the 2-frame mode switch is turned off, the two frame feed forward way is not set in variable [CURRENT TAKEUP MODE] and the operation proceeds to step (F-20) In step (F-20), [0] is set in variable [CURRENT SSP POSITION] which is counted in accordance with the drawn-out length of the film, [1] is set in variable [CURRENT NUMBER OF EXPOSED FRAMES], the routine for recording data in the EEPROM 88 is executed and the operation is returned, thus finishing auto loading. Since the state of the 2-frame mode switch is read in auto load and stored in the EEPROM 88 as described above, double exposure, that i, double photography of one frame, in two frame mode (rewindless mode)can be avoided even though the battery is removed during photography or the 2-frame mode switch is disabled.

When it is determined in step (F-5) that the contents of variable [CURRENT NUMBER OF EXPOSED FRAMES] are [0] and the film has already been autoloaded, the contents of variable [CURRENT TAKEUP MODE] are set in variable [WMODE] (step F-21) and it is determined whether the contents of variable [WMODE] is one frame mode takeup (step F-22). As a result, if it is one frame mode takeup, the motor forward rotation start routine, SSP signal H ~ L change waiting routine in forward rotation and the motor forward rotation stop routine are executed in sequence, one frame of the film is take up (step F-23) and the operation proceeds to step (F-24). When not one frame mode takeup, the operation skips step (F-23) is and proceeds to step (F-24). In step (F-24), it is determined whether the contents of variable [WMODE] is the forward way for the two frames feed mode. As a result, if it is the forward way for the two frames feed mode, it is further determined whether the contents of variable [CURRENT NUMBER OF EXPOSED FRAMES] are 18, that is, the turning position (step F-25). This determination assumes the use of a film of 36 frames as the maximum number of frames. Immediately after the 36th frame is exposed, the motor forward rotation start routine, SSP signal H ~ L change waiting routine in forward rotation and motor forward rotation stop routine are executed in sequence to turn back the film after taking up one frame without excessive tensioning of the film, the return way for the two frames feed mode is set in variable [CURRENT TAKEUP MODE] (step F-26) and the operation proceeds to step (F-28). On the contrary, if it is not immediately after the 36th frame has been exposed, the motor forward rotation start routine is executed once, the SSP signal H ~ L change waiting routine in forward rotation is executed twice and the motor forward rotation stop routine is executed once, that is, two fames are taken up and the operation proceeds to step (F-28).

When it is determined in step (F-24) that the contents are not the forward way for the two frames feed mode, the operation skips steps (F-25) ~ (f-27) and immediately proceeds to step (F-28). In step (F-28), it is determined whether the contents of variable [WMODE] are the return way for the two frames feed mode. As a result, if it is not the return way for the two frames feed mode, the operation proceeds to step (F-32). If it is the return way for the two frames feed mode, it is further determined whether the contents of variable [CURRENT SSP POSITION] are [2] or the exposure of the final frame in two-frame photography is finished (step F-29). If the exposure of the final frame in two-frame photography is finished, the operation jumps to the routine for returning to the master routine after rewinding (step F-30).

If the exposure of the final frame in two-frame photography is not finished, variable [a] is set to 0, two frames are rewound by executing in sequence the motor reverse rotation start routine and the SSP signal H ~ L change waiting routine in revers rotation three times, the motor forward rotation start routine, the SSP signal H ~ L change waiting routine in forward rotation and the motor forward rotation stop routine, that is, rewinding three frames and taking up one frame (step F031) and the operation proceeds to step (F-32). Rewinding of three frames and taking up of one frame are intended to ensure fixing of the direction where the overrun takes place and keeping an interval between exposed frames. In step (F-32), it is determined whether the contents of variable [CURRENT NUMBER OF EXPOSED FRAMES] are 99, maximum, which can be displayed on the display panel. As a result, if it is not 99, the contents of variable [CURRENT NUMBER OF EXPOSED FRAMES] is incremented by 1 (step F-33), the routine for recording data in the EEPROM 88 is executed (step F-34) and the operation jumps to the routine for returning to the master routine (step F-35). If the current number of exposed frames is 99, the number of exposed frames is not incremented and the operation proceeds to step (F-34).

Incrementing of the contents of variable [CURRENT NUMBER OF EXPOSED FRAMES] in step (F-33) is executed regardless of the mode selected and therefore the actual number of exposed frames, not the physical position of the frame, is displayed in the two frames feed mode (both ways) for photographing every other frames and the user can easily recognize the remaining number of photographable frames.

Figure 54:
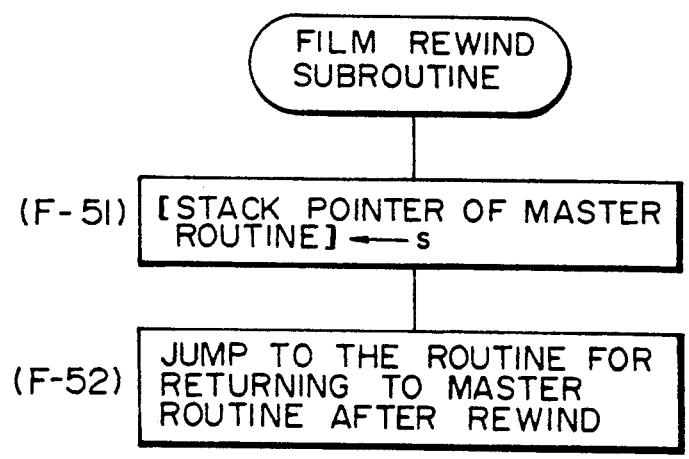
FIG. 54 is a flow chart showing the film rewind subroutine.

11-2 Film Rewind Subroutine (FIG. 54)

In the film rewind subroutine, to enable to return to the master routine after executing this subroutine, the contents of the stack pointer of microcomputer 80 in variable [s] are stored in variable [STACK POINTER OF MASTER ROUTINE] (step F-51). Then the operation jumps to the routine for returning to the master routine (step F-52).

The routines which are called in the film takeup subroutines and the film rewind subroutines are described below.

Figure 55A:
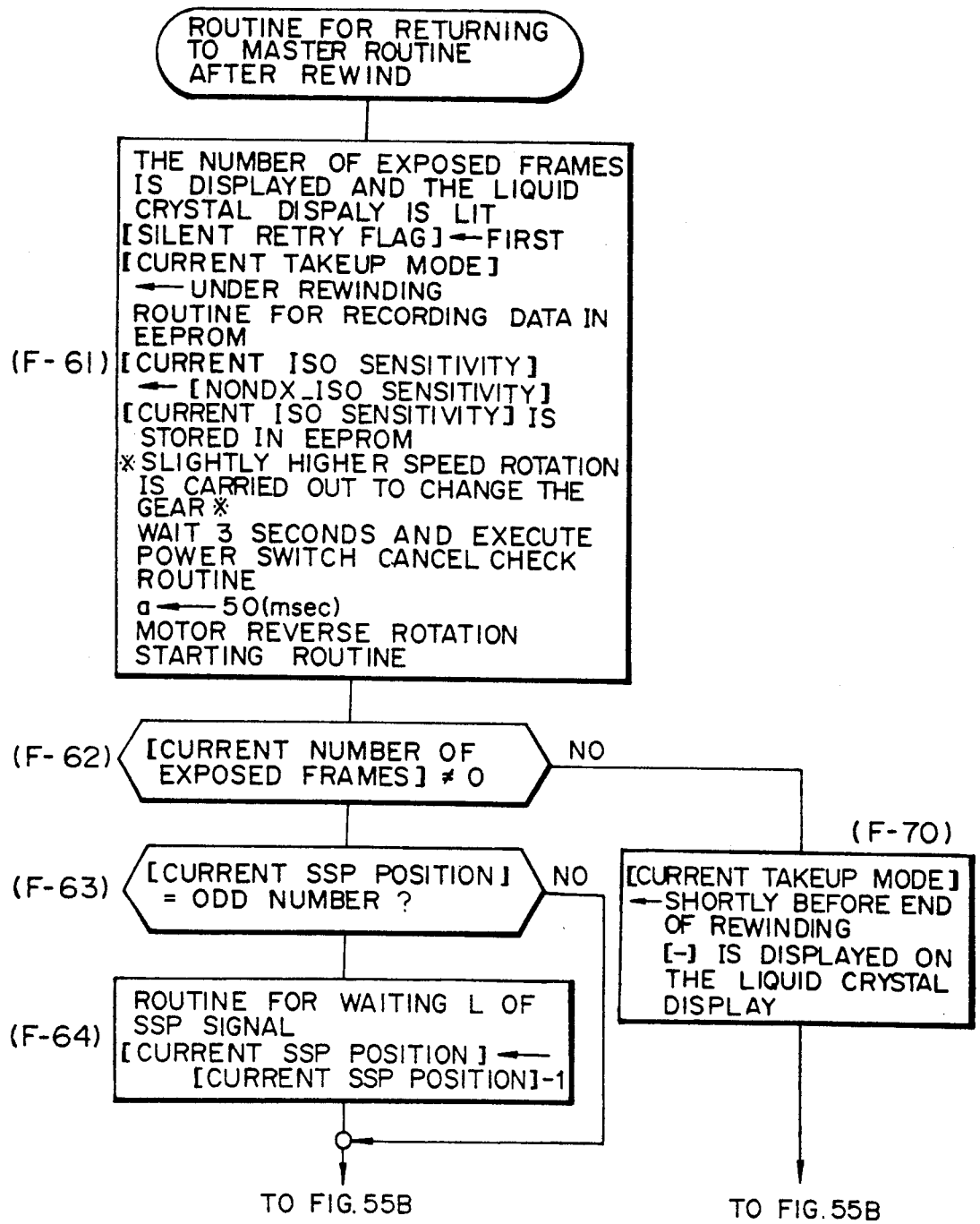
FIGS. 55A to 55B are respectively a flow chart showing the routine for returning to the film rewind subroutine.
Figure 55B:
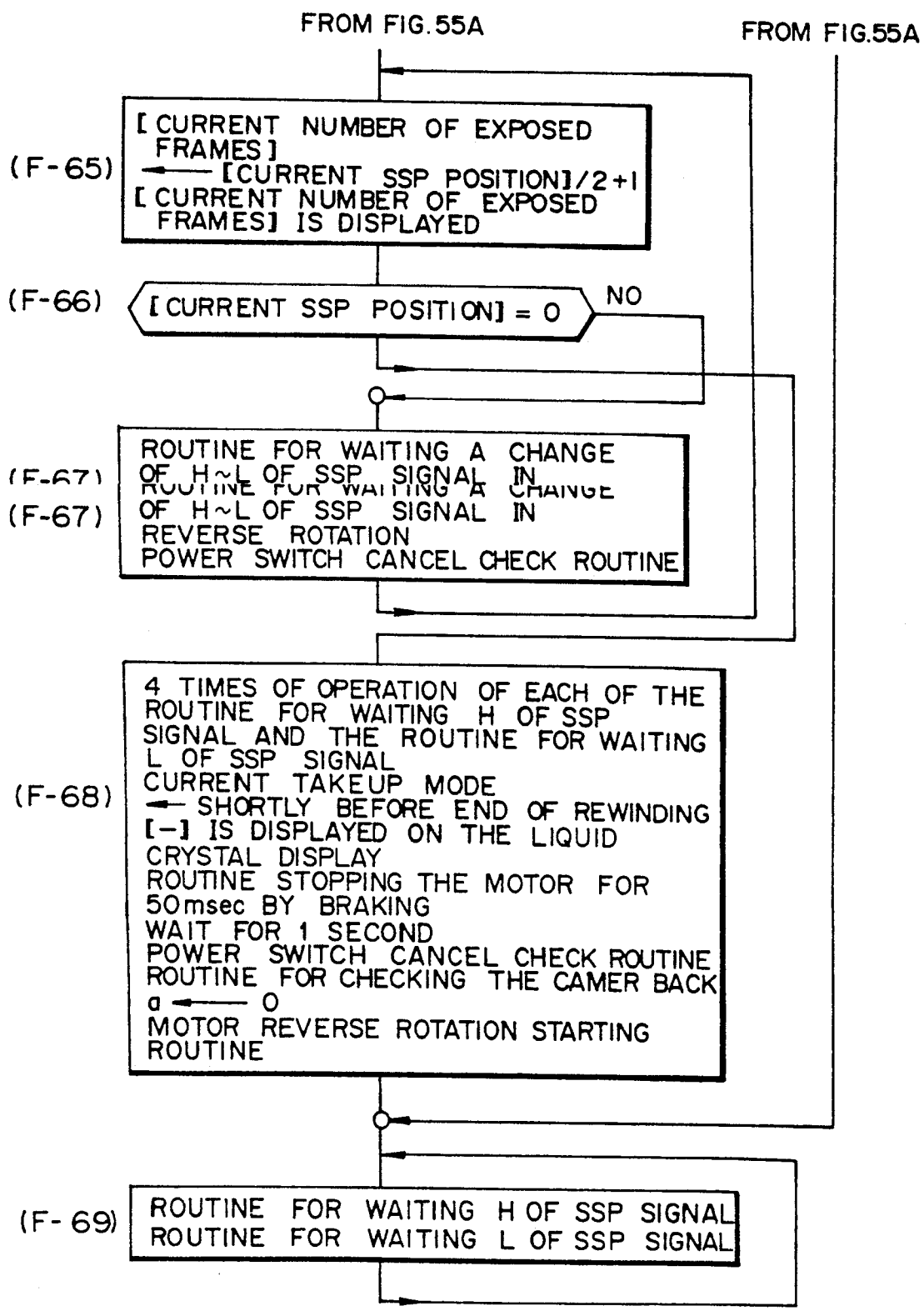

11-2-1 Routine for Returning to Master Routine After Rewinding (FIGS. 55A and 55B)

This routine is executed when the film is excessively tensioned during taking up one frame, photography of the final frame is finished in the two frames takeup mode and the halfway rewind button 18 is operated. In this routine, the number of exposed frames is displayed in flickering, the first command is set in variable [SILENT RETRY FLAG] to initialize this flag, "under rewinding" is set in variable [CURRENT TAKEUP MODE], the routine for recording data in the EE- PROM 88 is executed so that the present condition can be restored even when the battery is removed during rewinding, the non-DX ISO sensitivity is temporarily set in variable [CURRENT ISO SENSITIVITY] for the sake of a film to be next loaded and stored in the EEPROM 88, the power switch cancel check routine is executed three seconds later, 50 msec is set in variable [a] and the motor reverse rotation start routine is executed (step F-61). When 50 msec is set in variable [a], the motor is driven at a high speed to prevent meshing of gears when the film is tensioned. Whether or not the power supply is turned off is checked for three seconds before starting automatic rewinding by executing the power switch cancel check routine three seconds later and, if the power supply is turned off, rewinding is temporarily stopped. Generation of slight sound cannot be avoided even though the film is rewound at a low speed and, in the silent mode, therefore rewinding can be carried out later with lapse of a certain duration of time while informing the user that the photography of all frames is finished by displaying the number of exposed frames in flickering. Whether [CURRENT NUMBER OF EXPOSED FRAMES] is 0 is determined to determine whether this routine is called under the condition that rewinding has been carried out up to the frame position shortly before the end of rewinding (step F-62). If the number of exposed frames is not 0 and the position is not shortly before the end of rewinding, it is further determined whether [CURRENT SSP POSITION] is an odd number (step F-63) and, if it is the odd number, the operation is stopped at the intermediate position of one frame and the number of exposed frames cannot be accurately counted and therefore the SSP signal L level waiting routine is executed to ensure accurate counting of the number of exposed frames and [CURRENT SSP POSITION] is decremented by 1 (step F-64). A value obtained by dividing the decremented [CURRENT SSP POSITION] by 2 and adding 1, that is, the physical position of the frame (number of frames corresponding to the drawn-out length of the film from the film cartridge) is set in variable [CURRENT NUMBER OF EXPOSED FRAMES] and displayed on the display panel 19 (step F-65).

Thus, in rewinding the film, the physical position of the frame is displayed as variable [CURRENT NUMBER OF EXPOSED FRAMES] also in case the halfway rewind button 18 is operated during the forward way for the two frames fed mode.

When it is determined that the current SSP position is not an odd number or is an even number in step (F-63), the operation is stopped between frames and the number of exposed frames can be accurately counted and therefore the operation is proceeded to step (F-65) without decrementing the number of exposed frames as described above and the number of exposed frames is computed and displayed.

After displaying the current number of exposed frames, whether [CURRENT SSP POSITION] is "0" is determined (step F-66) and, if it is not "0", the SSP signal H ~ L change waiting routine in reverse rotation is executed, the power switch cancel=1 check routine is executed (step F-67), the operation is returned to step (F-68) and thus the rewinding operation is continued until [CURRENT SSP POSITION] becomes "0". On the contrary, if it is "0", the operation proceeds to step (F-68), the SSP signal H waiting routine and the SSP signal L waiting routine are alternately executed four times to rewind as many frames as off-loaded three frames plus one additional frame, the position of frame shortly before the end of rewinding is set in variable [CURRENT TAKEUP MODE], the current number of exposed frames is set to "0" and "—" is displayed on the display panel, the routine in which the operation is stopped for 50 m sec by braking the motor is executed and the operation waits for one second. In other words, the operation waits for one second with the end of film remained. Then the power switch cancel routine check routine is executed, the routine for checking the opening of the camera back, "0" is set in variable [a] and the motor reverse rotation start routine is executed.

The film cartridge with the end flap kept drawn out can be taken out from the camera by opening the camera back 24 while the operation waits for one second with the leader end of the film remained out of the cartridge as described above. When the rewinding sound is noisy, rewinding operation can be stopped by executing the power switch cancel check routine to turn off the power supply during rewinding.

Rewinding is resumed by repetitively executing the SSP signal H waiting routine and the [SSP SIGNAL] L waiting routine (step F-69). When it is determined that the current number of exposed frames is 0, the position of the frame shortly before the end of rewinding is set in variable [CURRENT TAKEUP MODE], [—] is displayed on the display panel 19 (step F-70), the operation proceeds to step (F-69) and the SSP signal H waiting routine and the SSP SIGNAL L waiting routine are repetitively executed. Accordingly, the film cartridge into which the leader end of the film is rewound can be taken out of the camera unless the camera back is opened during waiting for one second.

Figure 56:
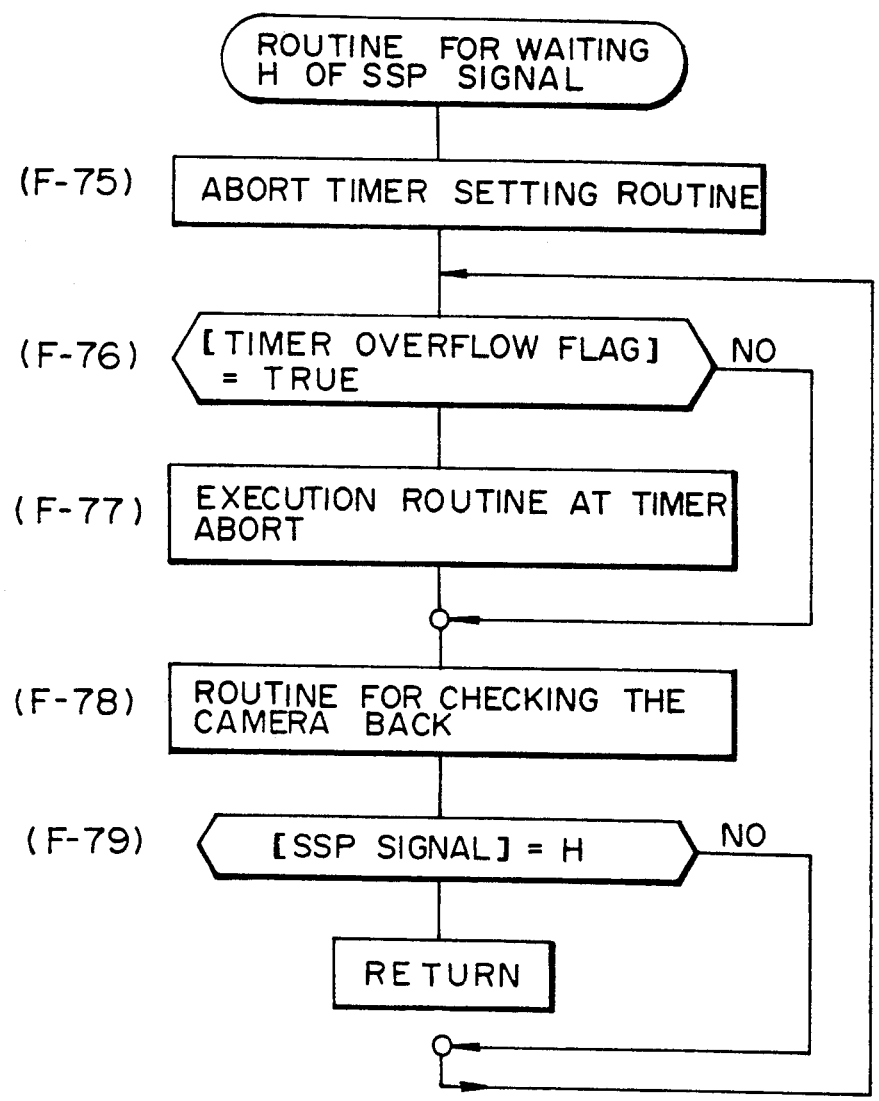
FIG. 56 is a flow chart showing the routine for waiting H of SSP signal.

11-3 SSP Signal H Waiting Routine (FIG. 56)

In this routine, the abort timer set routine is executed (step F-75) to set the abort time (time for waiting the output of the SSP signal: When the SSP signal is not outputted in this time, [TIMER OVERFLOW FLAG] is set and the film is regarded as tensioned) in accordance with the contents of the current takeup mode and the whether or not the silent mode is set and it is determined whether [TIMER OVERFLOW FLAG] is set and also the film is tensioned (step F-76). As a result, when [TIMER OVERFLOW FLAG] is set or the film is tensioned, the timer abort execution routine is executed to carry out the film feed control in accordance with the contents of the current takeup mode and whether or not the silent mode is set (step F-77) and the routine for checking opening of the camera back (step F-78). When [TIMER OVERFLOW FLAG] is reset and the film is not tensioned, the routine for checking opening of the camera back is immediately executed. Next, it is determined whether [SSP SIGNAL] is of the H level (step F-79) and, if [SSP SIGNAL] is of the H level, the operation is returned. If [SSP SIGNAL] is of the L level, the operation is returned to step (F-76) and the same processing is repeated until [SSP SIGNAL] has the H level.

Figure 57:
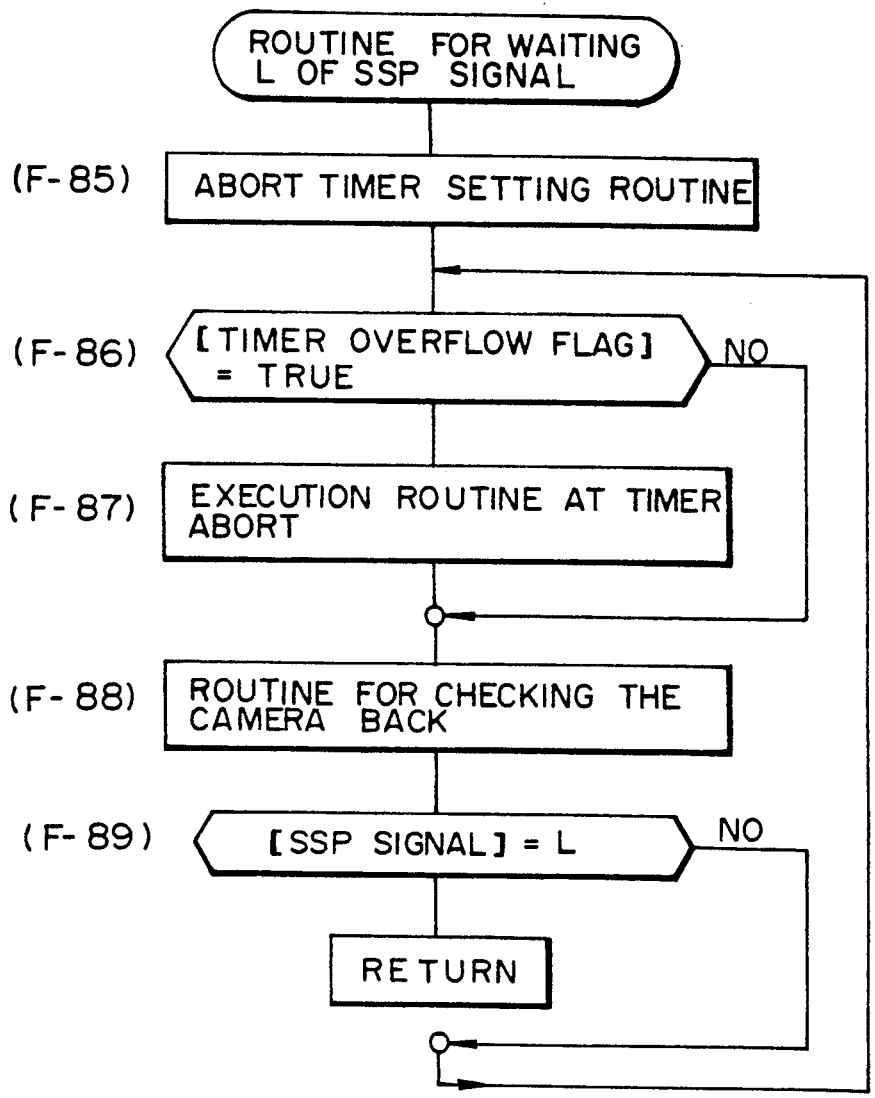
FIG. 57 is a flow chart showing the routine for waiting L of SSP signal.

11-4 SSP Signal L Waiting Routine (FIG. 57)

The substantially same processing as in the aforesaid SSP signal H waiting routine is conducted in this routine. That is, the abort time set routine is executed (step F-85), thereby determining whether or not [TIMER OVERFLOW FLAG] is set, in other words, whether or not the film is tensioned (step F-86). As the result of this processing, when [TIMER OVERFLOW FLAG]

is set and also the film is tensioned, the timer abort execution routine is executed (step F-87) and, at the same time, the routine for checking opening of the camera back is also executed (step F-88). On the other hand, when [TIMER OVERFLOW FLAG] is reset and the film is not tensioned, the camera back open checking routine is immediately executed. Subsequently, it is determined whether [SSP SIGNAL] is of L level (step F-89) and, if [SSP SIGNAL] is of L level, the operation is returned. Whilst, if [SSP SIGNAL] is of H level, the operation is returned to step(F-86) and the same processing is repeated until [SSP SIGNAL] has the L level.

Figure 58:
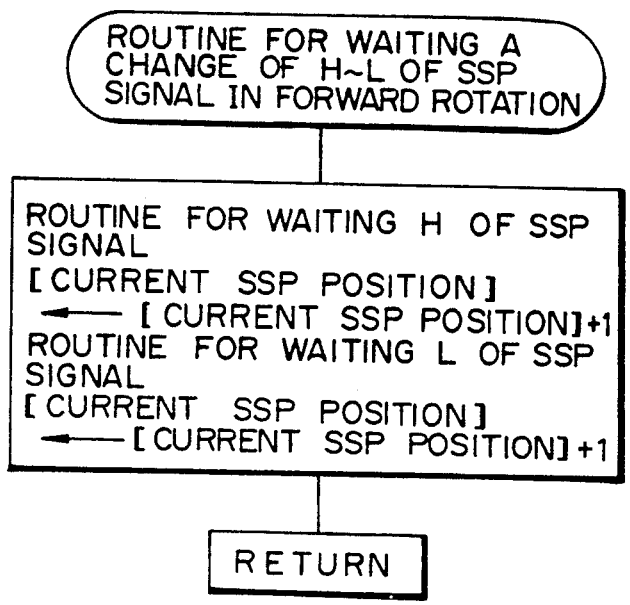
FIG. 58 is a flow chart showing the routine for H ~ L change of the SSP signal in forward rotation.

11-5 Routine for Waiting a Change of H ~ L of SSP Signal in Forward Rotation (FIG. 58)

In this routine, "1" is added to the current SSP position by executing the SSP signal H waiting routine, "1" is added to the current SSP signal by executing the SSP signal L waiting routine (step F-95) and the operation is returned.

Figure 59:
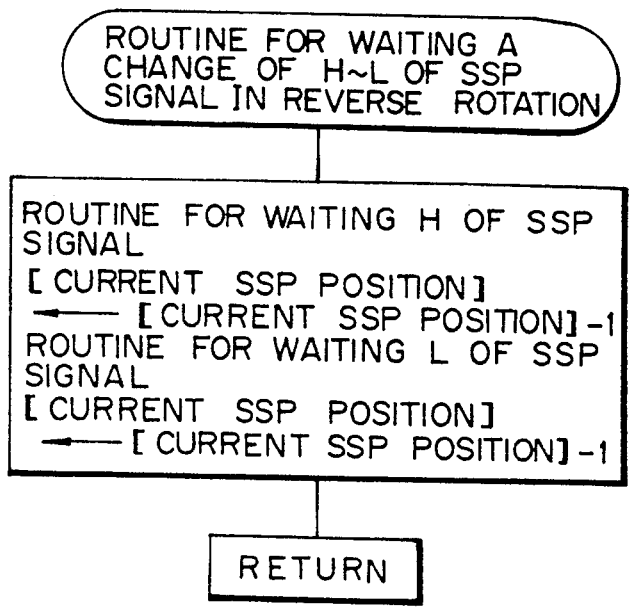
FIG. 59 is a flow chart showing the routine for H ~ L change of the SSP signal in reverse rotation.

11-5-1 Routine for Waiting a Change of H ~ L of SSP Signal in Reverse Rotation (FIG. 59)

In this routine, "1" is subtracted from the current SSP position by executing the SSP signal H waiting routine, "1" is subtracted from the current SSP signal by executing the SSP signal L waiting routine (step F-100) and the operation is returned.

Figure 60:
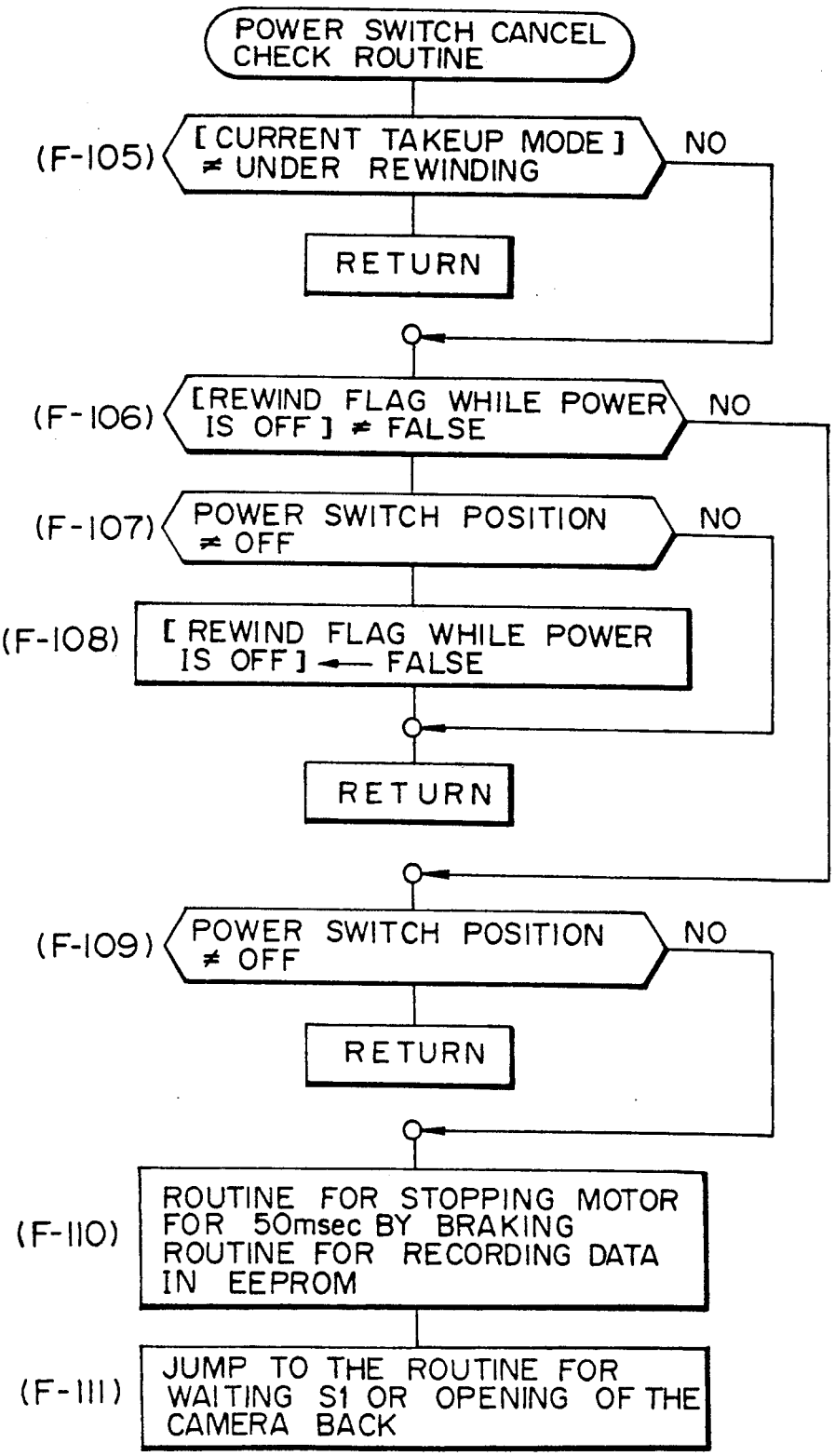
FIG. 60 is a flow chart showing the power supply switch cancel check routine.

Power Switch Cancel Check Routine (FIG. 60)

This routine is called by the routine for returning to the master routine and the power OFF is checked in rewinding so that the operation is stopped when the power supply is turned off.

Specifically, it is determined whether "under rewinding" is set in variable [CURRENT TAKEUP MODE] (step F-105) and, if "under rewinding" is not set, the operation is returned. If "under rewinding" is set, it is determined whether the rewind in power OFF flag is set (step F-106). As a result, if the rewind in power OFF flag is set, it is determined whether the position of the power switch (main dial 9) is OFF (step F-107) and, if the position of the power switch is OFF, the rewind in power OFF flag is reset (step F-108) and the operation is returned. If the position of the power switch is OFF, the operation is directly returned. When it is determined that the rewind in power OFF flag is reset in step (F-106), it is determined whether the position of the power switch is OFF (step F-109) and, if the position of the power switch is not OFF, the operation is returned. If the position of the power switch is OFF, the routine for stopping the motor for 50 m sec by braking and the routine for recording data in the EEPROM 88 are executed (step F-110) and the operation jumps to the routine for waiting S1 or opening of the camera back (step F-111). When the operation jumps to the routine for waiting S1 or opening of the camera back, the processing in response to the operation of switch S1 or opening operation of the camera back 24 is executed after rewinding is stopped.

Figure 61:
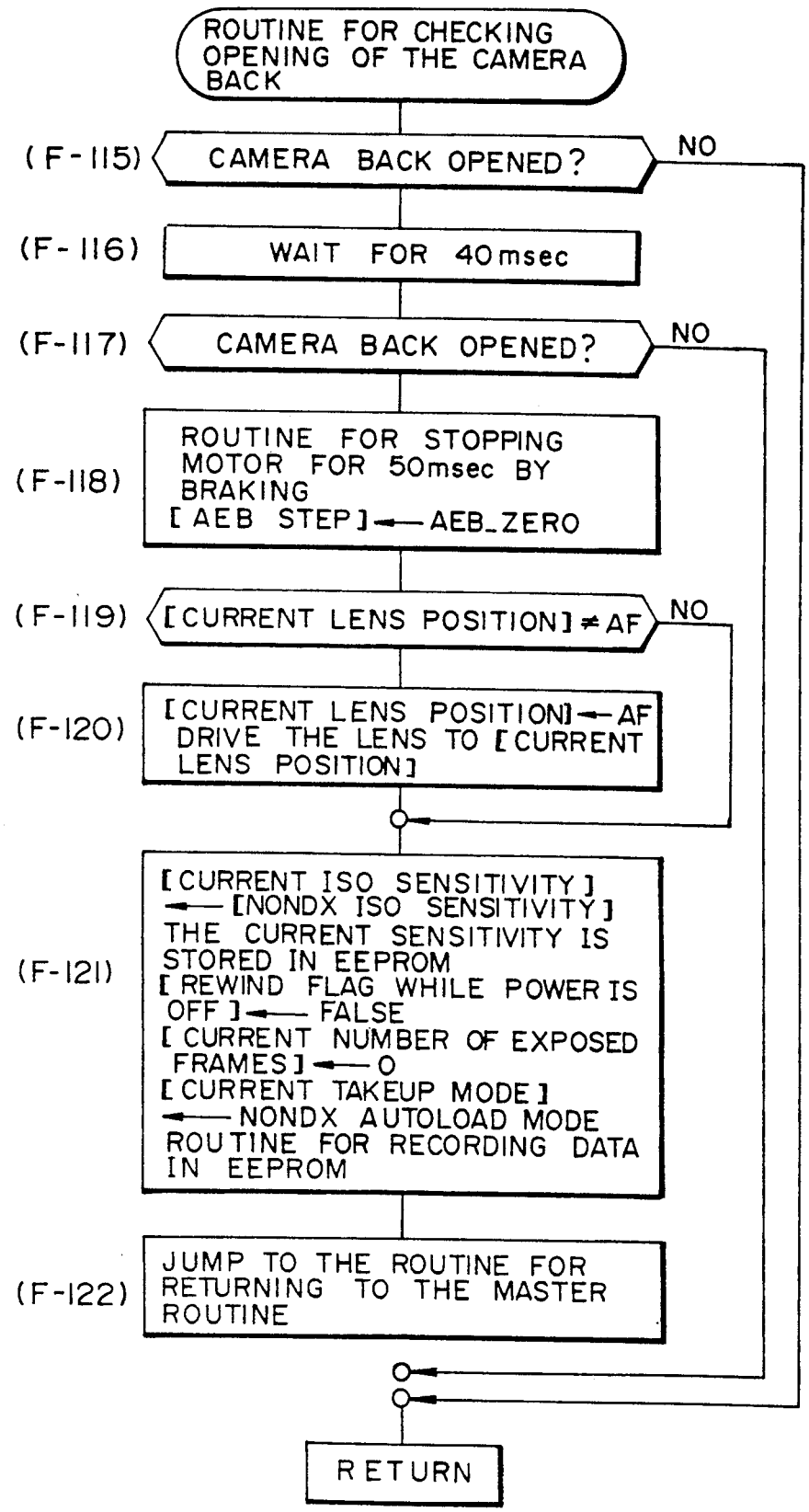
FIG. 61 is a flow chart showing the routine for checking the opening of the camera back.

11-6 Routine for Checking Opening of Camera Back (FIG. 61)

This routine is called in the SSP signal H waiting routine and the SSP signal L waiting routine to periodically check the opening of the camera back 24 in the film feed process and, when the camera back 24 is opened, feeding of the film is stopped and the specified initialization is carried out.

In other words, it is determined whether the camera back is opened (step F-115) and, if the camera back 24 is opened, it is determined again whether the camera back 24 is opened with lapse of waiting time of 40 m sec in view of chattering (step F-117). As a result, if the camera back 24 is opened, the routine for stopping the motor for 50 m sec by braking, 0 is set in variable [AEB STEP] and IR50 is set in variable [INFRARED FILM TYPE] (step F-118). Then it is determined whether the current lens position is the AF position (initial position) (step F-119) and, if it is not the initial position, the initial position is set in variable [CURRENT LENS POSITION] and the photographic lens is moved to the initial position (step F-120).

Next, the non-DX ISO sensitivity is set in variable [CURRENT ISO SENSITIVITY] and recorded in the EEPROM 88, the rewind in power OFF flag is reset, the current number of exposed frames is set to 0, the non-DX auto load mode is set in variable [CURRENT TAKEUP MODE], the routine for recording data in the EEPROM 88 is executed (step F-121), and the operation jumps to the routine for returning to the master routine (step F-122). If the lens position is the initial position, the operation skips step (F-120) and proceeds to step (f-1210. When it is determined in steps (F-115) and (F-117) that the camera back 24 is closed, the operation is returned.

Figure 62:
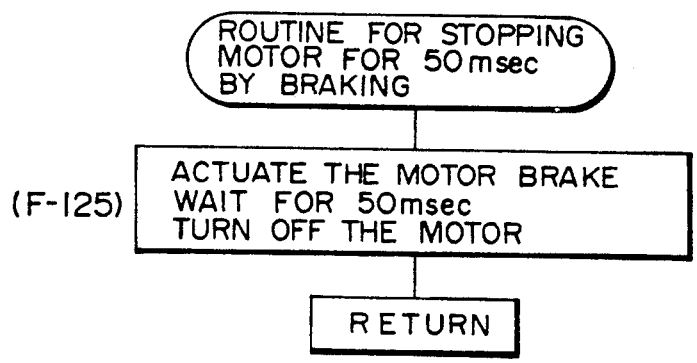
FIG. 62 is a flow chart showing the routine for stopping the motor for 50 msec by braking.

11-7 Routine for Stopping the Motor for 50 m sec by Braking (FIG. 62)

This routine is called from the routine for returning to the master routine after rewinding and the power switch cancel check routine. The operation waits for 50 m sec by braking the film feed motor MF to stop the film feed motor MF (step F-125) and is returned.

Figure 63:
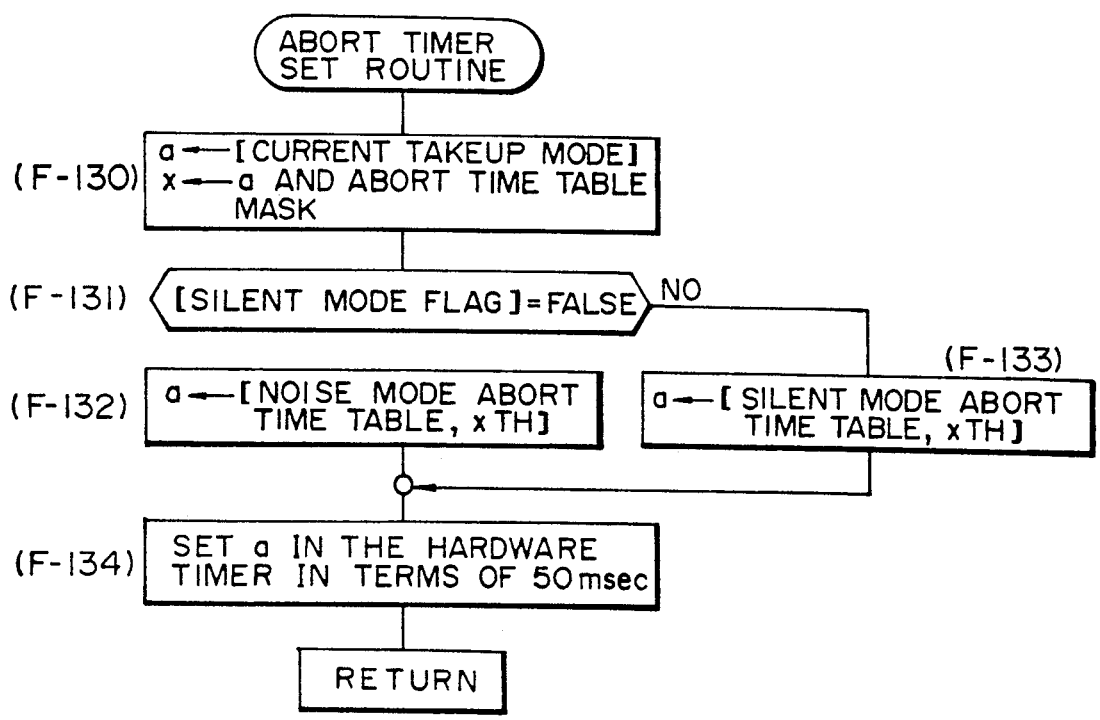
FIG. 63 is a flow chart showing the abort timer setting routine.

11-8 Abort Timer Set Routine (FIG. 63)

This routine is called from the SSP signal H waiting routine and the SSP signal L waiting routine to set the abort time in response to the contents of the current takeup mode and setting/resetting of the silent mode.

In other words, the contents of variable [CURRENT TAKEUP MODE] are set in variable [a] and the logical product of this set contents and constant [3] defined as the abort time table mask is set in variable [x] (step F-130). In this case, the contents of [CURRENT TAKEUP MODE], as shown in the table, are denoted with 00H for the non-DX auto load mode, 11H for one frame mode takeup, 21H for the forward way for the two frames feed mode, 32 H for the return way for the two frames feed mode, 42H for the mode shortly before the end of rewinding, 53H for "under rewinding" and 03H for the abort time table mask and therefore the logical product is one of 0, 1, 2 and 3 of decimal numbers.

Next, it is determined whether the silent mode flag is set (step F-131) and, if it is reset, the abort time shown in the noise mode abort time table in the order of precedence corresponding to the above logical product is set in variable [a] (step F-132). For example, if the one frame takeup mode is set and the silent mode is not set, the above logical product is "1" and 1000/T50 m sec set in [NOISE MODE ABORT TIME TABLE, FIRST] shown in Table 8, that is, 20 m sec is set.

When the silent mode flag is set, the abort time shown in the silent mode abort time table in the order of precedence corresponding to the above logical product is set in variable [a] (step F-133). For example, when the silent mode is selected in the one frame takeup mode, the above logical product is "1" and therefore 900/T50 m sec, that is, 18 m sec set in [SILENT MODE ABORT TIME TABLE, FIRST] shown in Table 8 is set. The abort time which is the contents of variable [a] is set in the hardware timer in the unit of 50 m sec (step F-134) and the operation is returned.

Figure 64:
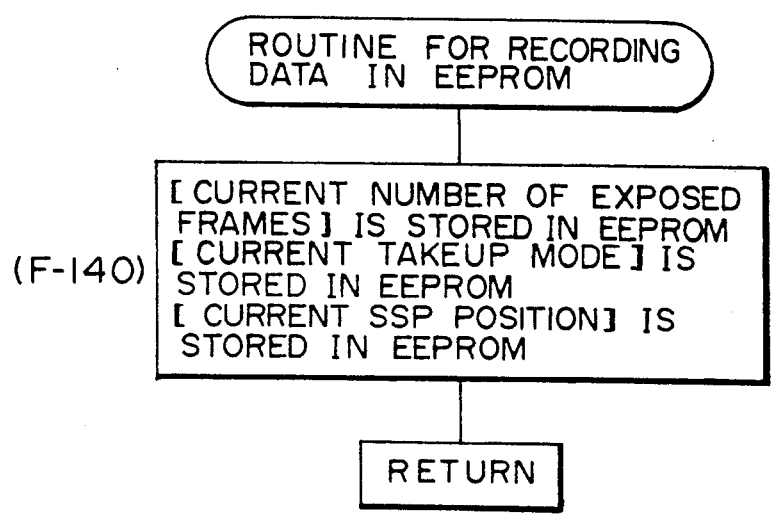
FIG. 64 is a flow chart showing the routine for recording data in the EEPROM.

11-9 Routine for Recording Data in EEPROM (FIG. 64)

This routine is for restoring the condition of the camera to the former condition after loading the battery even though the battery has been removed while the film is being fed. The current number of exposed frames, current takeup mode and current SSP position are stored in the EEPROM 88 (step F-140) and the operation is returned.

Figure 65:
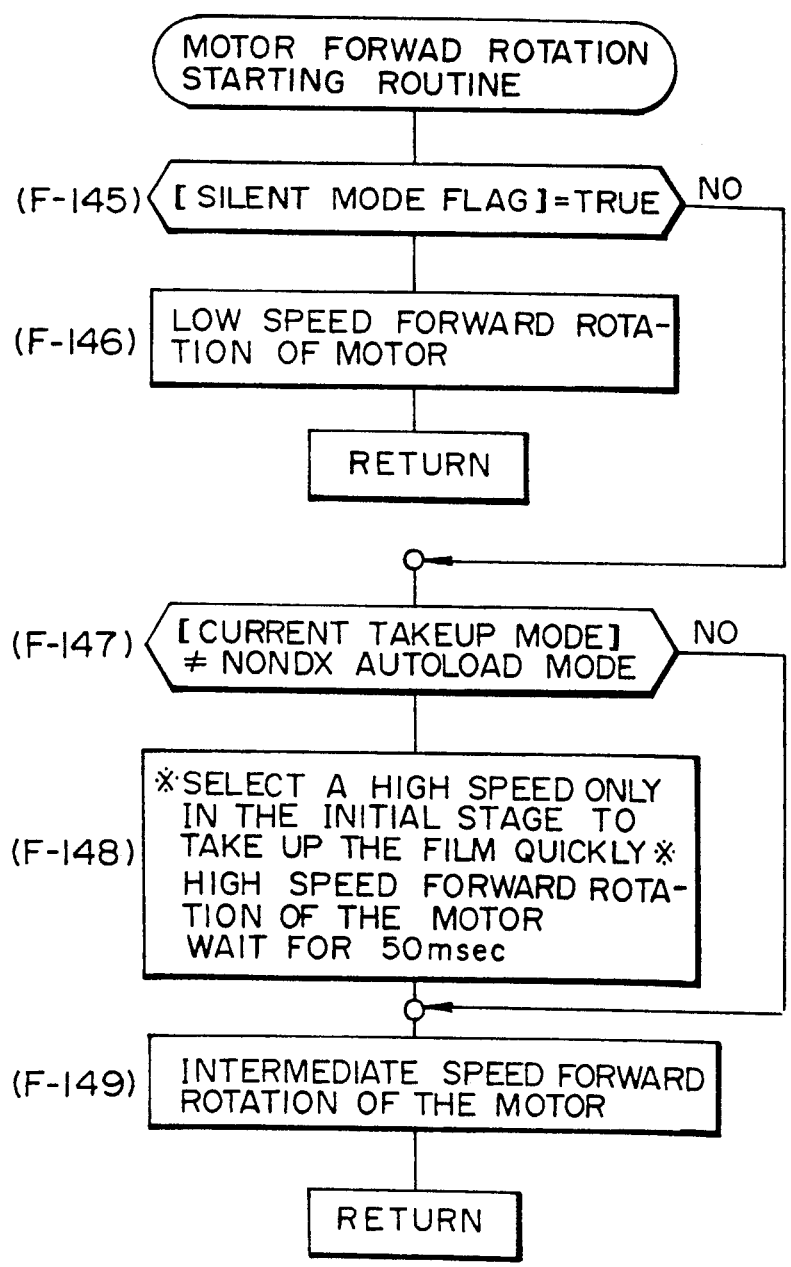
FIG. 65 is a flow chart showing the routine for starting forward rotation of the motor.

11-10 Motor Forward Rotation Start Routine (FIG. 65)

This routine is called in the film takeup subroutine. In this routine, it is determined whether the silent mode flag is set (step F-145) and, if it is set, the motor is rotated at a low speed (step F-146) and the operation is returned. Noise produced in taking up the film is reduced by taking up the film ay a low speed.

If the silent mode flag is reset, it is determined whether the current takeup mode is the non-DX auto load mode (step F-147) and, if it is not the non-DX auto load mode, the motor is rotated at a high speed in the forward direction for 50 m sec to take up the film at a high speed at the beginning (step F-148) and, if it is the non-DX auto load mode, the motor is rotated at an intermediate speed in the forward direction (step F-149) and the operation is returned.

Figure 66:
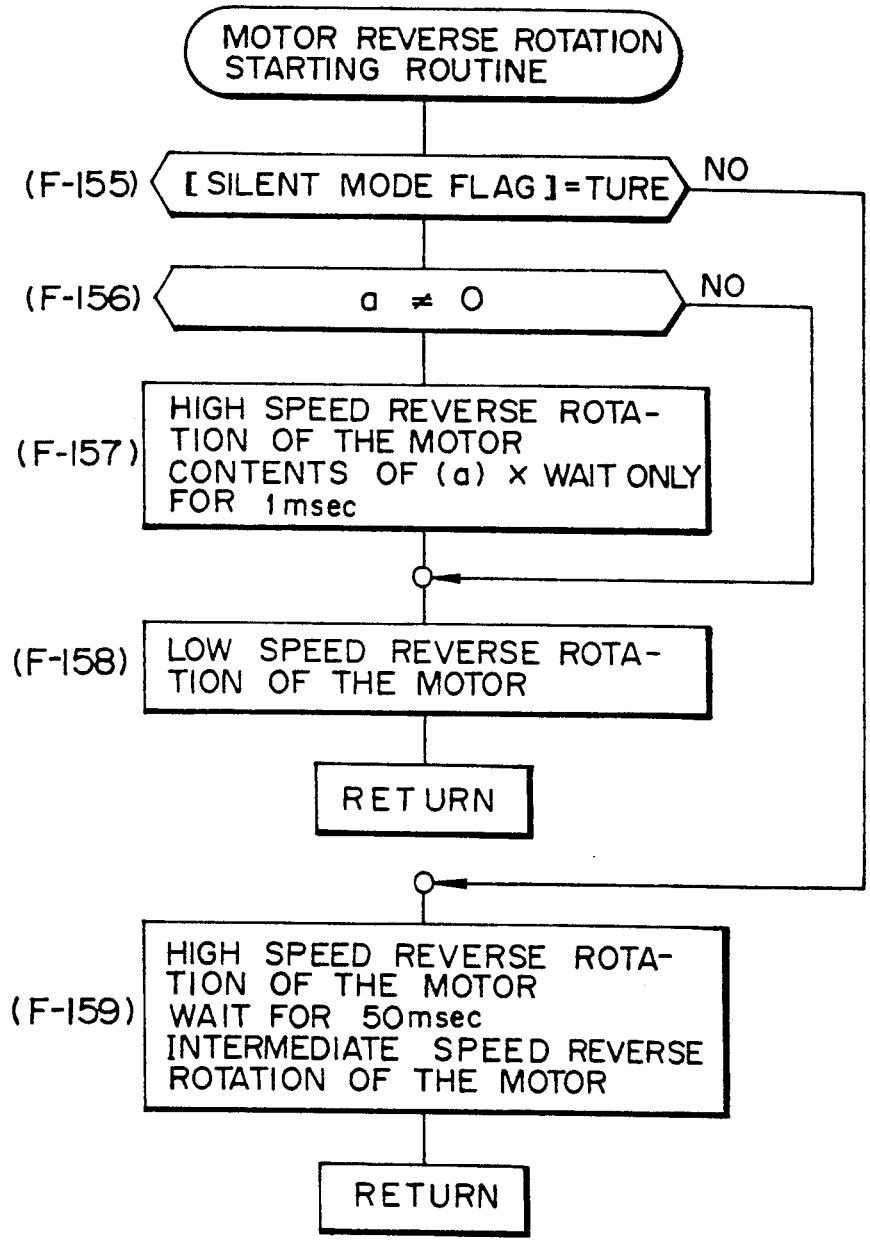
FIG. 66 is a flow chart showing the routine for starting reverse rotation of the motor.

11-11 Motor Reverse Rotation Start Routine (FIG. 66)

This routine is called in the film takeup subroutine and the routine for returning to the master routine after rewinding. This motor reverse rotation start routine is called even in the film takeup subroutine because the film need be fed in the rewinding direction even if the film is actually taken up in the return way for feeding two frames.

In this routine, it is determined whether the silent mode flag is set (step F-155) and, if it is set, it is determined whether the contents of variable [a] are "0" (step F-156). As a result, when the contents of variable [a] is not "0", the motor is reversely rotated at a high speed for X1m sec, which is the contents of variable [a] (50 m sec; refer to step (F-61) in FIG. 57), that is, 50 m sec to brake the motor for reverse rotation (step F-157), then the motor is reversely rotated at a low speed (step F-158), and the operation is returned. On the contrary, when the contents of variable [a] are "0", the operation proceeds to step (F-158) without high speed reverse rotation of the motor and the motor is reversely rotated at a low speed. When it is determined in step (F-155) that the silent mode flag is reset, the motor is reversely rotated a an intermediate speed (step F-159) to brake by reverse rotation after the motor has been reversely rotated at a high speed only for 50 m sec and the operation is returned. Thus the film is fed while reducing noise even during rewinding the film. The reason why high speed reverse rotation is carried out as described above is that a large torque is required for changing over the gear for reverse rotation.

Figure 67:
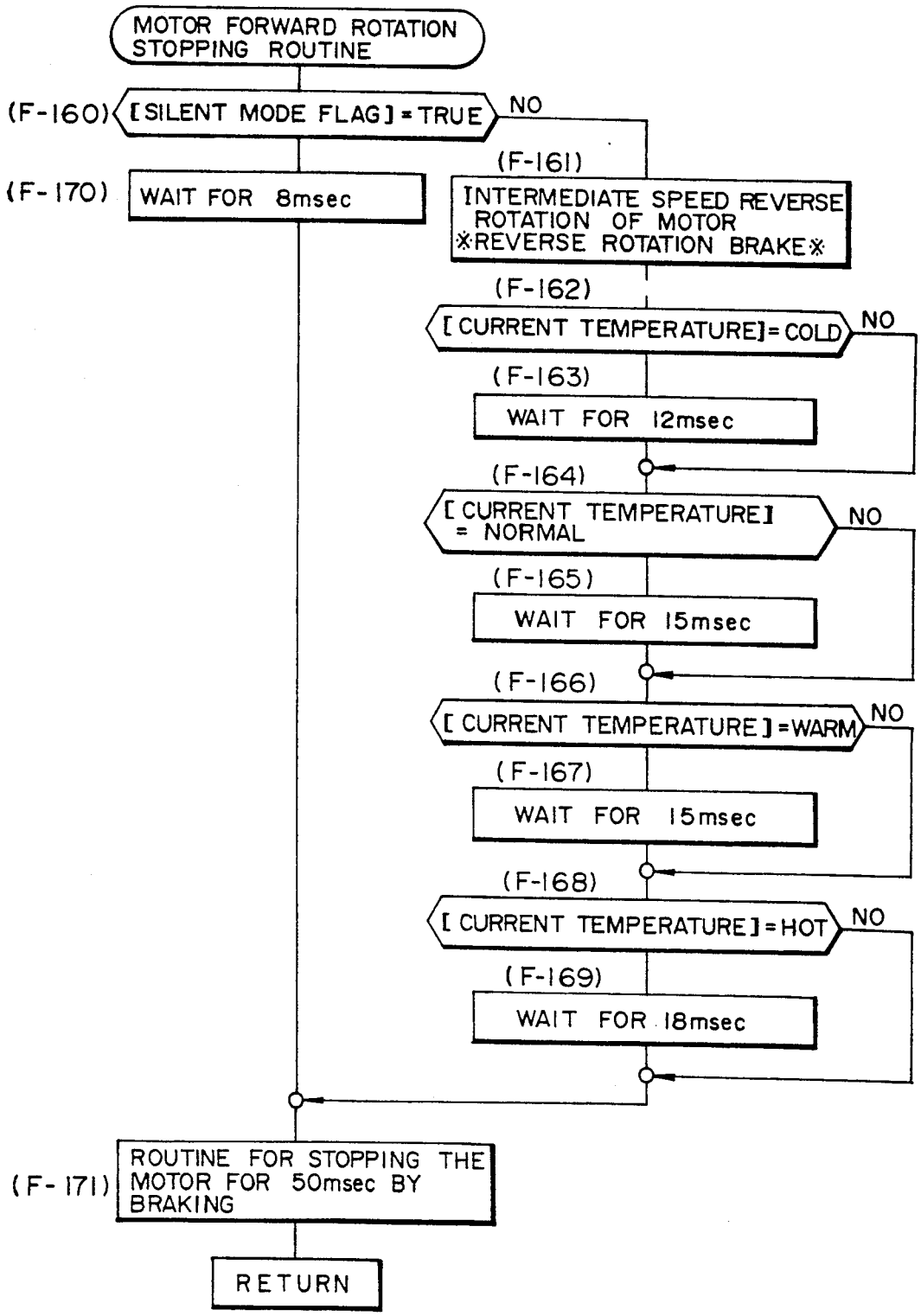
FIG. 67 is a flow chart showing the routine for stopping forward rotation of the motor.

11-12 Motor Forward Rotation Stop Routine (FIG. 67)

In this routine, it is determined whether the silent mode flag is set (step F-160) and, if the silent mode flag is reset, the motor is reversely rotated at an intermediate speed to brake the motor by reverse rotation (step F-161). In this case, the time of reverse rotation braking is changed in accordance with the preset current temperature. Specifically, the above described time is changed to 12 seconds if the preset current temperature is COLD, 15 seconds if it is NORMAL or WARM and 18 seconds if it is HOT (steps F-162 ~ 169). Thus, the time of reverse rotation braking is changed in response to the temperature since the amount of over-run varies with the temperature. When the silent mode flag is set, the operation waits for 8 seconds as the shortest time (step F-170). Then the routine for stopping the motor for 50 m sec by braking is executed (step F-171) and the operation is returned.

Figure 68A:
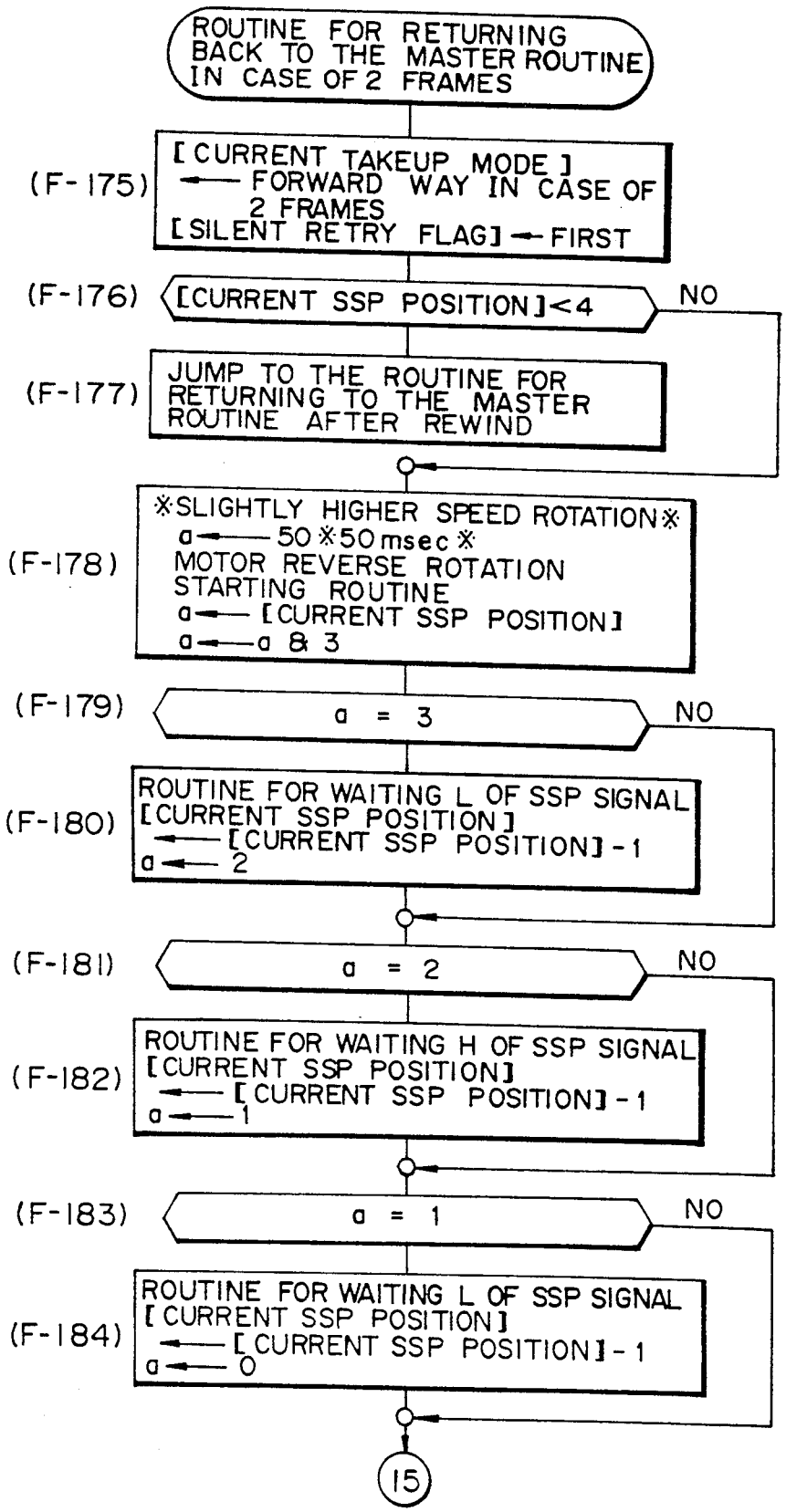
FIGS. 68A to 68B are respectively a flow chart showing the routine for returning to the master routine after rewinding two frames.
Figure 68B:
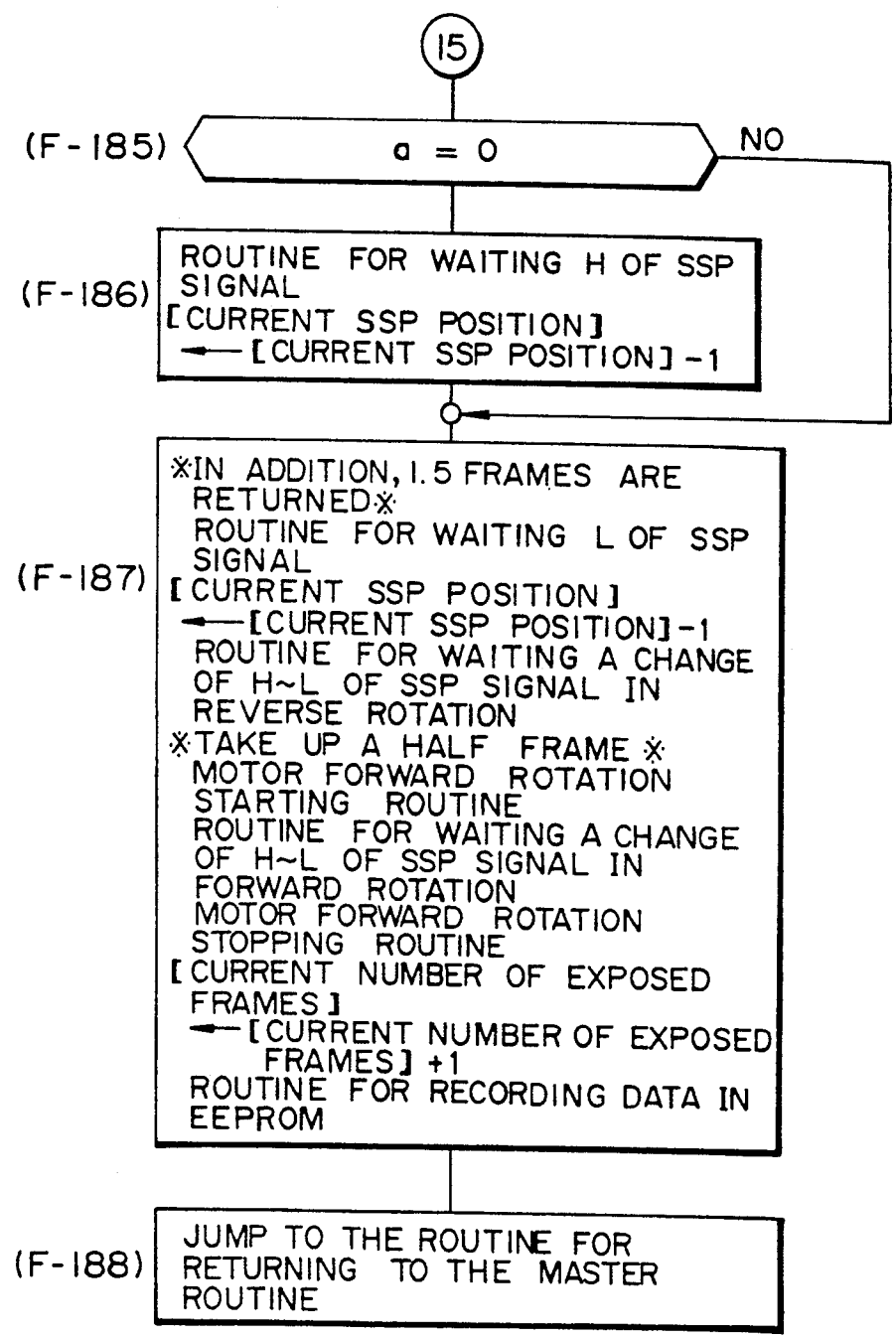

11-13 Routine for Returning to the Master Routine after Rewinding Two Frames (FIGS. 68A and 68B)

This routine is called in the timer abort execution routine described later when the film is excessively tensioned while taking up every two frames and allows to carry out the processing for always returning to the changeover position of frames (position of the preceding exposed frame) even though the film is tensioned at any position. Specifically, the current takeup mode is set for the return way in feeding of two frames and the silent retry flag is set as the first flag (step F-175). Then it is determined whether the current SSP position is less than 4, that is, less than two frames (step F-176) and, if it is less than two frames, the operation jumps to the routine for returning to the master routine after rewinding (step F-177).

If the current SSP position is two frames or over, "50" is set in variable [a] and the motor reverse rotation start routine is executed to rotate the motor at a high speed for a while. Subsequently, the current SSP position is set in variable [a], the remainders when the current SSP position is divided by 4 are obtained by obtaining the logical product of the current SSP position and "3" and this remainder is set in variable [a] (step F-178). Remainders "0", "1-", "2" and "4" obtained by dividing the current SSP position by "4" means that the the film is tensioned at the end, ¼, ½ and ¾ of the frame.

For this reason, rewinding as much as the remainder is carried out n steps (F-179 ~ 186) to return to the position of the preceding exposed frame. Specifically, if the remainder is 3, the film is rewound as much as two frames by executing the SSP signal L waiting routine, SSP signal H waiting routine, SSP signal L waiting routine and SSP signal H waiting routine in sequence. If the remainder is 2, the film is rewound as much as one and half frames by executing the SSP signal H waiting routine, SSP signal L waiting routine and SSP signal H waiting routine in sequence. If the remainder is 1, the film is rewound as much as one frame by executing the SSP signal L waiting routine and SSP signal H waiting routine in sequence. If the remainder is 0, the film is rewound as much as a half frame by executing only the SSP signal H waiting routine. Whenever these routines are executed, the current SSP position is decremented by 1 each time the film is rewound as much as a half frame.

Since the operation always returns to the position of the preceding exposed frame, that is, the changeover position of the frame even when the film is tensioned at any position, double exposure (double photography of one frame) in two frame photography in which every other frame is photographed can be prevented.

Next, the position of exposed frame is set at the left side of the position of the preceding exposed frame by rewinding the film as much as one and half frames by executing the SSP signal L waiting routine and the SSP signal H ~ L change waiting routine in reverse rotation and as much as a half frame by executing the motor forward rotation start routine, SSP signal H ~ L change waiting routine in forward rotation and motor forward rotation stop routine, the current number of exposed frames is incremented by 1, the routine for recording data in the EEPROM 88 (step F-187) and the operation jumps to the routine for returning to the master routine (step F-188).

Incrementing of the current number of exposed frames by 1 even in the return way in taking up two frames as described above means that the actual number of exposed frames is displayed even in photography in the return way in taking up two frames, that is, in photography after returning back in photography of every other frame as in case of photography of each frame.

Figure 69:
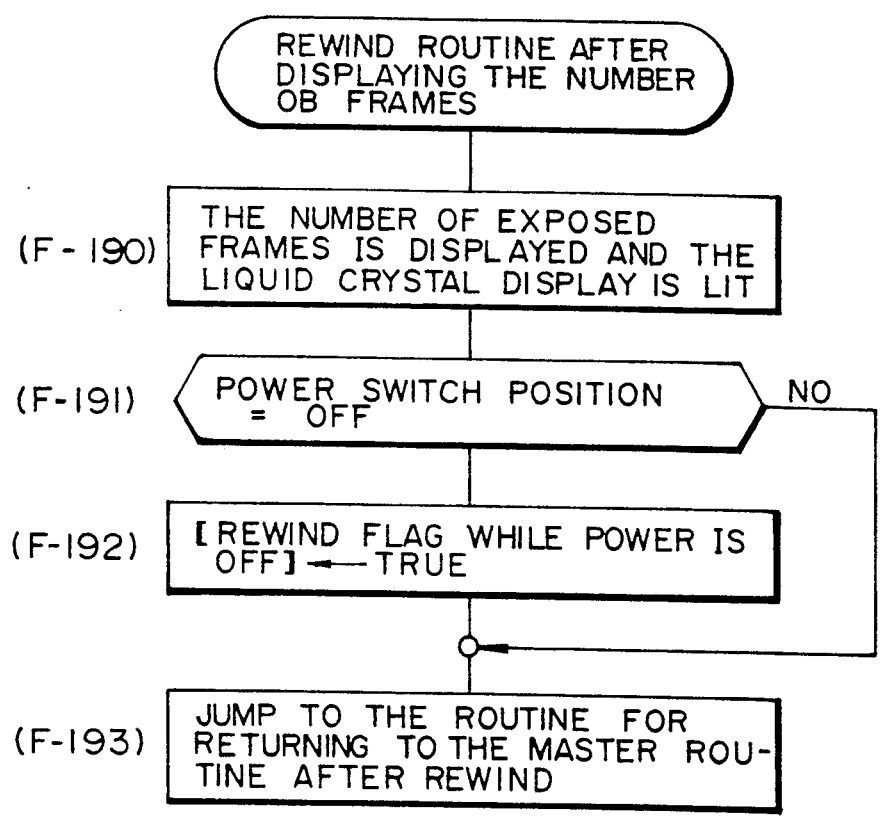
FIG. 69 is a flow chart showing the rewind routine after displaying the number of frames.

11-14 Rewind Routine after Displaying Number of Frames (FIG. 69)

This routine is called in the routine for waiting S1 or opening of the camera back described later. In this routine, the number of exposed frames is displayed in flickering (step F-190). If the position of the power switch is OFF, the rewind in power OFF flag is set and the operation jumps to the routine for returning to the master routine after rewinding and, if the position of the power switch is not OFF, the operation immediately jumps to the routine for returning to the master routine after rewinding (steps F-191 ~ 193).

Figure 70A:
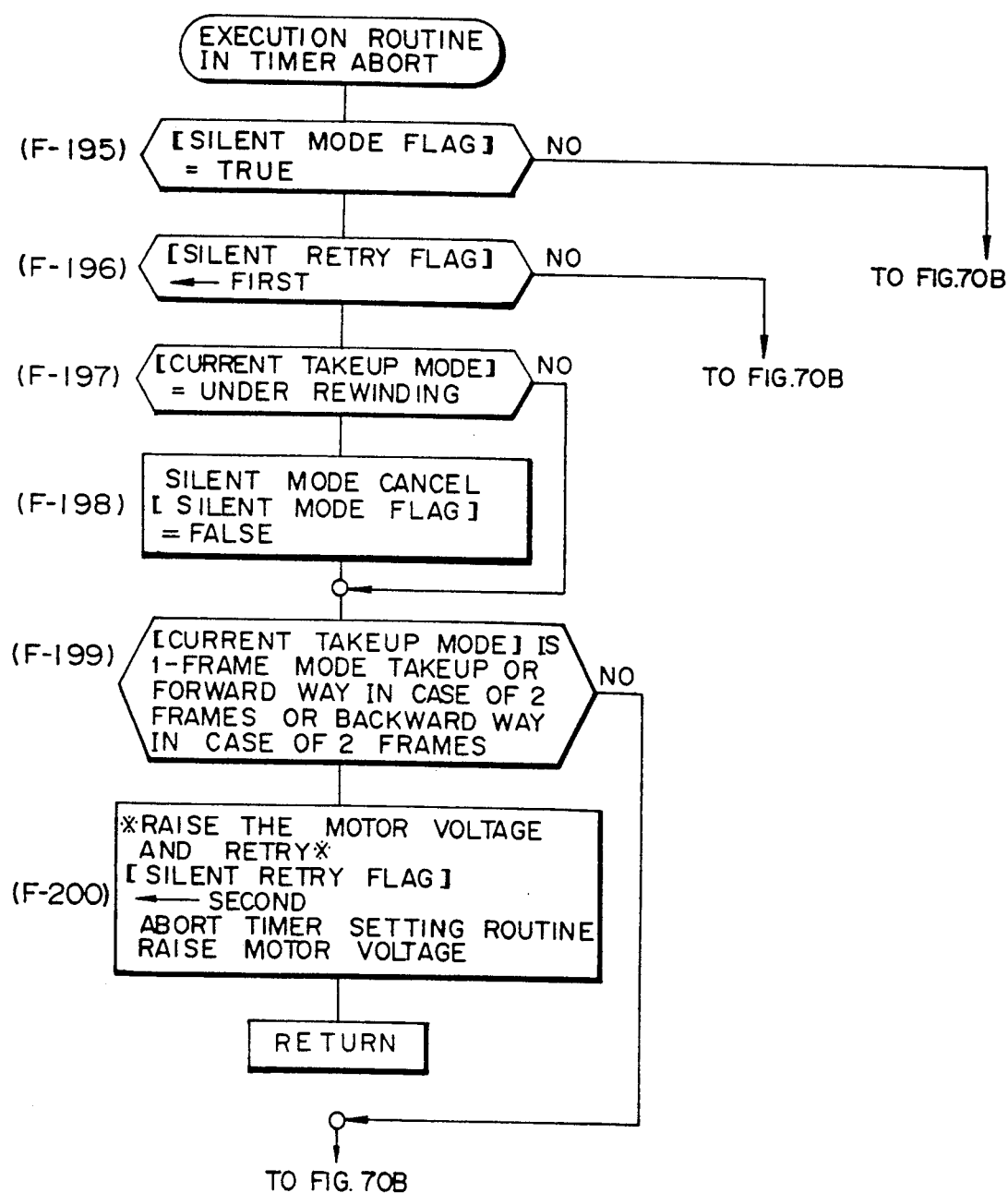
FIGS. 70A to 70C are respectively a flow chart showing the execution routine in the timer abort mode.
Figure 70B:
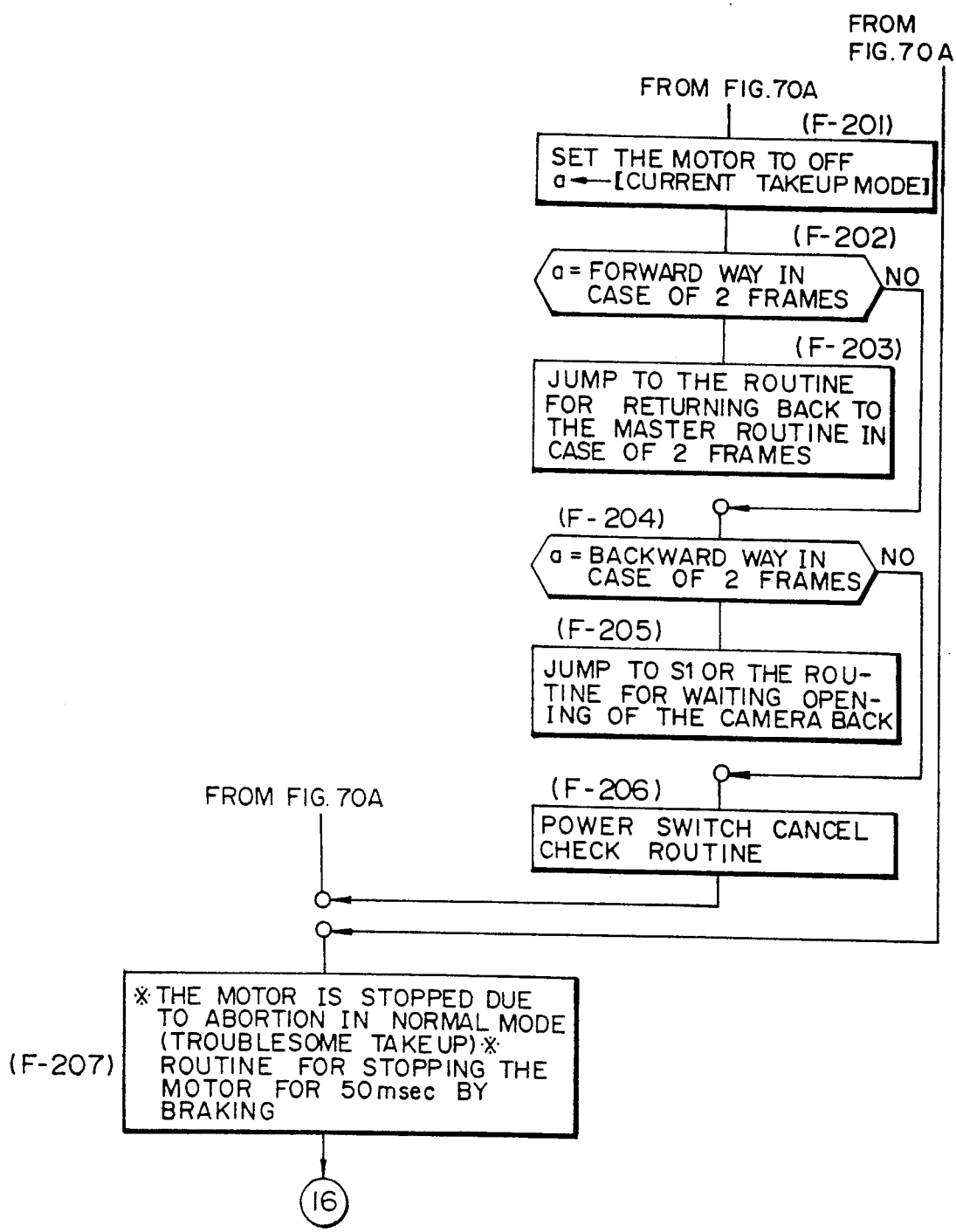
Figure 70C:
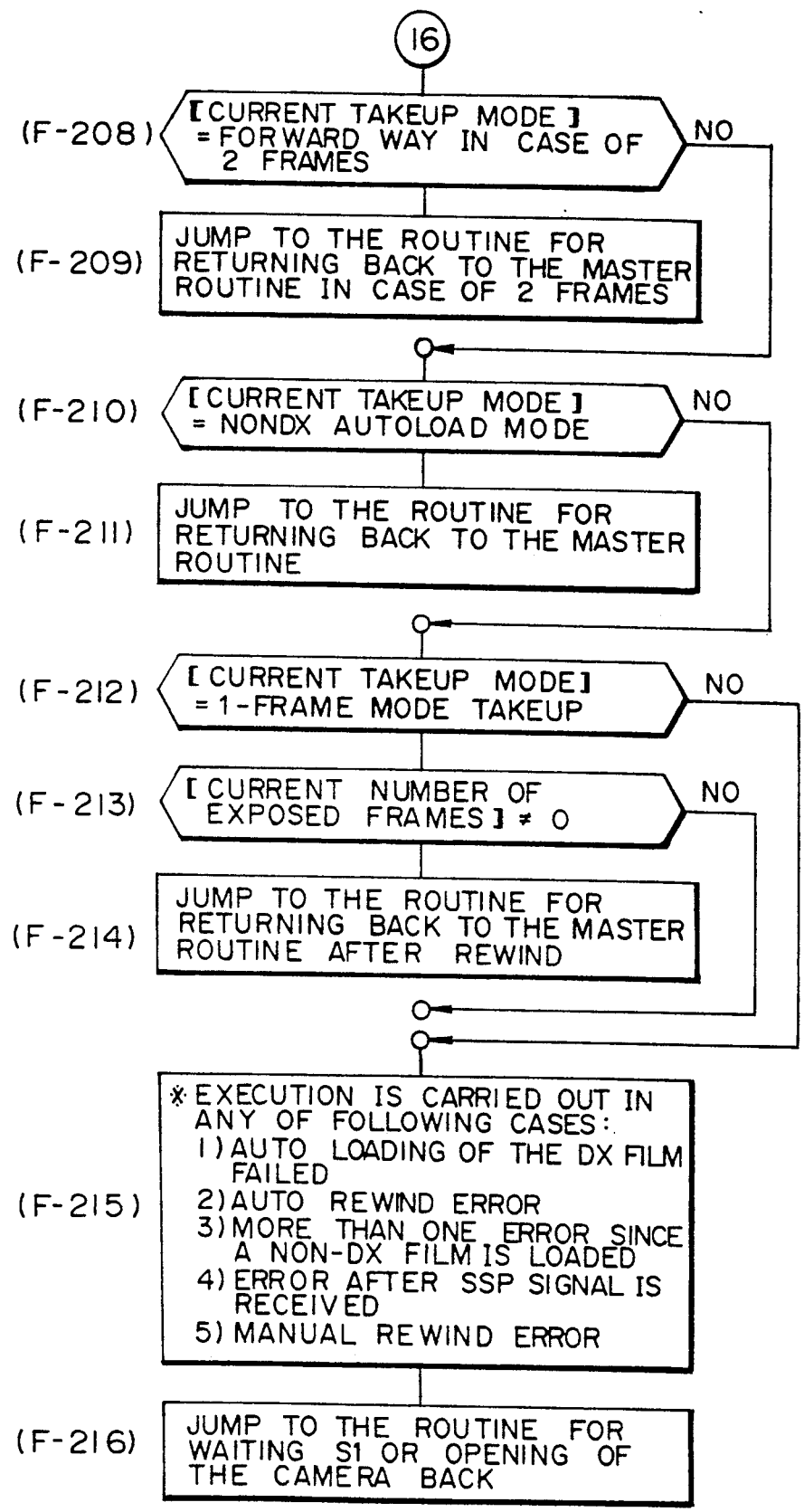

11-15 Execution Routine in Timer Abort (FIGS. 70A to 70C)

This routine is executed when the film is tensioned. In this routine, when the silent retry flag is the first flag and the current takeup mode is under rewinding in case it is clarified that the timer abort flag is set and the film is tensioned, the silent mode flag is reset to cancel the silent mode (steps F-195 ~ 198), and the operation is returned through step (F-199). In other words, when the film is tensioned during rewinding, the silent mode is not executed and is cancelled. When the current takeup mode is not "under rewinding", the operation proceeds to step (F-199) without cancelling the silent mode.

In step (F-190), it is determined whether the current takeup mode is one frame mode takeup, or the forward way or return way for feeding two frames. As a result, if it is one frame mode takeup, or the forward way or return way for feeding two frames, the second retry is set as the silent retry flag to retry the setting by increasing the voltage of the motor, the abort timer set routine is executed, the voltage of the motor is increased (step F-200) and the operation is returned. When the film cannot be taken up at a low speed (the return way for feeding two frames is also a type of mode), the taking up operation is automatically changed to high speed takeup. If the current takeup mode is not one frame mode takeup, or the forward way or return way for feeding two frames, the operation proceeds to step (F-207).

When the silent retry flag is the second retry or the film is excessively tensioned even though the film is fed at a high speed, the motor is turned off, the current takeup mode is saved in {a}, and it is determined whether the current takeup mode is the forward way for feeding two frames (steps F-201 and 202). As a result, if it is the forward way for feeding two frames, the operation jumps to the routine for returning to the master routine after rewinding in feeding two frames (step F-203). If it is not the forward way for feeding two frames and the return way for feeding two frames, the operation jumps to the routine for waiting S1 or opening of the camera back (steps F-204 an 205). If it is neither the forward way for feeding two frames nor the return way for feeding two frames, the power switch cancel check routine is executed (step F-206) and the operation proceeds to step (F-207). When it is determined in step (F-195) that the silent mode is reset, the operation proceeds to step (F-207) without through steps (F-196 ~ 206).

In step (F-207), abort operation has been carried out in ordinary takeup with large operating sound and therefore the routine for stopping the motor for 50 m sec by braking is executed. If the current takeup mode is the forward way for feeding two frames, the operation jumps to the routine for returning to the master routine after rewinding in feeding two frames (steps F-208 and 209) and, if it is the non-DX auto load mode, the operation jumps to the routine for returning to the master routine (steps F-210 and 211). If the current takeup mode is the one frame mode takeup mode and the current number of exposed frames is not 0, the operation jumps to the routine for returning to the master routine after rewinding (steps F-212 ~ 214). When the auto load error of the DX film, auto rewind error, an error after a non-DX film is loaded and an SSP signal is generated at least once, manual rewind error or an error before rewinding in the silent mode, the operation jumps to the routine for waiting S1 or opening of the camera back (steps F-215 and 216).

Figure 71A:
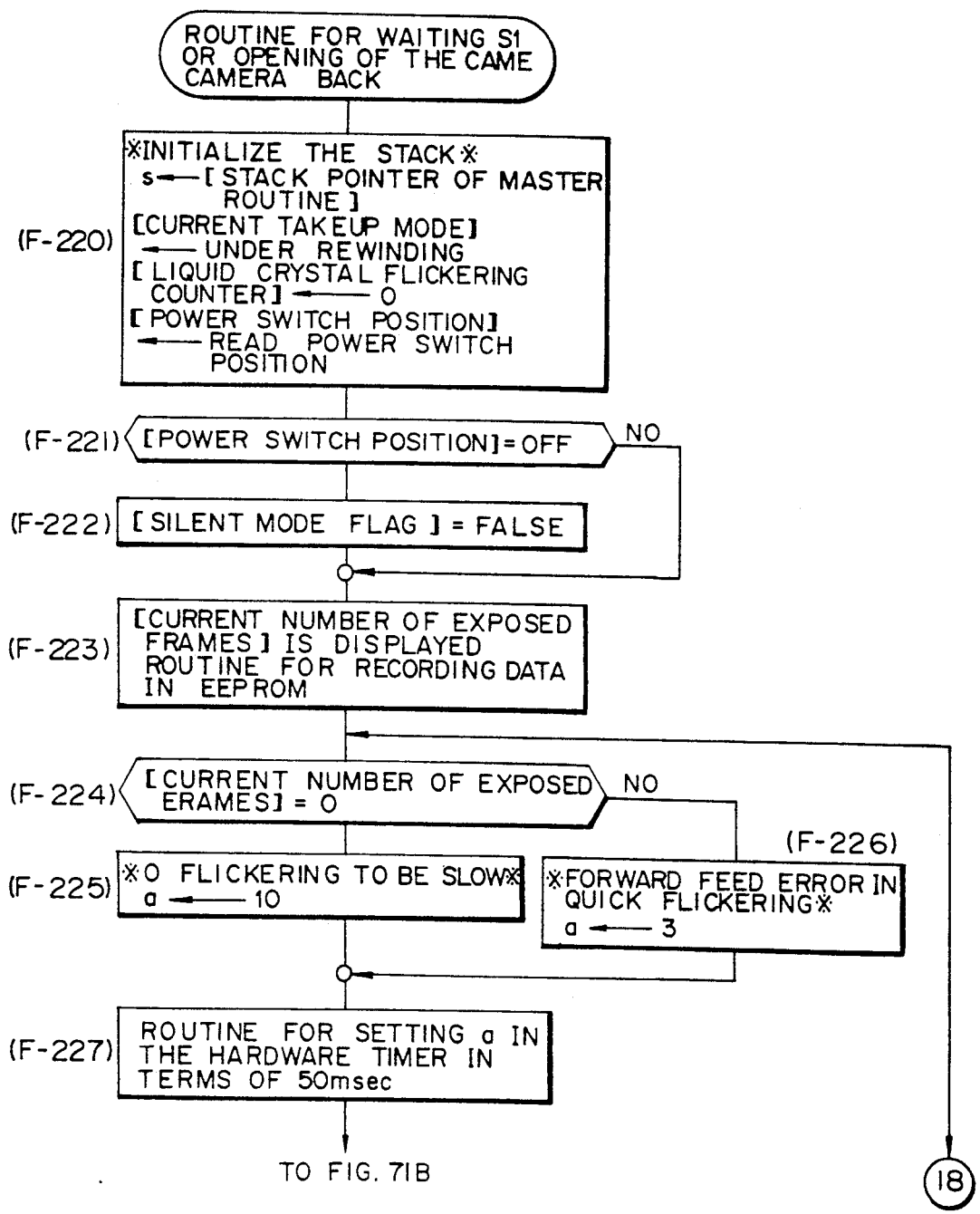
Figure 71B:
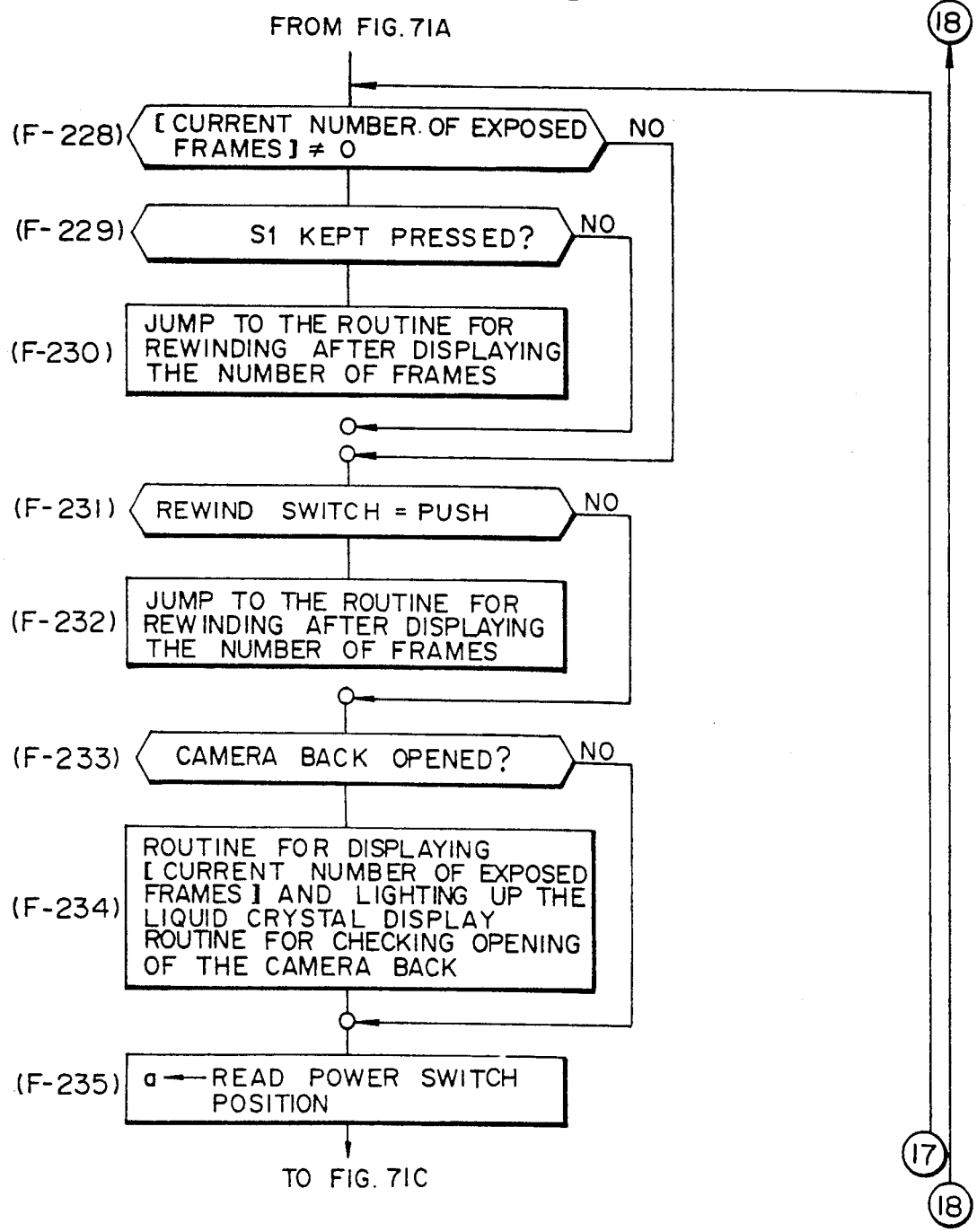

13-16 Routine for Waiting S1 or Opening of Camera Back (FIGS. 71A to 71C)

In this routine, the initialization including setting of the contents of the stack pointer of the master routine in variable [s], setting of the current takeup mode as "under rewinding", setting of the liquid crystal flickering counter to "0" and reading of the position of the power switch is carried out (step F-220). The current number of exposed frames is displayed after the silent mode flag is reset if the position of the power switch is OFF (steps F-221 and 222) without resetting the silent mode flag if the position of the power switch is not OFF and the routine for recording data in the EEPROM 88 (step F-223).

If the current number of exposed frames is "0", it means that the error occurs after rewinding has been finished and therefore "10" is set in variable [a] to flicker "0" at a low speed and, if the current number of exposed frames is not "0" or the film feed error, "3" is set in variable [a] for high speed flickering (steps F-224 ~ 226). Then the contents of variable [a] are set in the hardware timer in the unit of 50 m sec (step F-227). When the current number of exposed frames is not 0 and the switch S1 is ON, the operation jumps to the routine for rewinding after displaying the number of frames (steps F-228 ~ 230).

When the current number of exposed frames is 0 or the switch S1 is OFF, it is determined whether the rewind witch is set to ON (step F-231) and, if the rewind switch is set to ON, the operation jumps to the routine for rewinding after displaying he number of frames (step F-232). This jump to the routine for rewinding after displaying the number of frames allows to stop rewinding by turning off the power supply when the sound is jarring loud and resume rewinding after moving to a place where the sound is not cared.

If the rewind switch is set to OFF, it is determined whether the camera back 24 is opened (step F-233) and, if the camera back 24 is opened, the current number of exposed frames is displayed in flickering, the routine for checking opening of the camera back and the operation proceeds to step (F-235). If the camera back 24 is closed, the operation skips step (F-234) and proceeds to step (F-235).

In step (F-235), the position of the power switch is read and set in variable [a]. Then it is determined whether the position of the power switch is changed during the time from entry into this routine to the current timing (step F-236) and, if it is changed, the liquid crystal panel (display panel 19) is lit and it is determined whether the position of the power switch after changing is OFF (steps F-237 and 238). As a result, if the power switch is set at OFF, it is set in variable [POSITION OF POWER SWITCH], the silent mode flag is reset, the current number of exposed frames is displayed (step F-239) and the operation proceeds to step (F-240).

In step (F-240), it is determined whether the timer overflow flag is reset. As a result, if the timer overflow flag is reset, the liquid crystal flickering counter is incremented by 1 (steps F-240 and 241). When the count of the liquid crystal flickering counter is an odd number, the liquid crystal is lit and, when the count of the liquid crystal flickering counter is an even number, the liquid crystal goes out (steps F-242 ~ 244) and the operation is returned to step (F-224). If he timer overflow flag is set, the operation skips steps (F-241 ~ 244) and returns to step (F-228).

When it is determined in step (F-238) whether the position of the power switch after changing is not OFF, it is determined whether the position of the power switch before changing is OFF and, if it is OFF, the silent mode flag is temporarily reset (steps F-245 and 246). When the switch of MF button 16 is set to ON, the silent mode flag is set (steps F-247 and 248). This processing allows to interrupt the rewinding operation by turning off the power supply and select the ordinary rewind mode and the silent mode when resuming the rewinding.

When the position of the power switch before changing is not OFF and the switch of MF button 16 is not set to ON, the position of the power switch is set in variable [POSITION OF POWER SWITCH] after the contents of variable are read last (step F-249). If the current number of exposed frames is not 0, the operation jumps to the routine for rewinding after displaying the number of frames (steps F-250 and 251) and, if the current number of exposed frames is 0, the operation proceeds to step (F-240).

Figure 72:
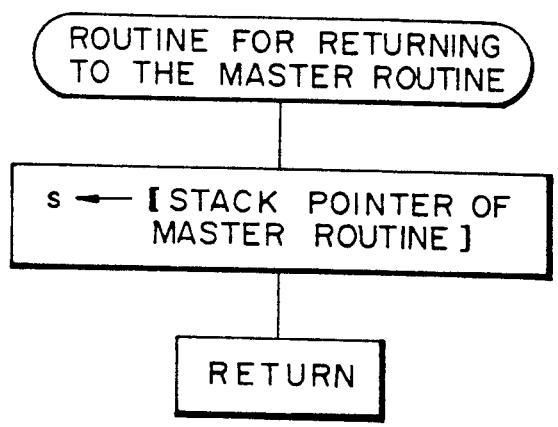
FIG. 72 is a flow chart showing the routine for returning to the master routine.
Figure 73:
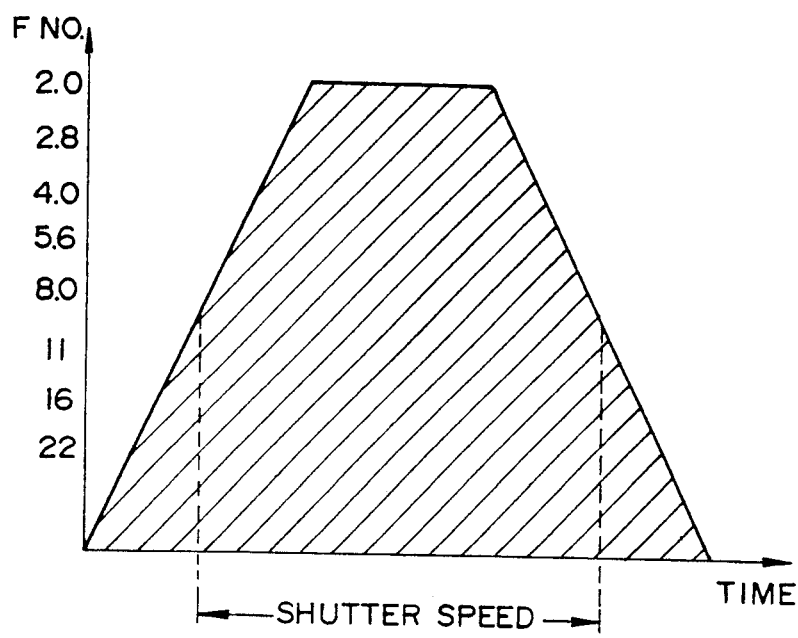
FIG. 73 is a diagram showing the shutter speed for F 2.0 aperture in the conventional shutter opening/closing time control.
Figure 74:
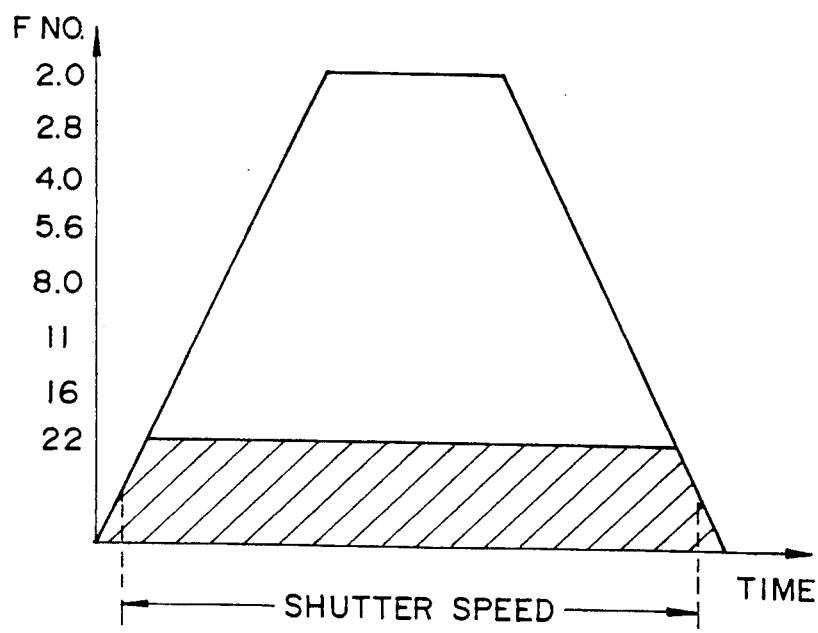
FIG. 74 is a diagram showing the shutter speed for F 22 aperture in the conventional shutter opening/closing control.

11-17 Routine for Returning to Master Routine (FIG. 72)

In this routine, the contents of the stack pointer of the master routine are set in variable [s] (step F-260) and the operation is returned.

What is claimed is:

1. An electronic camera including a film rewinding apparatus for the camera which comprises a camera back which opens and closes an opening of a camera body for mounting a film cartridge, open camera back detection means for detecting that said camera back is opened, film rewinding means for rewinding a film, film detection means provided in a film passage to detect information as to presence of the film, a timer for counting a specified time, and film rewind control means which stops rewinding of the film and simultaneously causes said timer to start counting of said specified time when said film detection means detects information indicating that there is no film during rewinding of the film, inhibits subsequent rewinding of the film when the open camera back is detected during counting of said specified time, and resumes rewinding of the film when the opening of said camera back is not detected during counting of said specified time and counting of said specified time is completed.

* * * * *

UNITED STATES PATENT AND TRADEMARK OFFICE
CERTIFICATE OF CORRECTION

PATENT NO. : 5,274,408
DATED : December 28, 1993
INVENTOR(S) : Toshiki Fujisawa et al.

It is certified that error appears in the above-indentified patent and that said Letters Patent is hereby corrected as shown below:

On title page, item [57] Abstract, line 4, before "openable" insert --is--.

Signed and Sealed this

Sixth Day of September, 1994

Attest:

BRUCE LEHMAN

*Attesting Officer*     *Commissioner of Patents and Trademarks*